(12) United States Patent
Hokkyo et al.

(10) Patent No.: US 6,204,995 B1
(45) Date of Patent: Mar. 20, 2001

(54) MAGNETIC DISC APPARATUS

(75) Inventors: Hirotaka Hokkyo; Shinzo Tsuboi; Katsumichi Tagami, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/250,421

(22) Filed: Feb. 16, 1999

(30) Foreign Application Priority Data

Feb. 19, 1998 (JP) .................................................. 10-037766

(51) Int. Cl.[7] .................................................... G11B 5/012
(52) U.S. Cl. ...................... 360/97.01; 360/86; 427/131; 427/132; 428/336; 428/694 TS; 428/694 TM; 428/698; 428/704; 428/900; 428/928
(58) Field of Search ...................... 428/694 TS, 694 TM, 428/900, 928, 704, 698, 336; 427/131, 132; 360/86, 97.01

(56) References Cited

U.S. PATENT DOCUMENTS 5,589,262 * 12/1996 Kiuchi et al. .

FOREIGN PATENT DOCUMENTS

| 1-165024 | 6/1989 | (JP) . |
| 3-224122 | 10/1991 | (JP) . |
| 5-67323 | 3/1993 | (JP) . |
| 5-250651 | 9/1993 | (JP) . |
| 5-258274 | 10/1993 | (JP) . |
| 5-266445 | 10/1993 | (JP) . |
| 5-303734 | 11/1993 | (JP) . |

OTHER PUBLICATIONS

Japanese Office Action dated Mar. 23, 2000 with partial translation.
Ouchi, et al., "Recording Performances and Preparation of Double Layer Medium for Perpendicular Magnetic Recording", Japan Applied Magnetics Association Journal, vol. 8, No. 1, 1984, pp17–22, (no month avail.).

* cited by examiner

*Primary Examiner*—Bernard Pianalto
(74) *Attorney, Agent, or Firm*—McGinn & Gibb, PLLC

(57) ABSTRACT

The present invention provides a magnetic disc apparatus comprising a vertical two-layered magnetic recording (MR) medium and a mono-pole/MR composite head or ID/MR composite head, wherein the vertical two-layered magnetic recording medium includes a vertical magnetization film formed on an undercoat soft magnetic film having no magnetic domain wall structure. This eliminates the fatal defect of a conventional vertical two-layered medium that an undercoat soft magnetic film domain wall is easily shifted by an external magnetic field generated by motors for disc rotation and head positioning, causing demagnetization of the recording magnetization to lower the output. The magnetic disc apparatus according to the present invention enables to obtain a high output stability.

17 Claims, 21 Drawing Sheets

Reproduction Output (Distance μm)
(Film Thickness 50nm)

Reproduction Output (Distance μm)
(Film Thickness 50nm)

Reproduction Output (Distance μm)
(Film Thickness 50nm)

MAGNETIC DISC APPARATUS

BACKGROUND OF THE INVENTION

1. Field of the Invention

The present invention relates to a magnetic disc apparatus.

2. Description of the Related Art

Currently, with the advance of personal computers and work stations, a hard disc drive has an increased capacity and reduced size, which requires a high-density recording of a magnetic disc apparatus. However, in the longitudinal recording method which is wide spread, a high-density recording brings about a problem of thermal fluctuation of recording magnetization due to a reduced recording bit size and a problem of a high coercive force which may exceed the recording head recording capability. Thus, a magnetic disc apparatus using a longitudinal recording medium has a limit as an apparatus for realizing a high-density recording. In order to solve these problems, a study has been conducted on a magnetic disc apparatus for mounting a vertical magnetic recording medium using the vertical magnetic recording method. As one of such magnetic disc apparatuses, there is provided a magnetic disc apparatus using a vertical two-layered medium consisting of a high-permeability soft film and a vertical magnetic film of a high vertical anisotropy.

FIG. 38 shows a conventional example of a magnetic disc apparatus having such a vertical magnetic recording medium. Moreover, FIG. 39 is a cross sectional view showing a conventional example of a vertical magnetic recording medium to be mounted on such a magnetic disc apparatus.

This conventional magnetic disc apparatus comprises: a conventional vertical magnetic recording medium 50 supported by a rotary spindle 33; and a slider 32 including a mono-pole/MR composite head 31 or an inductive/MR composite head 31 positioned on a recording track 35 and supported by an actuator 34. The vertical magnetic recording medium 50 includes a soft magnetic backing layer 52 and a vertical magnetization film 54 successively formed in this order on a substrate 56. For example, the soft magnetic film is a NiFe film, and the vertical magnetization film is a CoCr alloy film (see Japan Applied Magnetics Association Journal, Vol. 8, No. 1, 1984, p17).

It should be noted that as a related conventional technique, Japanese Patent Publication (unexamined) A-03-224122 entitled "Vertical Magnetic Recording Medium and Production Method of the Same" discloses a soft magnetic undercoat layer having means for suppressing magnetic domain wall shift.

Moreover, Japanese Patent Publication (unexamined) A-05-250651 entitled "Vertical Magnetic Recording Medium" discloses a soft magnetic layer constituted by an alphaFe16N2 film.

Furthermore, Japanese Patent Publication (unexamined) A-05-258274 entitled "Vertical Magnetic Recording Medium and Production Method of the Same" discloses a configuration providing a high-magnetic film having a residual magnetization between the substrate and the soft magnetic layer.

Moreover, Japanese Patent Publication (unexamined) A-05-266455 entitled "Vertical Magnetic Recording Medium" discloses a configuration using a three-layered soft magnetic backing layer consisting of a first soft magnetic layer film, a high magnetic film, and a second soft magnetic layer film.

However, in the magnetic disc apparatus of FIG. 38 having the vertical magnetic recording medium of FIG. 39, there is a problem that unstable recording magnetization with respect to an external magnetic field results in an unstable reproduction output.

The vertical magnetic recording medium of FIG. 39 includes an undercoat soft magnetic film 52 having a magnetic domain wall configuration. Accordingly, if a magnetic field is applied by some reason to the disc, even if a very weak magnetic field, the magnetic domain wall of the soft magnetic layer is easily shifted. If the wall shift occurs in a region corresponding to the main magnetic pole of the vertical magnetic head, the magnetization recorded in the vertical recording layer is reduced or demagnetized. Such a wall shift causing demagnetization is easily caused in a magnetic field in the parallel direction of the disc surface. Even for a magnetic field other than in a horizontal direction with respect to the disc surface, the magnetic field component of the horizontal direction is considered to function to cause demagnetization. This results in a reduction or disappearance of the reproduction output.

Such an external magnetic field is generated by a motor that controls the spindle 33 for rotating a disc positioned in the proximity of the magnetic disc and by a motor used for controlling an actuator 34 for positioning the head. Although these magnetic fields are very weak, if they are concentrated at the vertical magnetic head main magnetic pole tip, this will induce the domain wall shift of the undercoat soft magnetic film, which in turn causes demagnetization of the recording magnetization and the output reduction or disappearance. That is, a fatal defect is caused for the information recording apparatus.

SUMMARY OF THE INVENTION

It is therefore an object of the present invention to provide a novel magnetic disc apparatus capable of eliminating reproduction output reduction or disappearance due to demagnetization of recording magnetization caused by an undercoat soft film magnetic domain wall shift which is easily generated when an external magnetic field is applied to the disc surface during a recording or reproduction.

The magnetic disc apparatus according to the present invention comprises a vertical two-layered magnetic recording medium having an undercoat soft magnetic film and a vertical magnetization film; and a composite head for recording/reproducing to/from the vertical two-layered magnetic recording medium, wherein the undercoat soft magnetic film is made from a material having no magnetic domain wall structure.

Thus, the magnetic disc apparatus according to the present invention employs a vertical two-layered medium using under a vertical magnetization film an undercoat soft magnetic film having no magnetic domain wall such as a Blochline domain wall and a Neel domain wall. Accordingly, it is possible to solve the fatal problem as a information storage apparatus. That is if the undercoat soft magnetic film has a domain wall, the domain wall is easily shifted by a magnetic field generated by a spindle motor for disc rotation and a motor used for controlling a head positioning actuator. This would cause demagnetization of the recording magnetization, resulting in output reduction. The present invention not affected by such a problem can realize a magnetic disc apparatus which is resistant to the effects of an external magnetic field.

DESCRIPTION OF THE PREFERRED EMBODIMENTS

Figure 1:
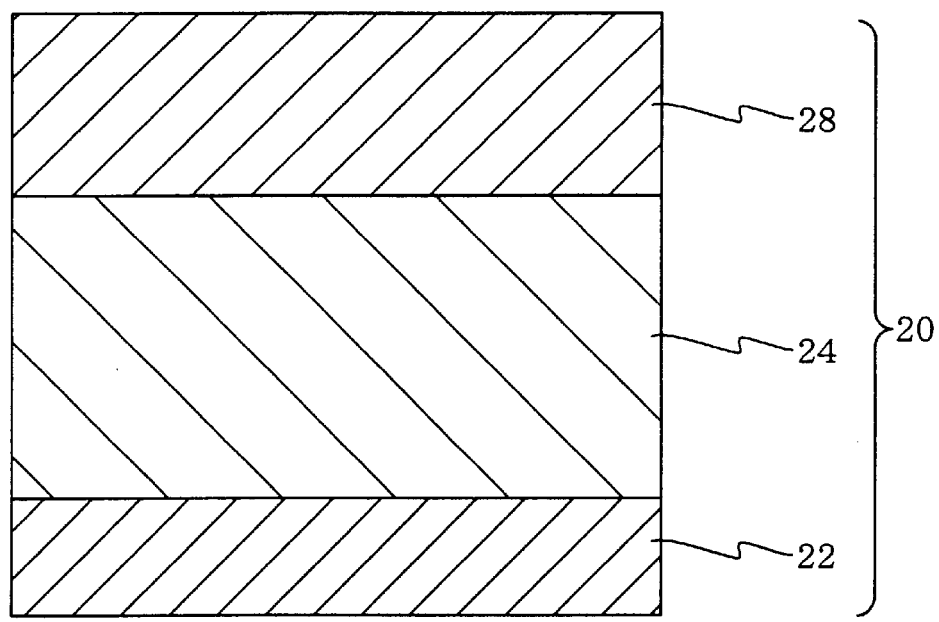
FIG. 1 is a cross sectional view schematically showing a vertical magnetic recording medium according to an embodiment of the present invention.
Figure 3:
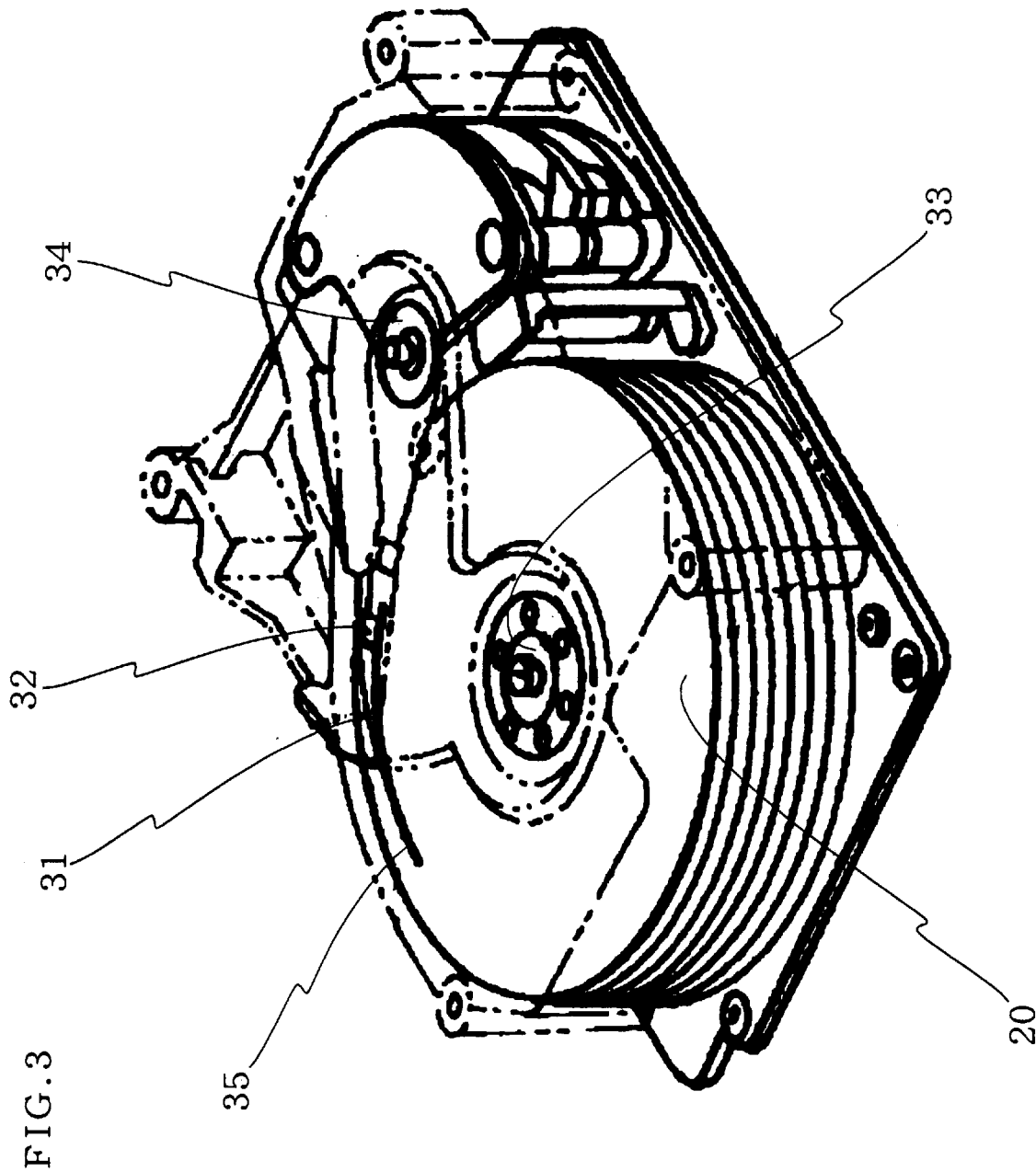
FIG. 3 is a perspective view showing a magnetic disc apparatus according to an embodiment of the present invention.

FIG. 3 shows a magnetic disc apparatus according to an embodiment of the present invention, and FIG. 1 shows a vertical magnetic recording medium according to an embodiment of the present invention mounted on the magnetic disc apparatus.

The magnetic disc apparatus according to the present embodiment comprises a vertical magnetic recording medium 20 supported by a rotary spindle 33; and a slider 32 including a mono-pole/MR composite head 31 or inductive/MR composite head 31 positioned on a recording track 35 of the medium 20 and supported by an actuator 34. The vertical magnetic recording medium 20 includes an undercoat soft magnetic film 24 having no domain wall configuration and a vertical magnetic film 28 that are formed on a substrate 22.

The undercoat soft magnetic film 24 is made from a material having no magnetic domain wall, i.e., FeSiAl film or FeSiAl alloy film, FeTaN film or FeTaN alloy film, or a film with a base material $SiO_2$, C, $Al_2O_3$ having a ferromagnetic material dispersed to obtain a granular thin film. The ferromagnetic material dispersed in the base material of the granular thin film may be Co, CoFe, or the like. Alternatively, it is also possible to prepare the undercoat soft magnetic film by adding an element such as Ta, Zr, Nb, B, or the like to the respective granular thin films. When these are used as the undercoat soft magnetic film, it is possible to avoid problems generated when the undercoat soft magnetic film has a magnetic domain wall configuration. That is, if the undercoat soft magnetic film has a magnetic domain wall configuration, a magnetic field generated by motors used for disc rotation and head positioning contributes with its magnetic field component parallel to the disc surface to easily shift the magnetic domain wall of the undercoat soft magnetic film, demagnetizing the recording magnetization, which results in reduction or disappearance of the output. The present invention provides a solution to this fatal problem for an information recording apparatus.

EXAMPLE

1. Examples A

Figure 2:
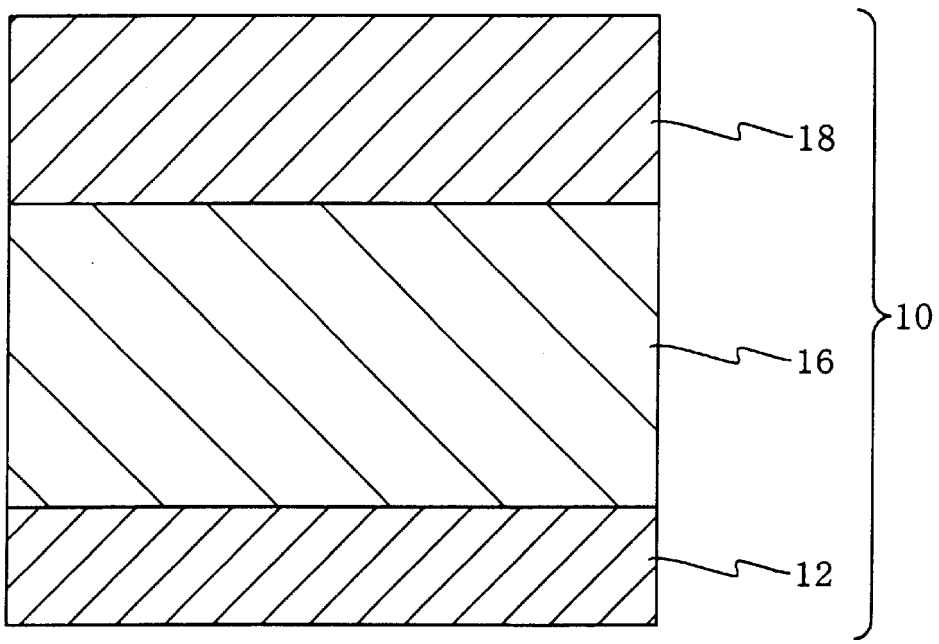
FIG. 2 is a cross sectional view showing a configuration of a vertical magnetic recording medium of Example 1.

An example of the present invention will be detailed below with reference to FIG. 3 and FIG. 2.

A 6-inch FeSiAl target for sputter was used to form an FeSiAl film with various thickness values in a range from 45 nm to 500 nm on a 2.5-inch substrate 12. The film formation conditions were as follows: initial vacuum degree $5 \times 10^{-7}$ mTorr or below, electric power 0.5 kW, argon gas pressure 4 mTorr, and film formation speed 3 nm/sec.

Next, a $Co_{78}Cr_{19}Ta_3$ (at %) target was used to form a $Co_{78}Cr_{19}Ta_3$ film 18 to have a thickness of 100 nm on the respective FeSiAl films at 400 degrees C. of the substrate. Furthermore, a C protection film was formed to have 10 nm thickness thereon.

The medium having 500 nm thickness of the FeSiAl film will be referred to as medium example A2, and the medium having 400 nm thickness of the FeSiAl film will be referred to as Medium example A3. In contrast to this, a medium was prepared by using a NiFe target instead of the FeSiAl target to form a NiFe film of 50 nm thickness, which was then covered with a $Co_{78}Cr_{19}Ta_3$ (at %) film of 10 nm thickness. This will be referred to as a conventional medium example A1.

Magnetic disc apparatuses were constituted by using the medium examples A2, A3, and the conventional example A1 and a mono-pole/MR composite head or inductive/MR head. These apparatuses will be referred as apparatus examples AA2, AA3, and conventional apparatus example AA1.

FIG. 3 shows a configuration of a magnetic disc apparatus according to the present invention. The magnetic disc apparatus of FIG. 3 according to the present invention is constituted by the medium examples A2, A3, the conventional medium example A1 supported by the rotary spindle 33, and the slider 32 including the mono-pole/MR composite head 31 or the inductive/MR composite head 31 positioned on the recording track 35 of the medium 20 and supported by the actuator 34.

Here, the inductive/MR composite head had a recording track width 4 micrometers, a reproduction track width 3 micrometers, a recording gap length 0.4 micrometers, and a reproduction gap length 0.32 micrometers. Moreover, the mono-pole head had a recording track width 4 micrometers, main magnetic pole film thickness 0.4 micrometers, a reproduction track width 3 micrometers, and a reproduction gap length 0.32 micrometers. It should be noted that the recording current was set to 10 mA0p; the sense current, 12 mA; liner velocity 12.7 m/s; and a floating amount 45 nm when measurements were carried out.

In order to check the domain wall configuration of the FeSiAl film, the powder pattern method was used for observation. A fine scar was made on the surface of the FeSiAl film and a bitter liquid (magnetic fluid, magnetic colloid) was applied thereon. The sample was set on an electric magnet for domain wall observation and observed using a metallographic microscope. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the FeSiAl film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples AA2, AA3, and conventional example AA1, so as to compare the reproduction outputs before and after the application of the magnetic field.

Figure 4:
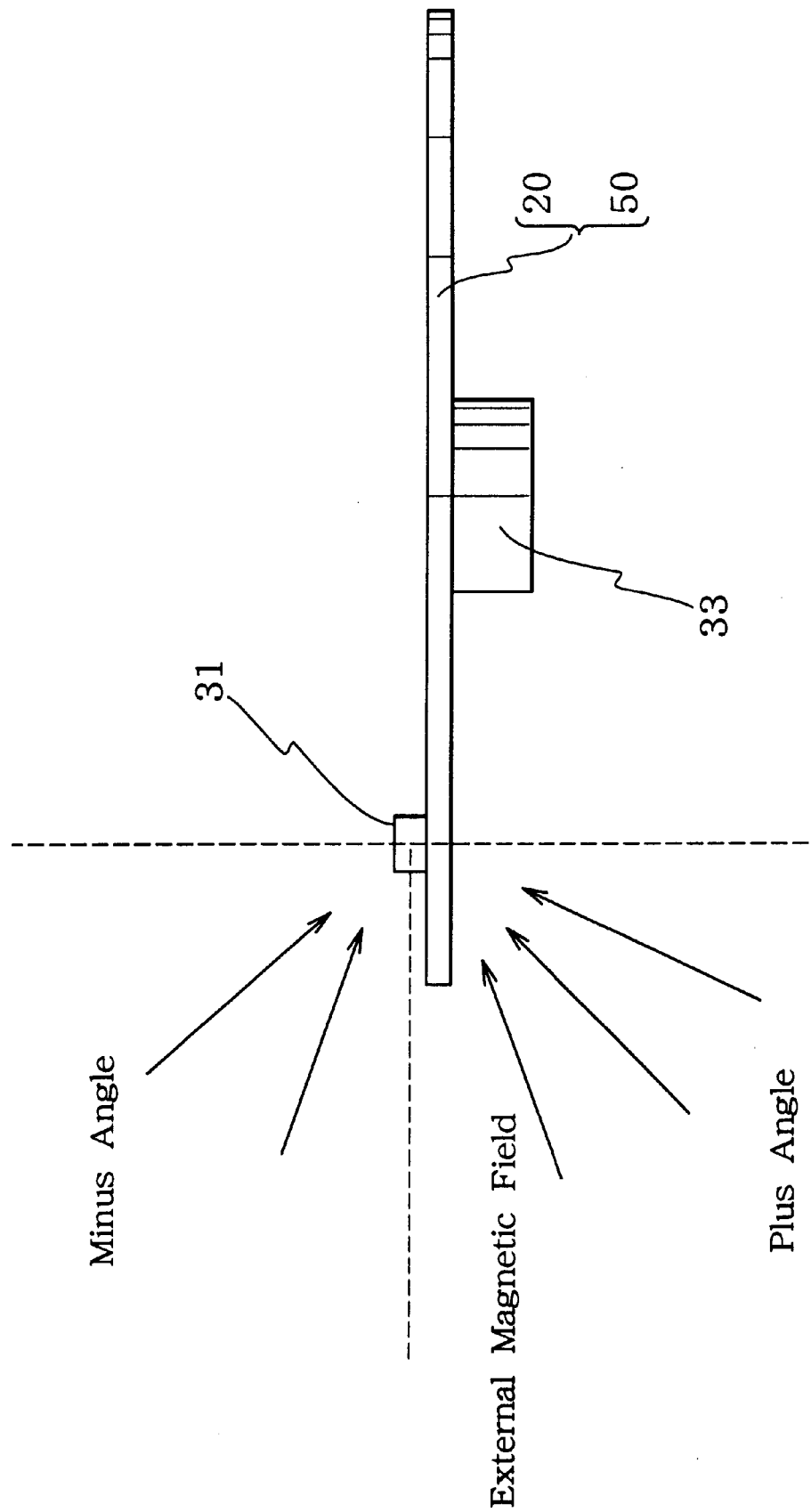
FIG. 4 shows directions of a magnetic field applied to disc medium examples of the present invention.

Here, the direction of the magnetic field applied is defined as a plus angle for the region below the disc and a minus angle for the region above the disc as shown in FIG. 4. The magnetic field was applied in six directions, i.e., 0 degrees (parallel to the disc surface), 30 degrees, 60 degrees, 90 degrees (vertical to the disc lower surface), −30 degrees, and −60 degrees.

Tables 1 to 6 show results of the respective measurements. FIGS. 5 to 10 show the results in graphs.

TABLE 1

| Magnetic Field in Direction of 0 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| AA1 OUTPUT RESIDUE [%] | 12.2 | 11.1 | 10.5 | 10.6 | 11.5 | 11.7 | 11.2 | 10.5 |
| AA2 OUTPUT RESIDUE [%] | 96.8 | 97.6 | 100 | 97.5 | 95.8 | 102 | 100 | 99.4 |
| AA3 OUTPUT RESIDUE [%] | 100 | 97.6 | 96.8 | 101 | 97.5 | 99.1 | 99.5 | 100 |
| MAGNETIC FIELD [Oe] | 20 | 32 | 50 | 70 | 100 | 140 | 200 | 320 | 500 |
| AA1 OUTPUT RESIDUE [%] | 9.62 | 9.41 | 9.62 | 8.64 | 5.77 | 5.68 | 5.15 | 5.01 | 4.94 |

TABLE 1-continued

Magnetic Field in Direction of 0 degrees

| | | | | | | | | |
|---|---|---|---|---|---|---|---|---|
| AA2 OUTPUT RESIDUE [%] | 98.6 | 93.2 | 87.5 | 79.6 | 65.4 | 42.5 | 25.3 | 20.1 | 15.8 |
| AA3 OUTPUT RESIDUE [%] | 102 | 95.8 | 97.8 | 94.4 | 92.5 | 86.4 | 76.2 | 60.1 | 35.4 |

TABLE 2

Magnetic Field in Direction of 30 degrees

| MAGNETIC FIELD [Oe] | 1 | 1.4 | 2 | 3.2 | 5 | 7 | 10 | 14 |
|---|---|---|---|---|---|---|---|---|
| AA1 OUTPUT RESIDUE [%] | 30.4 | 28.5 | 25.6 | 21.7 | 18.9 | 16.4 | 14.5 | 13.8 |
| AA2 OUTPUT RESIDUE [%] | 97.8 | 96.5 | 98.6 | 97.5 | 99.3 | 104 | 100 | 101 |
| AA3 OUTPUT RESIDUE [%] | 98.6 | 97.6 | 96.8 | 95.6 | 99.3 | 97.4 | 96.8 | 98.6 |

| MAGNETIC FIELD [Oe] | 20 | 32 | 50 | 70 | 100 | 140 | 200 | 320 | 500 |
|---|---|---|---|---|---|---|---|---|---|
| AA1 OUTPUT RESIDUE [%] | 12.6 | 11.4 | 9.68 | 8.65 | 6.46 | 5.61 | 5.17 | 5.68 | 4.97 |
| AA2 OUTPUT RESIDUE [%] | 98.4 | 96.2 | 88.3 | 80.2 | 66.4 | 45.6 | 27.8 | 22.7 | 13.9 |
| AA3 OUTPUT RESIDUE [%] | 97.8 | 96.2 | 98.5 | 97.2 | 94.2 | 88.5 | 80.6 | 60.1 | 35.8 |

TABLE 3

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| AA1 OUTPUT RESIDUE [%] | 70.1 | 68.2 | 65.4 | 60.5 | 55.6 | 54.1 | 52.8 | 50.6 |
| AA2 OUTPUT RESIDUE [%] | 98.5 | 97.4 | 98.6 | 97.4 | 102 | 103 | 100 | 98.6 |
| AA3 OUTPUT RESIDUE [%] | 98.5 | 97.8 | 96.8 | 95.8 | 97.8 | 102 | 102 | 98.7 |

| MAGNETIC FIELD [Oe] | 20 | 32 | 50 | 70 | 100 | 140 | 200 | 320 | 500 |
|---|---|---|---|---|---|---|---|---|---|
| AA1 OUTPUT RESIDUE [%] | 49.7 | 46.4 | 40.8 | 38.4 | 36.6 | 30.7 | 26.8 | 22.7 | 15.9 |
| AA2 OUTPUT RESIDUE [%] | 98.3 | 99.4 | 97.8 | 94.2 | 90.4 | 85.2 | 75.3 | 65.5 | 36.9 |
| AA3 OUTPUT RESIDUE [%] | 98.6 | 97.4 | 99.3 | 98.2 | 96.8 | 92.3 | 90.6 | 82.4 | 75.4 |

TABLE 4

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| AA1 OUTPUT RESIDUE [%] | 96.2 | 93.3 | 87.8 | 79.4 | 65.8 | 44.0 | 30.4 | 22.0 |
| AA2 OUTPUT RESIDUE [%] | 100 | 102 | 95.8 | 96.8 | 96.5 | 97.8 | 98.5 | 97.5 |
| AA3 OUTPUT RESIDUE [%] | 97.8 | 97.6 | 96.3 | 99.2 | 95.8 | 100 | 100 | 102 |

| MAGNETIC FIELD [Oe] | 20 | 32 | 50 | 70 | 100 | 140 | 200 | 320 | 500 |
|---|---|---|---|---|---|---|---|---|---|
| AA1 OUTPUT RESIDUE [%] | 19.3 | 16.5 | 12.2 | 8.64 | 5.72 | 5.61 | 5.15 | 5.05 | 4.97 |
| AA2 OUTPUT RESIDUE [%] | 99.2 | 97.2 | 96.8 | 93.2 | 87.2 | 79.6 | 65.4 | 42.5 | 25.3 |
| AA3 OUTPUT RESIDUE [%] | 98.4 | 96.8 | 97.6 | 97.8 | 98.3 | 94.4 | 92.5 | 86.4 | 76.2 |

TABLE 5

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| AA1 OUTPUT RESIDUE [%] | 50.1 | 48.6 | 45.5 | 41.3 | 38.4 | 36.1 | 34.0 | 33.8 |
| AA2 OUTPUT RESIDUE [%] | 99.2 | 99.4 | 97.2 | 96.8 | 95.6 | 102 | 101 | 100 |
| AA3 OUTPUT RESIDUE [%] | 98.7 | 96.5 | 99.8 | 101 | 95.9 | 96.8 | 97.6 | 98.2 |

| MAGNETIC FIELD [Oe] | 20 | 32 | 50 | 70 | 100 | 140 | 200 | 320 | 500 |
|---|---|---|---|---|---|---|---|---|---|
| AA1 OUTPUT RESIDUE [%] | 32.4 | 31.4 | 27.2 | 25.9 | 23.1 | 20.7 | 16.2 | 12.8 | 4.91 |
| AA2 OUTPUT RESIDUE [%] | 97.5 | 98.5 | 99.7 | 81.2 | 67.3 | 46.4 | 32.4 | 25.5 | 20.6 |
| AA3 OUTPUT RESIDUE [%] | 97.6 | 98.1 | 99.2 | 96.7 | 94.4 | 90.2 | 82.4 | 65.8 | 35.4 |

TABLE 6

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| AA1 OUTPUT RESIDUE [%] | 80.5 | 78.6 | 75.5 | 70.6 | 65.1 | 62.0 | 58.0 | 56.4 |
| AA2 OUTPUT RESIDUE [%] | 102 | 101 | 96.5 | 98.6 | 97.4 | 96.8 | 97.8 | 99.2 |
| AA3 OUTPUT RESIDUE [%] | 98.4 | 96.5 | 97.8 | 99.5 | 102 | 102 | 100 | 97.5 |

| MAGNETIC FIELD [Oe] | 20 | 32 | 50 | 70 | 100 | 140 | 200 | 320 | 500 |
|---|---|---|---|---|---|---|---|---|---|
| AA1 OUTPUT RESIDUE [%] | 49.5 | 44.8 | 40.2 | 36.3 | 35.1 | 30.2 | 26.4 | 22.2 | 15.7 |
| AA2 OUTPUT RESIDUE [%] | 98.2 | 97.1 | 96.8 | 94.2 | 90.1 | 85.5 | 75.1 | 65.7 | 36.8 |
| AA3 OUTPUT RESIDUE [%] | 96.5 | 98.5 | 97.6 | 98.4 | 96.5 | 94.6 | 90.2 | 82.3 | 75.1 |

Here, the reproduction output before application of the magnetic field is shown in percentage with respect to the reproduction output after application of the magnetic field.

Figure 5:
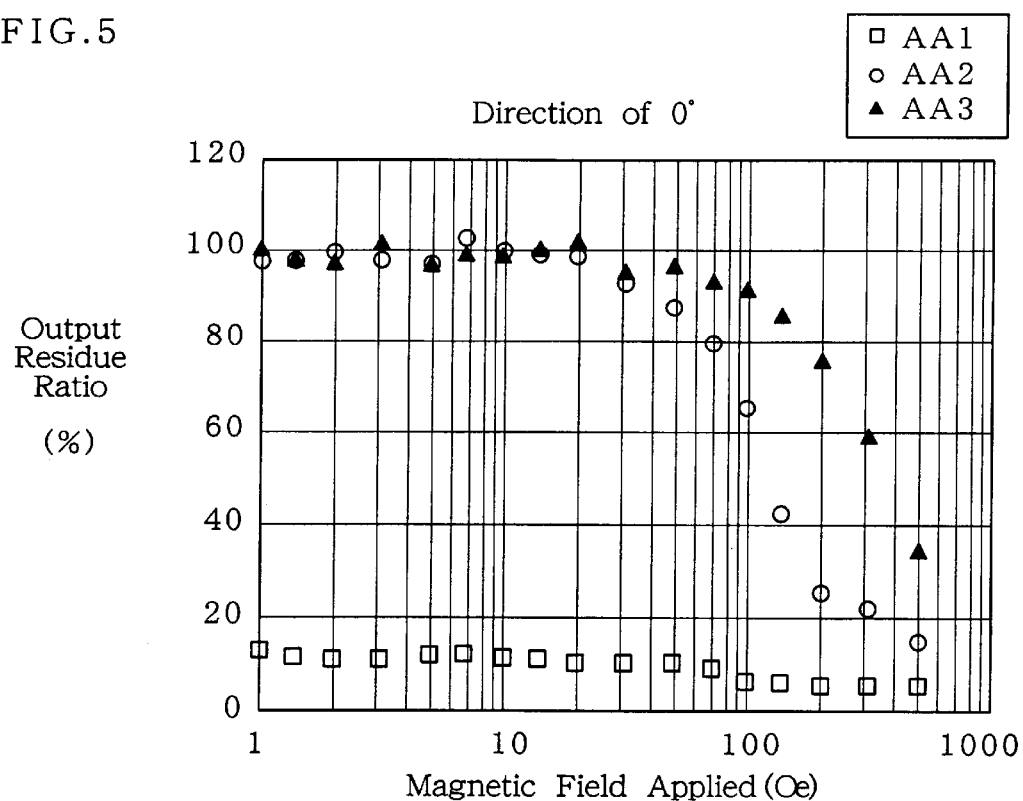
FIG. 5 graphically shows a reproduction output residue after application of an external magnetic field in the examples A.
Figure 6:
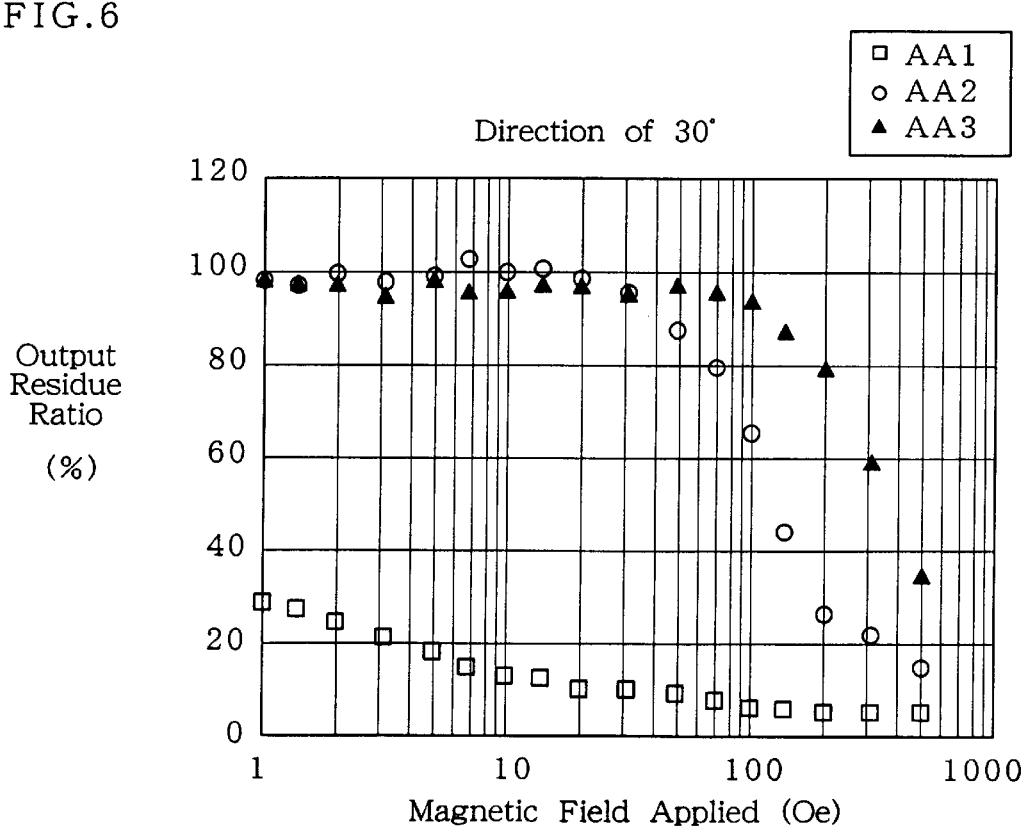
FIG. 6 graphically shows a reproduction output residue after application of an external magnetic field in the examples A.
Figure 7:
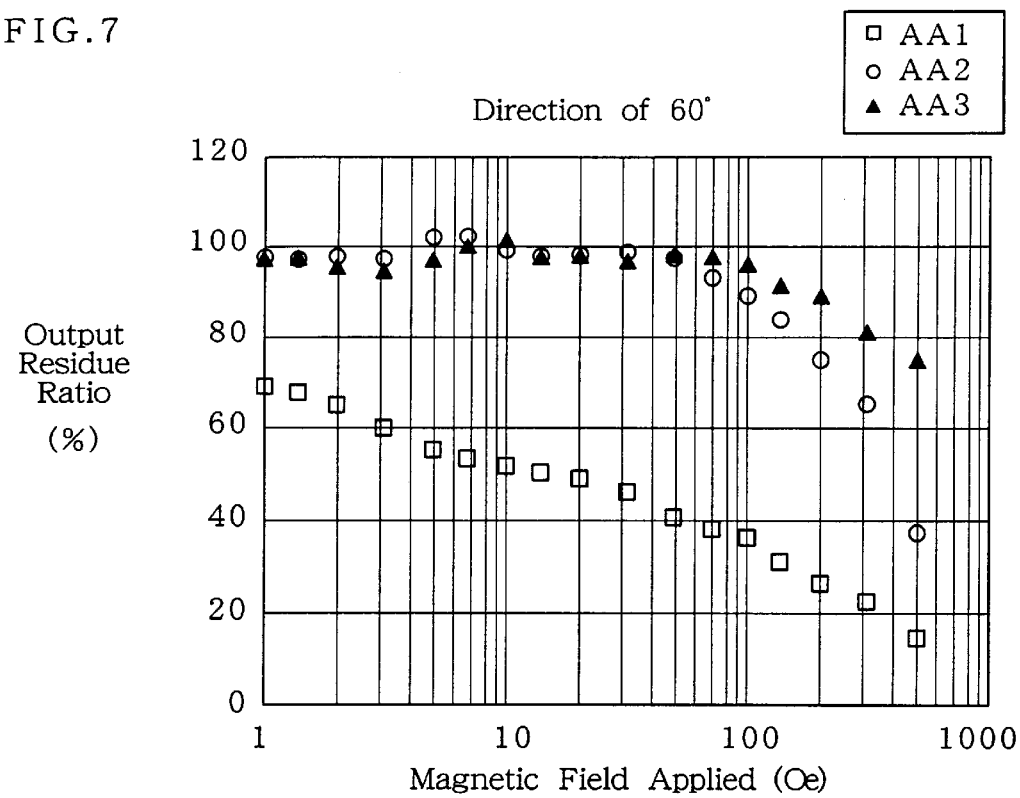
FIG. 7 graphically shows a reproduction output residue after application of an external magnetic field in the examples A.
Figure 8:
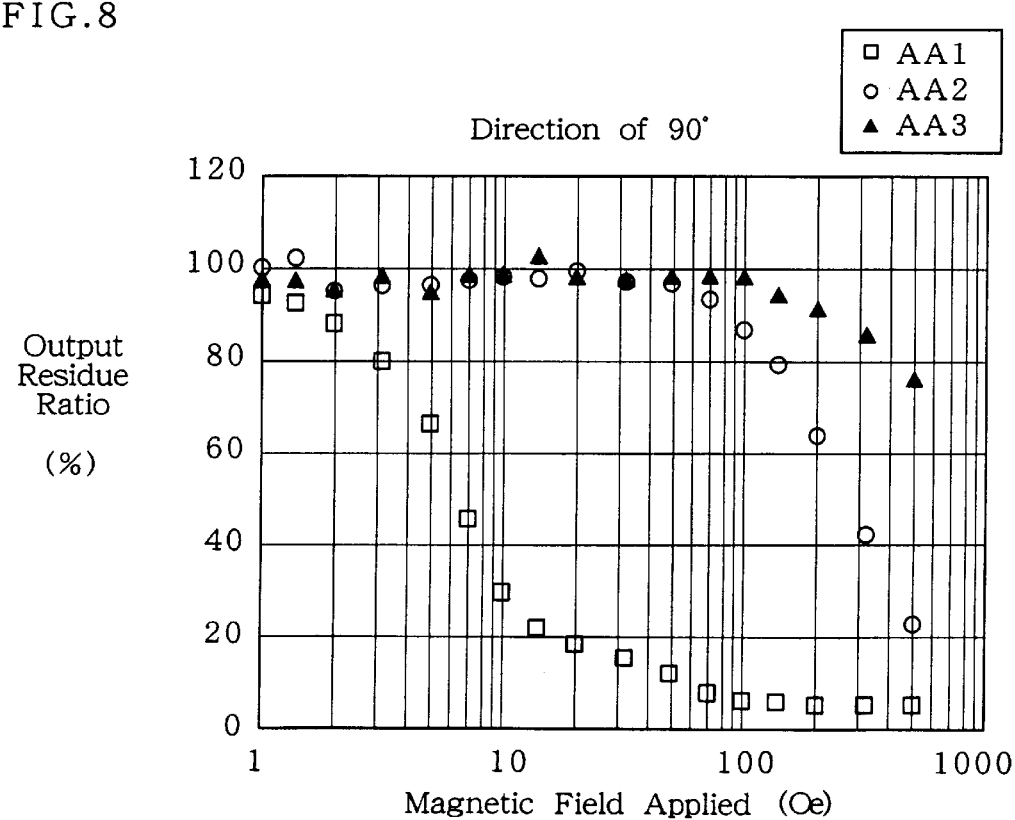
FIG. 8 graphically shows a reproduction output residue after application of an external magnetic field in the examples A.
Figure 9:
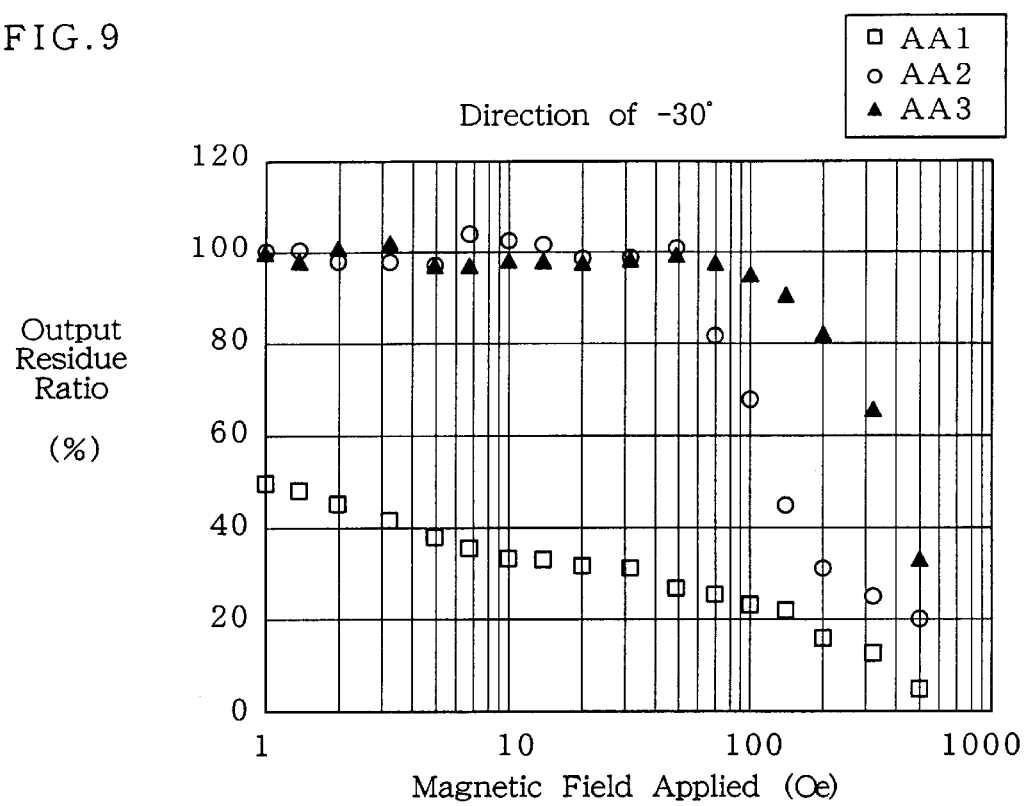
FIG. 9 graphically shows a reproduction output residue after application of an external magnetic field in the examples A.
Figure 10:
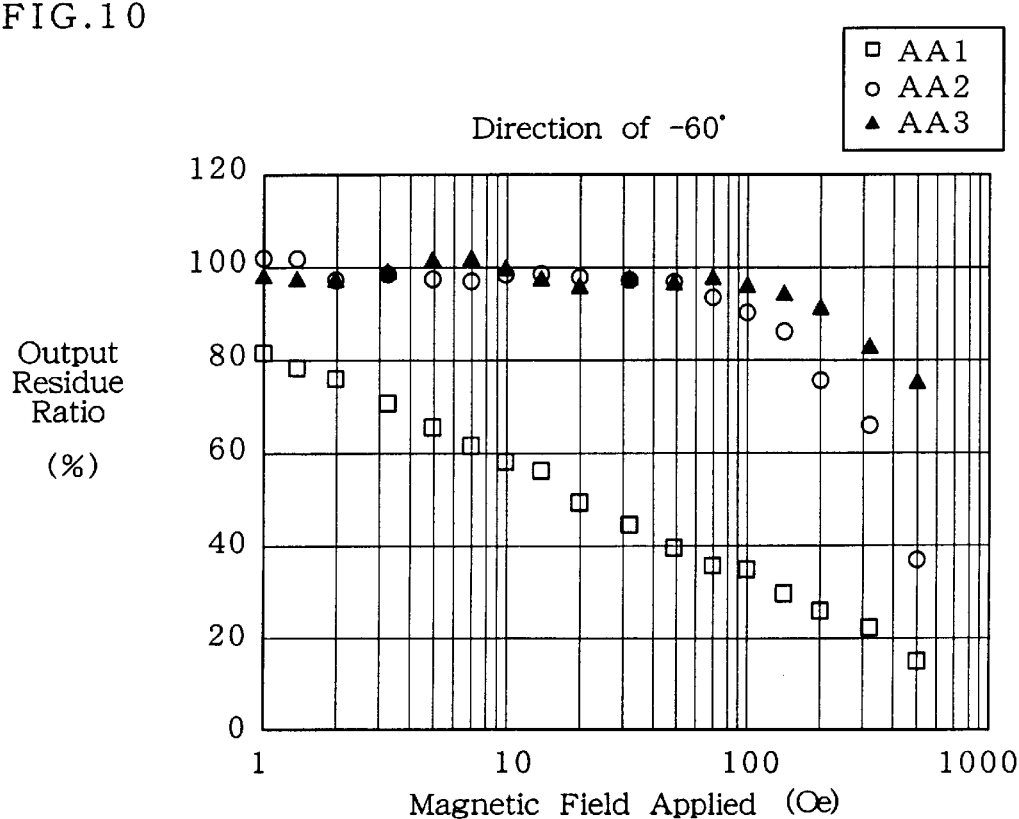
FIG. 10 graphically shows a reproduction output residue after application of an external magnetic field in the examples A.

As is clear from Tables 1 and FIG. 5, the conventional apparatus example AA1 has an output stability significantly lowered by the magnetic field applied in parallel to the disc surface. When a magnetic field of 1 Oe was applied, more than 80% of the output was already lost. In contrast to this, in the apparatus example AA2 according to the present invention, the reproduction output fluctuation was suppressed within 5% for the magnetic field of 20 Oe or below. Similarly, in the apparatus example AA3 according to the present invention, the reproduction output fluctuation was suppressed within 5% for the magnetic field of 50 Oe or below. Thus, the apparatus examples according to the present invention exhibited a higher output stability than the conventional apparatus example AA1. This is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses the undercoat soft magnetic film FeSiAl whose magnetization does not depend on the domain wall shift. Accordingly, even if a magnetic field is applied, the magnetic flux will not be easily concentrated to the mono-pole head main magnetic pole, which may cause reduction in the output.

Figure 11:
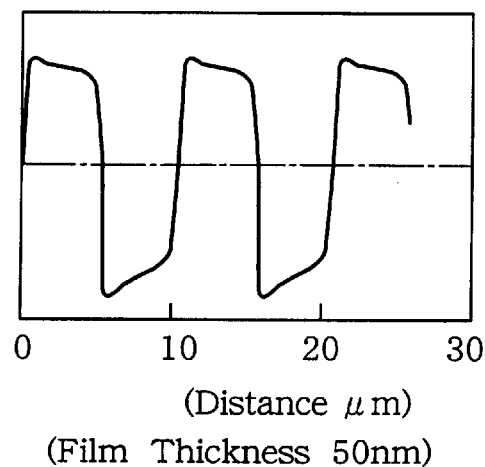
FIG. 11 shows a reproduction waveform obtained by the examples of the present invention.
Figure 12:
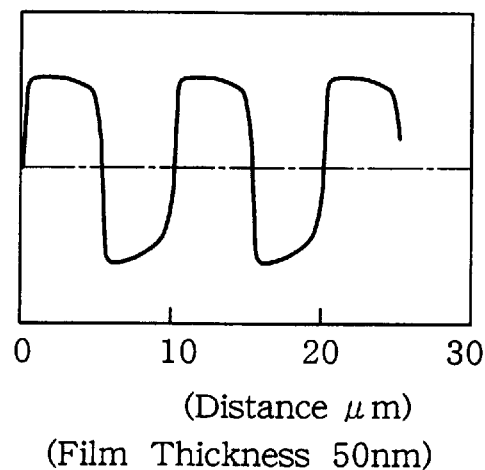
FIG. 12 shows a reproduction waveform obtained by the examples of the present invention.
Figure 13:
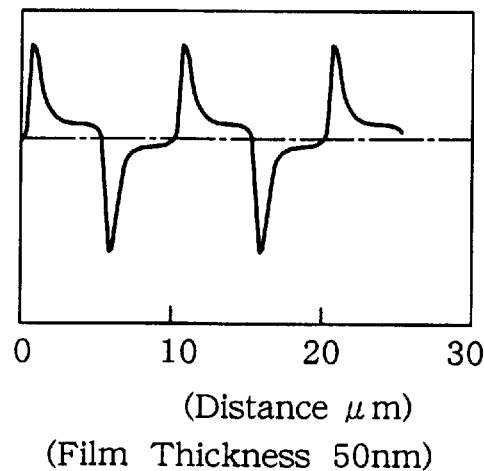
FIG. 13 shows a reproduction waveform obtained by the examples of the present invention.

Moreover, as can be understood from Table 1 and FIG. 5, the apparatus example AA3 can further suppress the output reduction than the apparatus example AA2. This is because the medium example A2 uses the undercoat soft magnetic film FeSiAl having a thickness smaller than that of the medium example A3, so that less magnetic flux can pass through. Accordingly, in the medium example A3 compared to the medium example A2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the FeSiAl film having a thickness of 400 nm or below, it was possible to obtain a reproduction output residue ratio identical to that of the apparatus example AA3. However, when the film thickness was 50 nm or below, the rectangular wave of the reproduction waveform was distorted, causing a problem as the backing layer. Therefore, it is impossible to reduce the film thickness without limitation (FIG. 11 to FIG. 13).

Tables 2 to 6 show output reduction ratio obtained when the magnetic field was applied at the other angles. FIG. 6 to 10 graphically show the check results.

As can be seen from these results, when a magnetic field was applied to the conventional apparatus example AA1, as the magnetic component of horizontal direction increased, the output reduction amount was increased. In any of the cases, the output was already reduced by a magnetic field of 1 Oe. In contrast to this, in the apparatus examples of the present invention AA2 and AA3, it was possible to obtain a higher output stability than the conventional apparatus example AA1.

Moreover, in the apparatus example AA3 of the present invention, no output reduction was caused up to about 70 Oe in the direction of 30 degrees and up to 100 Oe in the direction of 60 degrees and 90 degrees. That is, it is possible to obtain a by far higher output stability against a magnetic field than the conventional apparatus example AA1.

Moreover, similar results were obtained for the apparatus using the inductive/MR composite head. In this case also, the apparatus example of the present invention exhibited a by far higher output stability than the conventional apparatus example AA1.

Thus, the apparatus example AA3 of the present invention can provide a magnetic disc apparatus having a high output stability, enabling to realize a high recording density.

2. Examples B

Medium examples were prepared in the same way as in Example A, except for that the FeSiAl target was replaced by FeSiAlRuTi target. The medium example having the FeSiAlRuTi film thickness of 500 nm will be referred to as medium example B2, and the medium example having the FeSiAlRuTi film thickness of 400 nm will be referred to as medium example B3.

The medium examples B2 and B3 and the conventional medium example A1 were used in combination with the mono-pole/MR composite head or the inductive/MR composite head to constitute magnetic disc apparatuses, which will be referred to as BB2, BB3, and AA1, respectively.

The conditions of the head mounted and the recording conditions were same as in Examples A.

In order to check the domain wall configuration of the FeSiAlRuTi film, the powder pattern method was used for observation in the same way as in Examples AA As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the FeSiAlRuTi film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples BB2, BB3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

The check results obtained show the same tendency as in Examples A.

mono-pole head main magnetic pole, demagnetizing the recording magnetization, thus reducing the output. In contrast to this, the medium example of the present invention used in the apparatus example of the present invention uses the undercoat soft magnetic film FeSiAlRuTi whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 7, the apparatus example BB3 can further suppress the output reduction than the apparatus example BB2. This is because the medium example B2 uses the undercoat soft magnetic film FeSiAlRuTi having a thickness smaller than that of the medium example B3, so that less magnetic flux can pass

TABLE 7

| Magnetic Field applied in Direction of 0 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| BB1 OUTPUT RESIDUE [%] | 11.2 | 12.1 | 10.2 | 10.8 | 11.3 | 11.4 | 11 | 10.5 |
| BB2 OUTPUT RESIDUE [%] | 96.9 | 97.5 | 99.5 | 97.4 | 95.6 | 98.7 | 101 | 99.5 |
| BB3 OUTPUT RESIDUE [%] | 98.2 | 97.4 | 96.2 | 97.3 | 97.7 | 99.0 | 99.4 | 100 |
| MAGNETIC FIELD [Oe] | 20 | 32 | 50 | 70 | 100 | 140 | 200 | 320 | 500 |
| BB1 OUTPUT RESIDUE [%] | 9.77 | 9.65 | 9.61 | 8.79 | 5.72 | 5.7 | 5.65 | 5.33 | 5.24 |
| BB2 OUTPUT RESIDUE [%] | 98.9 | 93.1 | 87.4 | 79.5 | 65.7 | 42.1 | 25.2 | 19.8 | 16.8 |
| BB3 OUTPUT RESIDUE [%] | 99.9 | 95.2 | 97.4 | 94.2 | 92.5 | 86.7 | 76.6 | 60.4 | 39.4 |

As shown in Table 7, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example BB2 according to the present invention, the reproduction output fluctuation was suppressed within 5% for the magnetic field of 20 Oe or below. Similarly, in the apparatus example BB3 according to the present invention, the reproduction output fluctuation was suppressed within 5% for the magnetic field of 50 Oe or below. Thus, the apparatus examples according to the present invention exhibited a higher output stability than the conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the through. Accordingly, in the medium example B3 compared to the medium example B2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the FeSiAlRuTi film having a thickness of 400 nm or below, it was possible to obtain a reproduction output residue ratio identical to that of the apparatus example BB3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 8 to 12 show output reduction ratio obtained when the magnetic field was applied at the other angles.

TABLE 8

| Magnetic Field in Direction of 30 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| BB1 OUTPUT RESIDUE [%] | 30.2 | 28.5 | 25.7 | 21.1 | 18.4 | 16.9 | 14.7 | 13.5 |
| BB2 OUTPUT RESIDUE [%] | 97.4 | 96.6 | 97.6 | 97.8 | 99.2 | 96.3 | 100 | 103 |
| BB3 OUTPUT RESIDUE [%] | 98.9 | 97.1 | 96.9 | 95.4 | 99.0 | 97.8 | 96.7 | 98.6 |
| MAGNETIC FIELD [Oe] | 20 | 32 | 50 | 70 | 100 | 140 | 200 | 320 | 500 |
| BB1 OUTPUT RESIDUE [%] | 12.9 | 11.0 | 10.2 | 8.62 | 6.66 | 5.59 | 5.48 | 5.2 | 4.89 |
| BB2 OUTPUT RESIDUE [%] | 99.3 | 96.1 | 88.6 | 80.0 | 66.8 | 45.2 | 26.9 | 23.8 | 13.2 |
| BB3 OUTPUT RESIDUE [%] | 97.2 | 96.7 | 98.8 | 97.4 | 94.0 | 88.9 | 80.3 | 60.0 | 34.2 |

TABLE 9

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| BB1 OUTPUT RESIDUE [%] | 70.9 | 68.7 | 65 | 60.5 | 55.3 | 54.7 | 51.8 | 49.6 |
| BB2 OUTPUT RESIDUE [%] | 99.2 | 99.3 | 97.8 | 97.0 | 96.8 | 100 | 100 | 98.4 |
| BB3 OUTPUT RESIDUE [%] | 97.2 | 97.4 | 96.4 | 95.4 | 97.6 | 98.4 | 97.2 | 98.4 |

| MAGNETIC FIELD [Oe] | 20 | 32 | 50 | 70 | 100 | 140 | 200 | 320 | 500 |
|---|---|---|---|---|---|---|---|---|---|
| BB1 OUTPUT RESIDUE [%] | 48.5 | 43.5 | 40.7 | 40.2 | 38.2 | 34.2 | 29.7 | 21.7 | 20.8 |
| BB2 OUTPUT RESIDUE [%] | 98.0 | 99.9 | 97.5 | 94.3 | 89.6 | 85.1 | 76.8 | 68.2 | 33.1 |
| BB3 OUTPUT RESIDUE [%] | 98.3 | 97.9 | 99 | 97.2 | 96.2 | 89.4 | 90.2 | 83.1 | 72.4 |

TABLE 10

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| BB1 OUTPUT RESIDUE [%] | 96.0 | 93.8 | 87.4 | 78.2 | 70.3 | 62.3 | 30.4 | 28.5 |
| BB2 OUTPUT RESIDUE [%] | 99.2 | 97.5 | 95.4 | 96.7 | 96.4 | 97.9 | 96.8 | 97.3 |
| BB3 OUTPUT RESIDUE [%] | 97.4 | 97.8 | 96.8 | 99.8 | 95.8 | 100 | 97.2 | 97.6 |

| MAGNETIC FIELD [Oe] | 20 | 32 | 50 | 70 | 100 | 140 | 200 | 320 | 500 |
|---|---|---|---|---|---|---|---|---|---|
| BB1 OUTPUT RESIDUE [%] | 20.1 | 15.3 | 11.7 | 8.65 | 5.7 | 5.69 | 5.22 | 5.31 | 4.84 |
| BB2 OUTPUT RESIDUE [%] | 99.1 | 96.8 | 96.8 | 93.2 | 87.2 | 79.5 | 68.4 | 42.3 | 25.3 |
| BB3 OUTPUT RESIDUE [%] | 98.5 | 96.7 | 97.7 | 97.6 | 98.2 | 94.0 | 92.0 | 86.0 | 76.3 |

TABLE 11

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| BB1 OUTPUT RESIDUE [%] | 50.2 | 48.7 | 45.4 | 40.6 | 38.8 | 37.7 | 34.2 | 33.6 |
| BB2 OUTPUT RESIDUE [%] | 99.3 | 99.4 | 98.4 | 96.9 | 97.2 | 98.6 | 96.7 | 100 |
| BB3 OUTPUT RESIDUE [%] | 98.8 | 96.6 | 99.2 | 97.1 | 96.8 | 96.7 | 98.4 | 98.3 |

| MAGNETIC FIELD [Oe] | 20 | 32 | 50 | 70 | 100 | 140 | 200 | 320 | 500 |
|---|---|---|---|---|---|---|---|---|---|
| BB1 OUTPUT RESIDUE [%] | 31.5 | 30.6 | 28.8 | 26.4 | 22.8 | 21.9 | 15.4 | 16.7 | 8.81 |
| BB2 OUTPUT RESIDUE [%] | 97.4 | 98.8 | 99.2 | 81.6 | 69.8 | 47.2 | 39.8 | 27.7 | 22.1 |
| BB3 OUTPUT RESIDUE [%] | 97.6 | 98 | 97.4 | 98.2 | 94.2 | 90.9 | 87.4 | 66.6 | 38.1 |

TABLE 12

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| BB1 OUTPUT RESIDUE [%] | 79.3 | 78.6 | 75.4 | 72.4 | 65.9 | 62.4 | 58.7 | 56.7 |
| BB2 OUTPUT RESIDUE [%] | 98.4 | 100 | 96.5 | 98.6 | 97.4 | 96.4 | 97.7 | 99.6 |
| BB3 OUTPUT RESIDUE [%] | 98.4 | 96.6 | 97.6 | 99.7 | 101 | 97.6 | 98.4 | 97.6 |

| MAGNETIC FIELD [Oe] | 20 | 32 | 50 | 70 | 100 | 140 | 200 | 320 | 500 |
|---|---|---|---|---|---|---|---|---|---|
| BB1 OUTPUT RESIDUE [%] | 47.5 | 44.6 | 40.5 | 36.9 | 35.7 | 30.2 | 27.8 | 21.6 | 17.7 |
| BB2 OUTPUT RESIDUE [%] | 98.6 | 96.2 | 96.9 | 94 | 90.8 | 85.7 | 75.9 | 65.3 | 36.4 |
| BB3 OUTPUT RESIDUE [%] | 96.2 | 98.3 | 97.7 | 98.2 | 96.9 | 94.1 | 89.4 | 82.6 | 75.7 |

As can be seen from these results, when a magnetic field was applied to the conventional apparatus example AA1, as the magnetic component of horizontal direction increased, the output reduction amount was increased. In any of the cases, the output was already reduced by a magnetic field of 1 Oe. In contrast to this, in the apparatus examples of the present invention BB2 and BB3, it was possible to obtain a higher output stability than the conventional apparatus example AA1.

Moreover, in the apparatus example BB3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example BB3 of the present invention can provide a magnetic disc apparatus having a high output stability, enabling to realize a high recording density.

3. Examples C

Medium examples were prepared in the same way as in Examples A, except for that the FeSiAl target was replaced by FeTaN target. The medium examples having the FeTaN film thickness of 500 nm and 400 nm will be referred to as medium examples C2 and C3, respectively.

The medium examples C2 and C3 and the conventional medium example A1 were used in combination with the mono-pole/MR composite head or the inductive/MR composite head to constitute magnetic disc apparatuses, which will be referred to as CC2, CC3, and AA1, respectively.

The conditions of the head mounted and the recording conditions were same as in Examples A.

In order to check the domain wall configuration of the FeTaN film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the FetaN film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples CC2, CC3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

Tables 13 to 18 show results of the check, and FIGS. 13 to 18 show the results graphically.

TABLE 13

Magnetic Field applied in Direction of 0 degrees

| MAGNETIC FIELD [Oe] | 1 | 1.4 | 2 | 3.2 | 5 | 7 | 10 | 14 |
|---|---|---|---|---|---|---|---|---|
| CC2 OUTPUT RESIDUE [%] | 98.5 | 101 | 102 | 97.5 | 96.8 | 98.9 | 98.6 | 97.5 |
| CC3 OUTPUT RESIDUE [%] | 96.5 | 97.4 | 98.5 | 99.5 | 97.6 | 99.6 | 100 | 98.5 |
| MAGNETIC FIELD [Oe] | 20 | 32 | 50 | 70 | 100 | 140 | 200 | 320 | 500 |
| CC2 OUTPUT RESIDUE [%] | 98.6 | 95.6 | 85.2 | 75.4 | 62.5 | 45.6 | 30.7 | 20.8 | 15.1 |
| CC3 OUTPUT RESIDUE [%] | 97.4 | 96.2 | 98.2 | 94.3 | 90.2 | 80 | 70.8 | 55.4 | 35.6 |

TABLE 14

Magnetic Field in Direction of 30 degrees

| MAGNETIC FIELD [Oe] | 1 | 1.4 | 2 | 3.2 | 5 | 7 | 10 | 14 |
|---|---|---|---|---|---|---|---|---|
| CC2 OUTPUT RESIDUE [%] | 97.8 | 96.5 | 98.6 | 97.5 | 99.3 | 104 | 101 | 101 |
| CC3 OUTPUT RESIDUE [%] | 98.6 | 98.5 | 99.5 | 97.6 | 99.3 | 97.5 | 96.8 | 102 |
| MAGNETIC FIELD [Oe] | 20 | 32 | 50 | 70 | 100 | 140 | 200 | 320 | 500 |
| CC2 OUTPUT RESIDUE [%] | 98.4 | 96.2 | 88.3 | 80.2 | 66.4 | 45.6 | 27.8 | 22.7 | 13.9 |
| CC3 OUTPUT RESIDUE [%] | 97.8 | 96.2 | 98.5 | 97.2 | 94.2 | 88.5 | 80.6 | 60.1 | 35.8 |

TABLE 15

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| CC2 OUTPUT RESIDUE [%] | 98.5 | 97.4 | 101 | 102 | 97.5 | 103 | 100 | 98.6 |
| CC3 OUTPUT RESIDUE [%] | 98.5 | 102 | 98.7 | 97.6 | 96.8 | 101 | 102 | 98.7 |

TABLE 15-continued

Magnetic Field in Direction of 60 degrees

| MAGNETIC FIELD [Oe] | 20 | 32 | 50 | 70 | 100 | 140 | 200 | 320 | 500 |
|---|---|---|---|---|---|---|---|---|---|
| CC2 OUTPUT RESIDUE [%] | 98.3 | 99.4 | 97.8 | 94.2 | 89.2 | 85.1 | 75.1 | 65.4 | 36.8 |
| CC3 OUTPUT RESIDUE [%] | 98.6 | 97.4 | 99.3 | 98.2 | 96.8 | 92.3 | 90.7 | 82.2 | 75.1 |

TABLE 16

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| CC2 OUTPUT RESIDUE [%] | 101 | 102 | 97.5 | 96.8 | 102 | 103 | 100 | 98.6 |
| CC3 OUTPUT RESIDUE [%] | 98.5 | 97.8 | 97.5 | 96.8 | 102 | 101 | 102 | 98.7 |

| MAGNETIC FIELD [Oe] | 20 | 32 | 50 | 70 | 100 | 140 | 200 | 320 | 500 |
|---|---|---|---|---|---|---|---|---|---|
| CC2 OUTPUT RESIDUE [%] | 96.5 | 98.6 | 97.8 | 94.1 | 90.8 | 85.6 | 75.4 | 65.5 | 36.4 |
| CC3 OUTPUT RESIDUE [%] | 97.6 | 96.8 | 95.6 | 98.2 | 96.8 | 94.5 | 90.6 | 82.4 | 75.4 |

TABLE 17

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| CC2 OUTPUT RESIDUE [%] | 99.2 | 99.4 | 98.6 | 97.5 | 99.3 | 104 | 101 | 100 |
| CC3 OUTPUT RESIDUE [%] | 98.7 | 96.5 | 99.8 | 98.5 | 97.8 | 96.8 | 97.6 | 98.2 |

| MAGNETIC FIELD [Oe] | 20 | 32 | 50 | 70 | 100 | 140 | 200 | 320 | 500 |
|---|---|---|---|---|---|---|---|---|---|
| CC2 OUTPUT RESIDUE [%] | 97.5 | 98.5 | 99.7 | 81.2 | 67.3 | 46.4 | 32.4 | 25.5 | 20.6 |
| CC3 OUTPUT RESIDUE [%] | 97.6 | 98.1 | 99.2 | 96.7 | 94.4 | 90.2 | 82.4 | 65.8 | 35 4 |

TABLE 18

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| CC2 OUTPUT RESIDUE [%] | 102 | 101 | 99.4 | 98.6 | 97.5 | 99.3 | 97.8 | 99.2 |
| CC3 OUTPUT RESIDUE [%] | 98.4 | 102 | 97.5 | 96.8 | 102 | 97.8 | 97.5 | 96.8 |

| MAGNETIC FIELD [Oe] | 20 | 32 | 50 | 70 | 100 | 140 | 200 | 320 | 500 |
|---|---|---|---|---|---|---|---|---|---|
| CC2 OUTPUT RESIDUE [%] | 98.2 | 97.1 | 96.8 | 94.1 | 90.6 | 85.4 | 75.6 | 65.8 | 36.2 |
| CC3 OUTPUT RESIDUE [%] | 96.5 | 98.5 | 97.6 | 98.4 | 96.5 | 94.2 | 90.8 | 82.5 | 75.6 |

Figure 14:
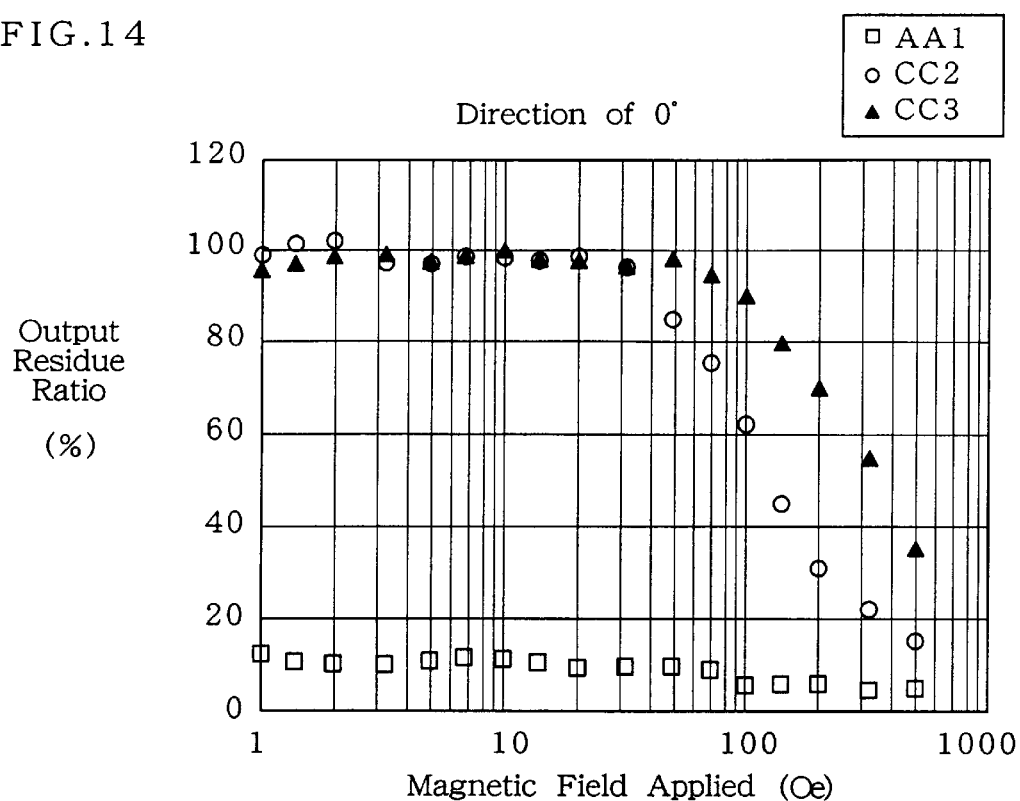
FIG. 14 graphically shows a reproduction output residue after application of an external magnetic field in the examples C.
Figure 15:
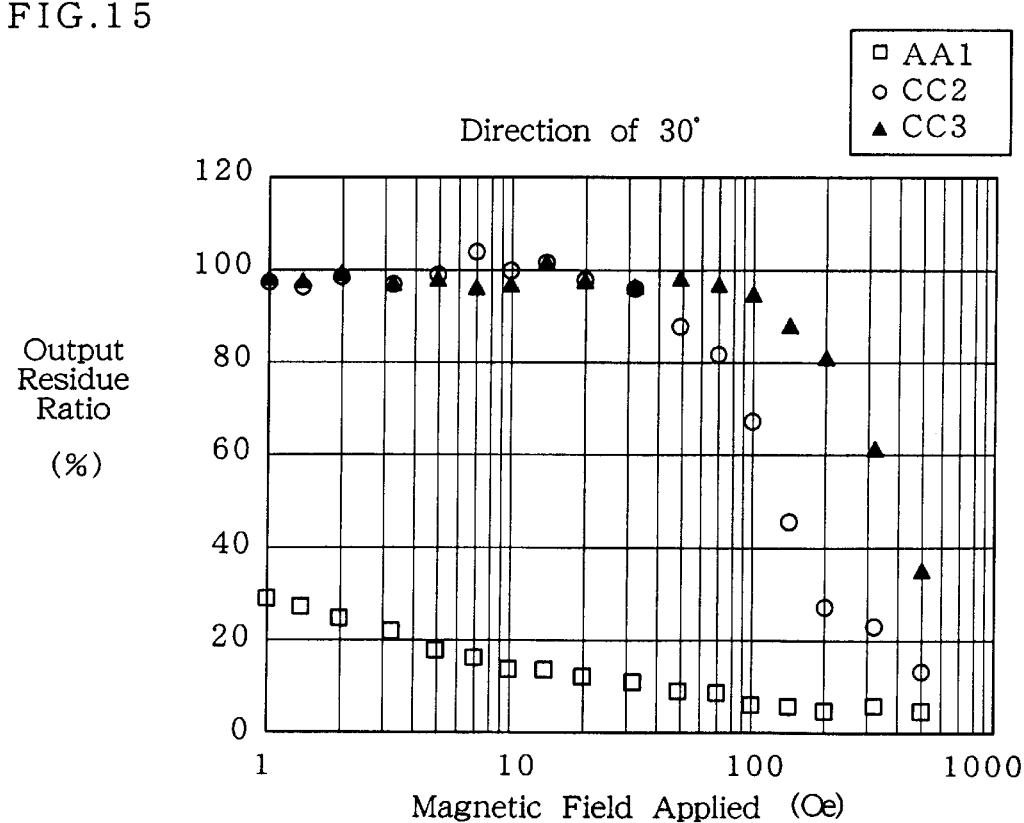
FIG. 15 graphically shows a reproduction output residue after application of an external magnetic field in the examples A.
Figure 16:
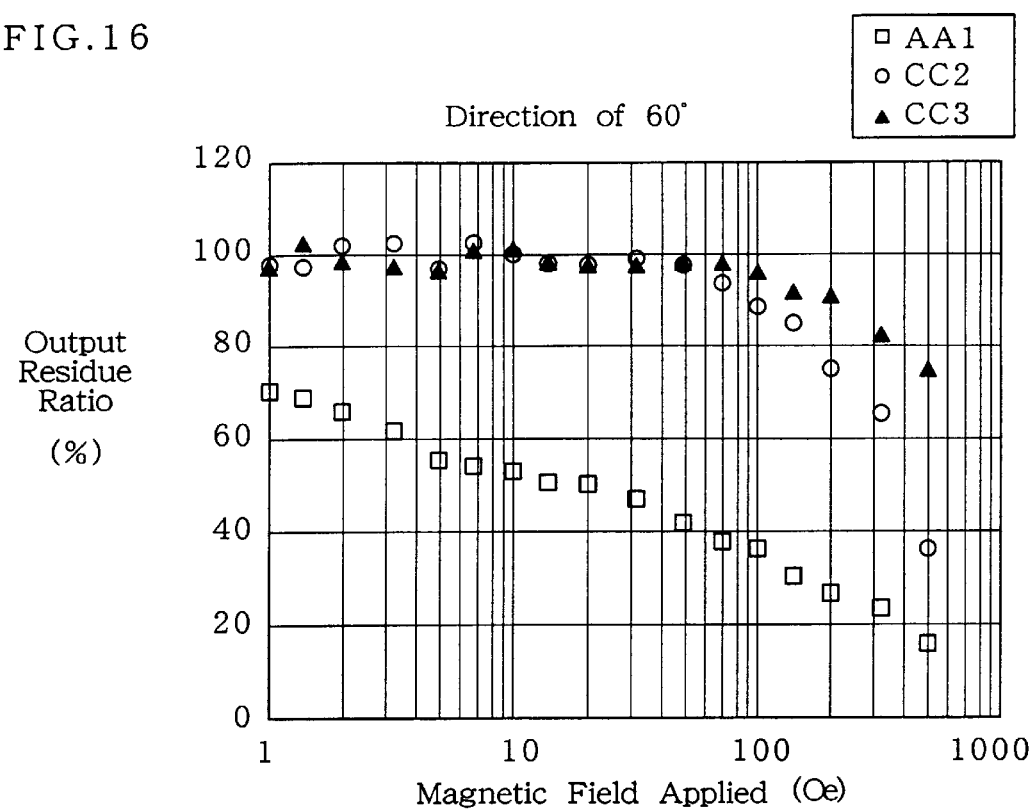
FIG. 16 graphically shows a reproduction output residue after application of an external magnetic field in the examples C.
Figure 17:
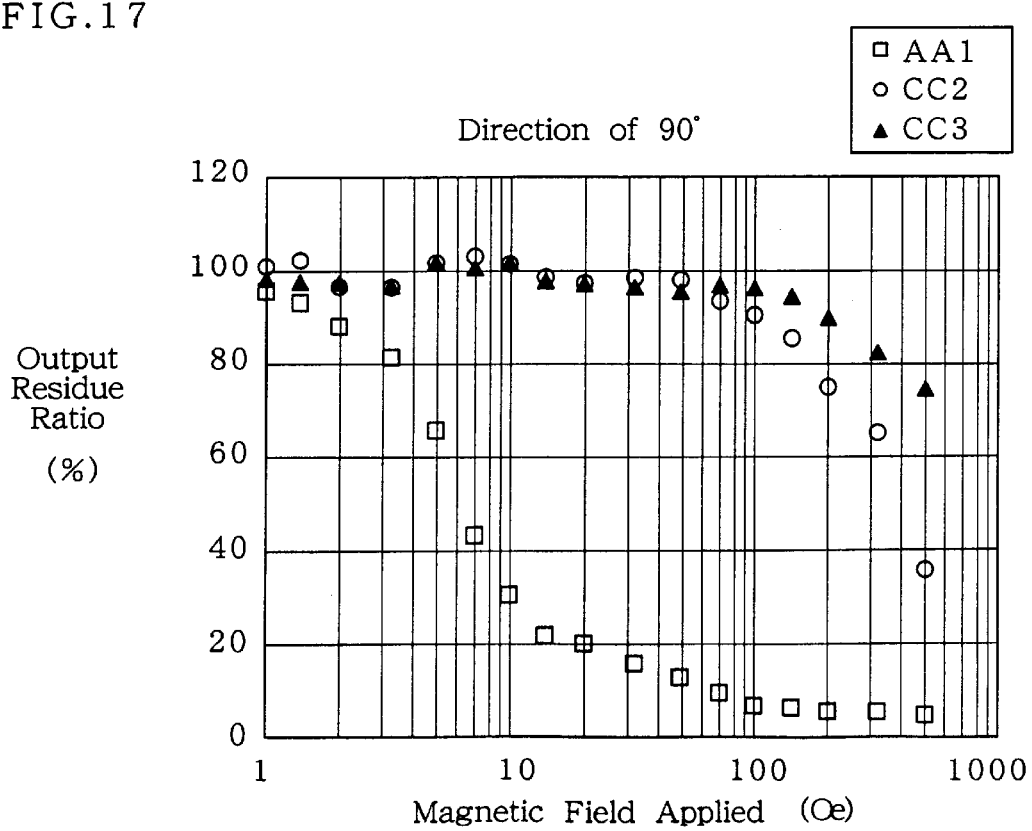
FIG. 17 graphically shows a reproduction output residue after application of an external magnetic field in the examples C.
Figure 18:
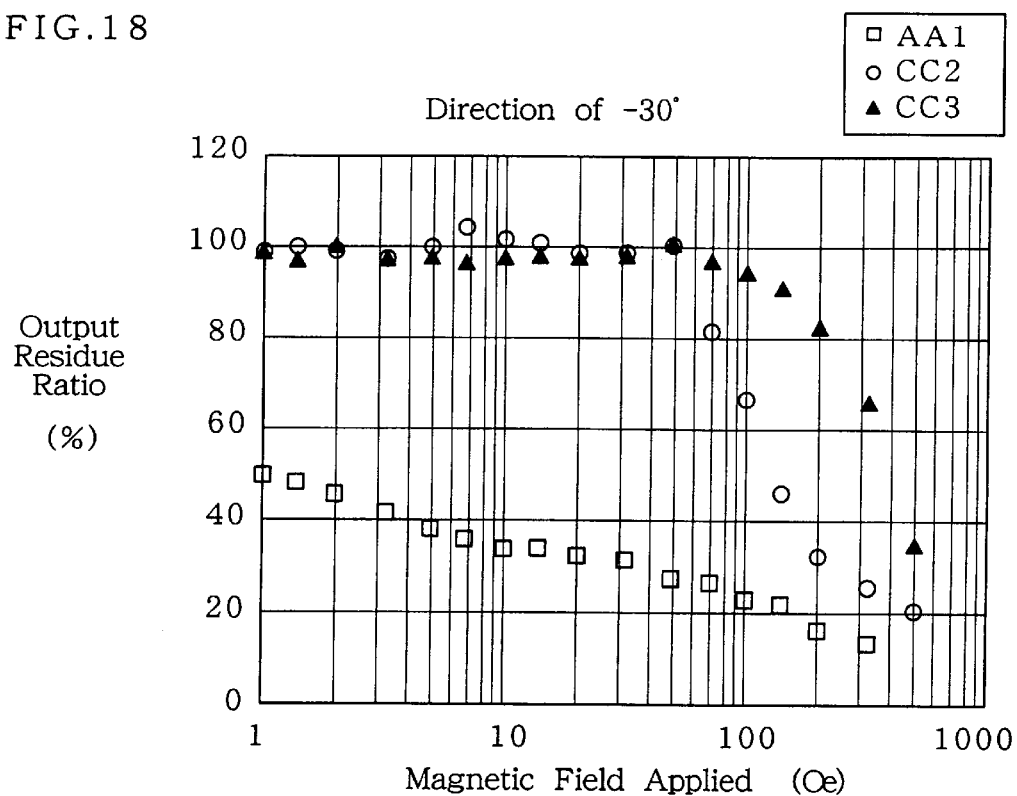
FIG. 18 graphically shows a reproduction output residue after application of an external magnetic field in the examples C.
Figure 19:
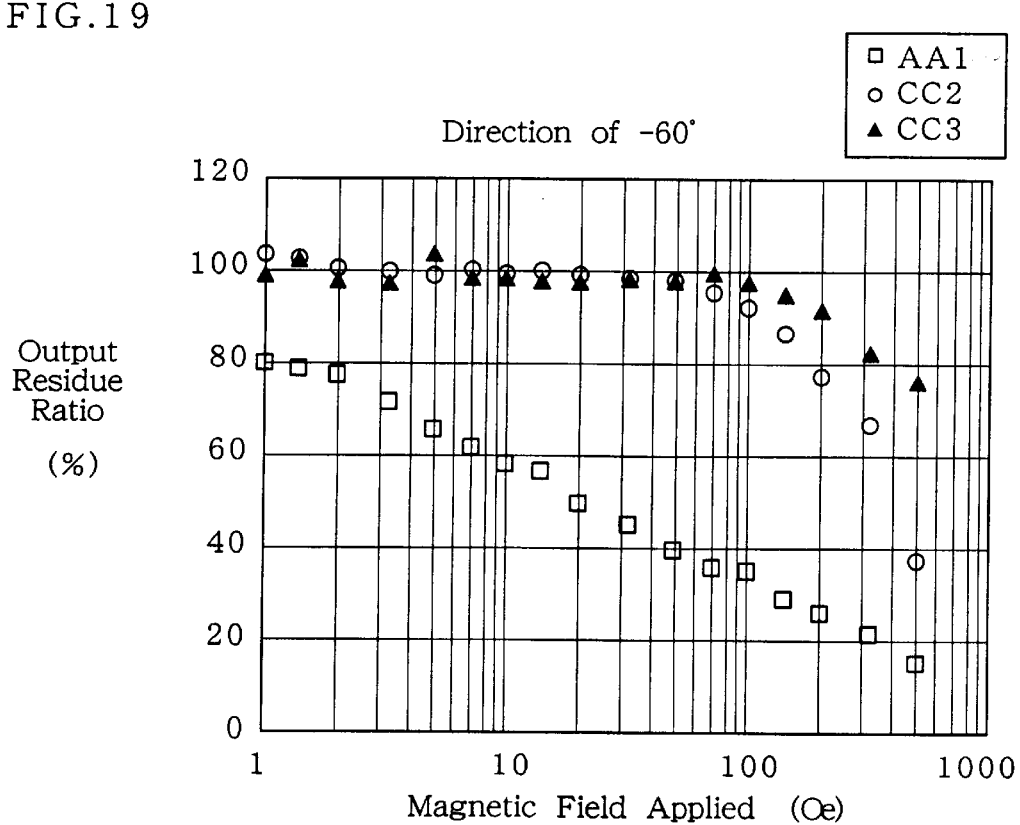
FIG. 19 graphically shows a reproduction output residue after application of an external magnetic field in the examples C.

As shown in Table 13 and FIG. 14, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example CC2 according to the present invention, the reproduction output fluctuation was suppressed within 5% for the magnetic field of 20 Oe or below. Similarly, in the apparatus example CC3 according to the present invention, the reproduction output fluctuation was suppressed within 5% for the magnetic field of 50 Oe or below. Thus, the apparatus examples according to the present invention exhibited an output stability higher than the conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses the undercoat soft magnetic film FeTaN whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 13 and FIG. 14, the apparatus example CC3 can further suppress the output reduction than the apparatus example CC2. This is because the medium example C2 uses the undercoat soft magnetic film FeTaN having a thickness smaller than that of the medium example C3, so that less magnetic flux can pass through. Accordingly, in the medium example C3 compared to the medium example C2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the FeTaN film having a thickness of 400 nm or below, it was possible to obtain a reproduction output residue ratio identical to that of the apparatus example CC3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 14 to 18 show output reduction ratio obtained when the magnetic field was applied at the other angles. FIGS. 15 to 19 show the corresponding graphics.

As can be seen from these results, when a magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention CC2 and CC3, it was possible to obtain a higher output stability than the conventional apparatus example AA1.

Moreover, in the apparatus example CC3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

The conditions of the head mounted and the recording conditions were same as in Examples A.

In order to check the domain wall configuration of the FeTaNCu film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the FetaNCu film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples DD2, DD3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

The Examples D exhibited a tendency completely identical to the Examples C.

TABLE 19

| | Magnetic Field in Direction of 0 degrees | | | | | | | |
|---|---|---|---|---|---|---|---|---|
| MAGNETIC FIELD [Oe] | 1 | 1.4 | 2 | 3.2 | 5 | 7 | 10 | 14 |
| DD2 OUTPUT RESIDUE [%] | 98.6 | 100 | 97.5 | 97.5 | 96.6 | 98.4 | 98.7 | 97.6 |
| DD3 OUTPUT RESIDUE [%] | 96.7 | 97 | 98 | 99.9 | 97.3 | 99.7 | 97.8 | 98.8 |
| MAGNETIC FIELD [Oe] | 20 | 32 | 50 | 70 | 100 | 140 | 200 | 320 | 500 |
| DD2 OUTPUT RESIDUE [%] | 97.2 | 95.7 | 85.1 | 75.8 | 62 | 45.8 | 30.9 | 20.3 | 15.7 |
| DD3 OUTPUT RESIDUE E%J | 97.6 | 96.7 | 98.7 | 94.2 | 90.1 | 80 | 70.7 | 55.6 | 33.7 |

Moreover, similar results were obtained for the apparatus using the inductive/MR composite head. In this case also, the apparatus example of the present invention exhibited a further higher output stability than the conventional apparatus example AA1.

Thus, the apparatus example CC3 of the present invention can provide a magnetic disc apparatus having a high output stability, enabling to realize a high recording density.

4. Examples D

Medium examples were prepared in the same way as in Example A, except for that the FeSiAl target was replaced by FeTaNCu target. The medium examples having the FeTaNCu film thickness of 500 nm and 400 nm will be referred to as medium examples D2 and D3, respectively.

The medium examples D2 and D3 and the conventional medium example A1 were used in combination with the mono-pole/MR composite head or the inductive/MR composite head to constitute magnetic disc apparatuses, which will be referred to as DD2, DD3, and AA1, respectively.

As shown in Table 19, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example DD2 according to the present invention, the reproduction output fluctuation was suppressed within 5% for the magnetic field of 20 Oe or below. Similarly, in the apparatus example DD3 according to the present invention, the reproduction output fluctuation was suppressed within 5% for the magnetic field of 50 Oe or below. Thus, the apparatus examples according to the present invention exhibited an output stability higher than the conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses the undercoat soft magnetic film FeTaNCu whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 19, the apparatus example DD3 can further suppress the output reduction than the apparatus example DD2. This is because the medium example D2 uses the undercoat soft magnetic film FeTaNCu having a thickness smaller than that of the medium example D3, so that less magnetic flux can pass through. Accordingly, in the medium example D3 compared to the medium example D2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the FeTaNCu film having a thickness of 400 nm or below, it was possible to obtain a reproduction output residue ratio identical to that of the apparatus example DD3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 20 to 24 show output reduction ratio obtained when the magnetic field was applied at the other angles.

TABLE 20

Magnetic Field in Direction of 30 degrees

| MAGNETIC FIELD [Oe] | 1 | 1.4 | 2 | 3.2 | 5 | 7 | 10 | 14 |
|---|---|---|---|---|---|---|---|---|
| DD2 OUTPUT RESIDUE [%] | 97.7 | 96.9 | 98.3 | 97.7 | 99.9 | 101 | 100 | 100 |
| DD3 OUTPUT RESIDUE [%] | 98.4 | 98.8 | 99.6 | 97.7 | 99.4 | 97.5 | 96.4 | 101 |
| MAGNETIC FIELD [Oe] | 20 | 32 | 50 | 70 | 100 | 140 | 200 | 320 | 500 |
| DD2 OUTPUT RESIDUE [%] | 98.7 | 96.6 | 88 | 83.5 | 66.7 | 45.5 | 27.2 | 22.6 | 14.8 |
| DD3 OUTPUT RESIDUE [%] | 97.6 | 96.8 | 98.7 | 97 | 94.4 | 88.9 | 80.4 | 63.3 | 37.8 |

TABLE 21

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| DD2 OUTPUT RESIDUE [%] | 98.7 | 97.6 | 100 | 100 | 97.7 | 100 | 101 | 96.6 |
| DD3 OUTPUT RESIDUE [%] | 98.7 | 100 | 98.5 | 97.9 | 96.2 | 100 | 97.5 | 98.3 |
| MAGNETIC FIELD [Oe] | 20 | 32 | 50 | 70 | 100 | 140 | 200 | 320 | 500 |
| DD2 OUTPUT RESIDUE [%] | 98.7 | 99.2 | 97.7 | 94 | 89.8 | 85.2 | 75.7 | 65.6 | 37.9 |
| DD3 OUTPUT RESIDUE [%] | 98.4 | 97.5 | 99 | 98.6 | 96.7 | 92.3 | 90.2 | 81.9 | 76.2 |

TABLE 22

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| DD2 OUTPUT RESIDUE [%] | 100 | 101 | 97.6 | 96.7 | 99.2 | 97.6 | 98.5 | 98.7 |
| DD3 OUTPUT RESIDUE [%] | 98.7 | 97.8 | 97.5 | 96.2 | 100 | 97.1 | 102 | 98.2 |
| MAGNETIC FIELD [Oe] | 20 | 32 | 50 | 70 | 100 | 140 | 200 | 320 | 500 |
| DD2 OUTPUT RESIDUE [%] | 96.6 | 98.5 | 97.8 | 94.1 | 90.4 | 85.7 | 76.2 | 67.8 | 33.4 |
| DD3 OUTPUT RESIDUE [%] | 97.7 | 96.6 | 95.3 | 98.5 | 96.7 | 94.1 | 90.4 | 82.8 | 76.2 |

TABLE 23

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| DD2 OUTPUT RESIDUE [%] | 99.3 | 99 | 98.7 | 97.5 | 99.4 | 100 | 100 | 96.1 |
| DD3 OUTPUT RESIDUE [%] | 98.6 | 97.4 | 96.8 | 98.4 | 97.2 | 96.9 | 97.4 | 98 |

TABLE 23-continued

| Magnetic Field in Direction of −30 degrees | | | | | | | | |
|---|---|---|---|---|---|---|---|---|
| MAGNETIC FIELD [Oe] | 20 | 32 | 50 | 70 | 100 | 140 | 200 | 320 | 500 |
| DD2 OUTPUT RESIDUE [%] | 101 | 98.7 | 99.2 | 81 | 66.2 | 46.7 | 31.4 | 28.7 | 22.4 |
| DD3 OUTPUT RESIDUE [%] | 96.8 | 98.4 | 99 | 96.4 | 94.3 | 90 | 82.4 | 67.7 | |

TABLE 24

| Magnetic Field in Direction of −60 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| DD2 OUTPUT RESIDUE [%] | 100 | 96.8 | 99.5 | 98.7 | 97.6 | 99 | 97.9 | 99.5 |
| DD3 OUTPUT RESIDUE [%] | 98.6 | 100 | 97.3 | 96.8 | 97.8 | 97.8 | 97.3 | 96.3 |
| MAGNETIC FIELD [Oe] | 20 | 32 | 50 | 70 | 100 | 140 | 200 | 320 | 500 |
| DD2 OUTPUT RESIDUE [%] | 98.5 | 97.3 | 96.7 | 94 | 90.6 | 87.1 | 72.5 | 66.5 | 36.4 |
| DD3 OUTPUT RESIDUE [%] | 96.4 | 98.5 | 97.9 | 98.9 | 96.4 | 94 | 90.7 | 82.7 | 75.2 |

As can be seen from these results, when a magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention DD2 and DD3, it was possible to obtain a higher output stability than the conventional apparatus example AA1.

Moreover, in the apparatus example DD3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example DD3 of the present invention can provide a magnetic disc apparatus having a high output stability, enabling to realize a high recording density.

5. Examples E

Medium examples were prepared as follows. Firstly, a substrate was covered with a Co—$SiO_2$ dispersed film with a thickness changed in a range from 50 nm to 500 nm. The film formation conditions were as follows: initial vacuum degree $5\times10^{-7}$ mTorr or below, electric power 0.5 kW, argon gas pressure 4 mTorr, and film formation speed 3 nm/sec. The CO—$SiO_2$ dispersed film was formed by simultaneously sputtering a Co target and a $SiO_2$ target while applying a bias to the substrate. The Co volume ratio in the dispersed film was set to about 50%. On this film, a $Co_{78}Cr_{19}Ta_3$ film was formed to have a thickness of 100 nm, using a $Co_{78}Cr_{19}Ta_3$ (at %) target, while the substrate was maintained at a temperature of 400 degrees C. Furthermore, a C protection film of 10 nm was formed.

The medium examples having the Co—$SiO_2$ film of 500 nm thickness and 400 nm thickness will be referred to as medium examples E2 and E3, respectively.

The medium examples E2 and E3 according to the invention and the conventional example A1 were used in combination with the mono-pole/MR composite head of inductive/MR composite head to constitute magnetic disc apparatus examples, which will be referred to as apparatus examples EE2, EE3, and conventional apparatus example AA1, respectively.

The conditions of the head mounted and the recording conditions were same as in Examples A.

In order to check the domain wall configuration of the Co—$SiO_2$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the Co—$SiO_2$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples EE2, EE3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

Tables 25 to 30 show the check results and FIGS. 20 to 25 show the results graphically.

TABLE 25

| Magnetic Field applied in Direction of 0 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| EE2 OUTPUT RESIDUE [%] | 96.8 | 97.6 | 95.8 | 96.8 | 96.5 | 97.8 | 100 | 99.4 | |
| EE3 OUTPUT RESIDUE [%] | 100 | 97.6 | 97.6 | 95.8 | 96.8 | 97.8 | 100 | 99.4 | |
| MAGNETIC FIELD [Oe] | 20 | 32 | 50 | 70 | 100 | 140 | 200 | 320 | 500 |
| EE2 OUTPUT RESIDUE [%] | 98.6 | 93.2 | 87.4 | 79.8 | 65.4 | 42.3 | 25.2 | 20.5 | 15.9 |
| EE3 OUTPUT RESIDUE [%] | 98.6 | 95.8 | 97.8 | 94.7 | 92.4 | 86.8 | 76.1 | 60.6 | 35.4 |

TABLE 26

| Magnetic Field in Direction of 30 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| EE2 OUTPUT RESIDUE [%] | 97.8 | 96.5 | 96.8 | 96.5 | 97.8 | 97.4 | 96.8 | 97.5 | |
| EE3 OUTPUT RESIDUE [%] | 96.8 | 97.8 | 97.6 | 95.8 | 97.6 | 95.8 | 96.8 | 97.8 | |
| MAGNETIC FIELD [Oe] | 20 | 32 | 50 | 70 | 100 | 140 | 200 | 320 | 500 |
| EE2 OUTPUT RESIDUE [%] | 99.2 | 96.2 | 88.8 | 80.5 | 66.6 | 45.4 | 27.2 | 22.1 | 13.8 |
| EE3 OUTPUT RESIDUE [%] | 99.4 | 98.6 | 98.5 | 97.2 | 94.5 | 88.9 | 80.2 | 60.6 | 35 |

TABLE 27

| Magnetic Field in Direction of 60 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| EE2 OUTPUT RESIDUE [%] | 98.5 | 97.6 | 95.8 | 96.8 | 102 | 100 | 100 | 97.6 | |
| EE3 OUTPUT RESIDUE [%] | 98.5 | 100 | 99.4 | 100 | 97.6 | 97.6 | 102 | 98.7 | |
| MAGNETIC FIELD [Oe] | 20 | 32 | 50 | 70 | 100 | 140 | 200 | 320 | 500 |
| EE2 OUTPUT RESIDUE [%] | 97.6 | 99.4 | 97.8 | 94.8 | 90.6 | 85.7 | 75.1 | 65.9 | 36.2 |
| EE3 OUTPUT RESIDUE [%] | 98.6 | 98.5 | 97.5 | 98.2 | 96.8 | 92.2 | 90.5 | 82.1 | 75.1 |

TABLE 28

| Magnetic Field in Direction of 90 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| EE2 OUTPUT RESIDUE [%] | 100 | 96.8 | 96.5 | 97.8 | 97.4 | 96.8 | 98.5 | 97.5 | |
| EE3 OUTPUT RESIDUE [%] | 97.8 | 97.6 | 100 | 99.4 | 98.6 | 95.8 | 100 | 102 | |
| MAGNETIC FIELD [Oe] | 20 | 32 | 50 | 70 | 100 | 140 | 200 | 320 | 500 |
| EE2 OUTPUT RESIDUE [%] | 99.2 | 97.2 | 96.8 | 93.4 | 87.8 | 79.9 | 65.1 | 42.8 | 25.9 |
| EE3 OUTPUT RESIDUE [%] | 98.4 | 96.8 | 97.6 | 97.8 | 98.3 | 94.2 | 92.8 | 86.1 | 76.9 |

TABLE 29

| Magnetic Field in Direction of −30 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| EE2 OUTPUT RESIDUE [%] | 99.2 | 95.8 | 96.8 | 96.5 | 97.8 | 99.3 | 97.4 | 100 | |
| EE3 OUTPUT RESIDUE [%] | 98.7 | 96.5 | 99.8 | 97.6 | 95.8 | 96.8 | 97.6 | 99.3 | |
| MAGNETIC FIELD [Oe] | 20 | 32 | 50 | 70 | 100 | 140 | 200 | 320 | 500 |
| EE2 OUTPUT RESIDUE [%] | 97.5 | 98.5 | 99.7 | 81.8 | 67.5 | 46.9 | 32.6 | 25.4 | 20.8 |
| EE3 OUTPUT RESIDUE [%] | 97.4 | 98.1 | 99.2 | 96.7 | 94.9 | 90.4 | 82.5 | 65.8 | 35.1 |

TABLE 30

| | Magnetic Field in Direction of −60 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| EE2 OUTPUT RESIDUE [%] | 102 | 101 | 96.5 | 95.8 | 96.8 | 99.4 | 99.4 | 98.6 | |
| EE3 OUTPUT RESIDUE [%] | 98.4 | 96.5 | 97.8 | 99.4 | 98.6 | 95.8 | 100 | 97.5 | |
| MAGNETIC FIELD [Oe] | 20 | 32 | 50 | 70 | 100 | 140 | 200 | 320 | 500 |
| EE2 OUTPUT RESIDUE [%] | 95.8 | 97.1 | 96.8 | 94.9 | 90 | 85.4 | 75.2 | 65.4 | 36.4 |
| EE3 OUTPUT RESIDUE [%] | 96.5 | 98.4 | 96.8 | 98.4 | 96.5 | 94.5 | 90.8 | 82.4 | 75.6 |

Figure 20:
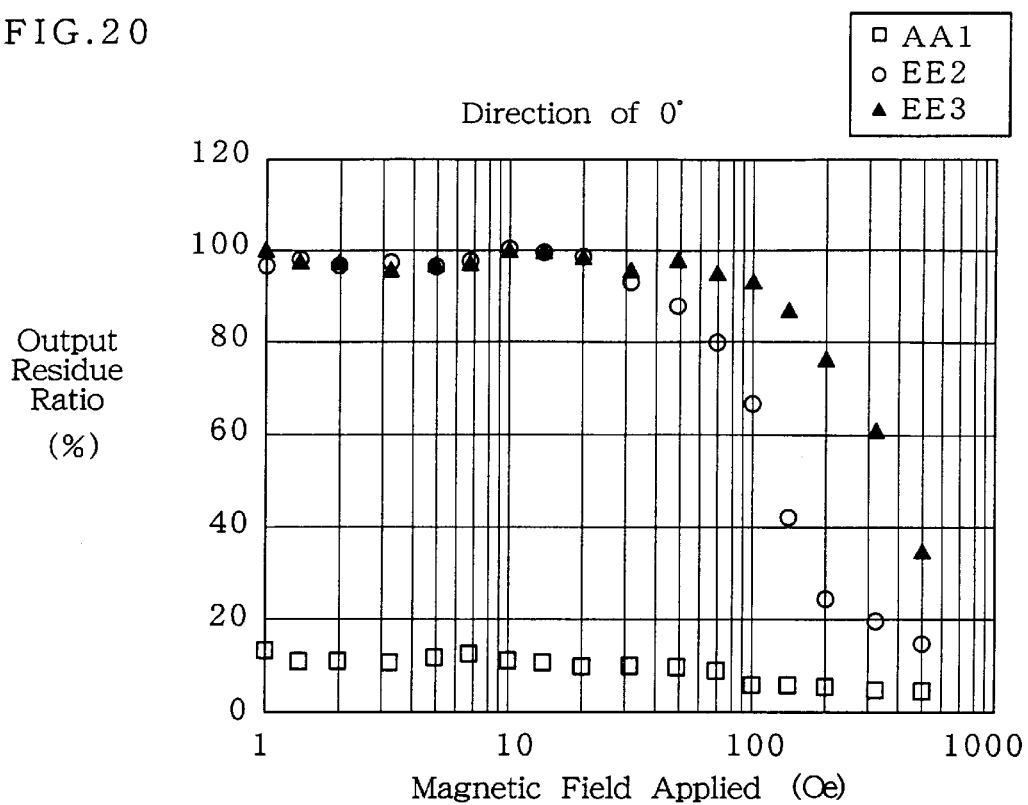
FIG. 20 graphically shows a reproduction output residue after application of an external magnetic field in the examples E.
Figure 21:
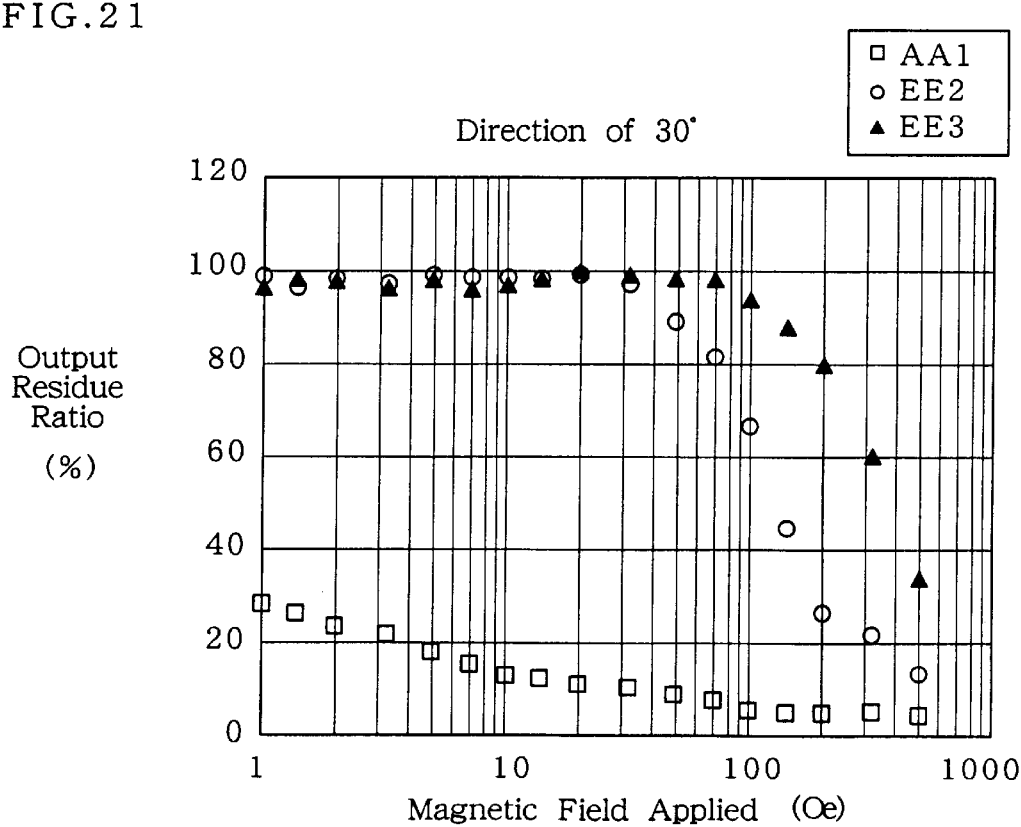
FIG. 21 graphically shows a reproduction output residue after application of an external magnetic field in the examples E.
Figure 22:
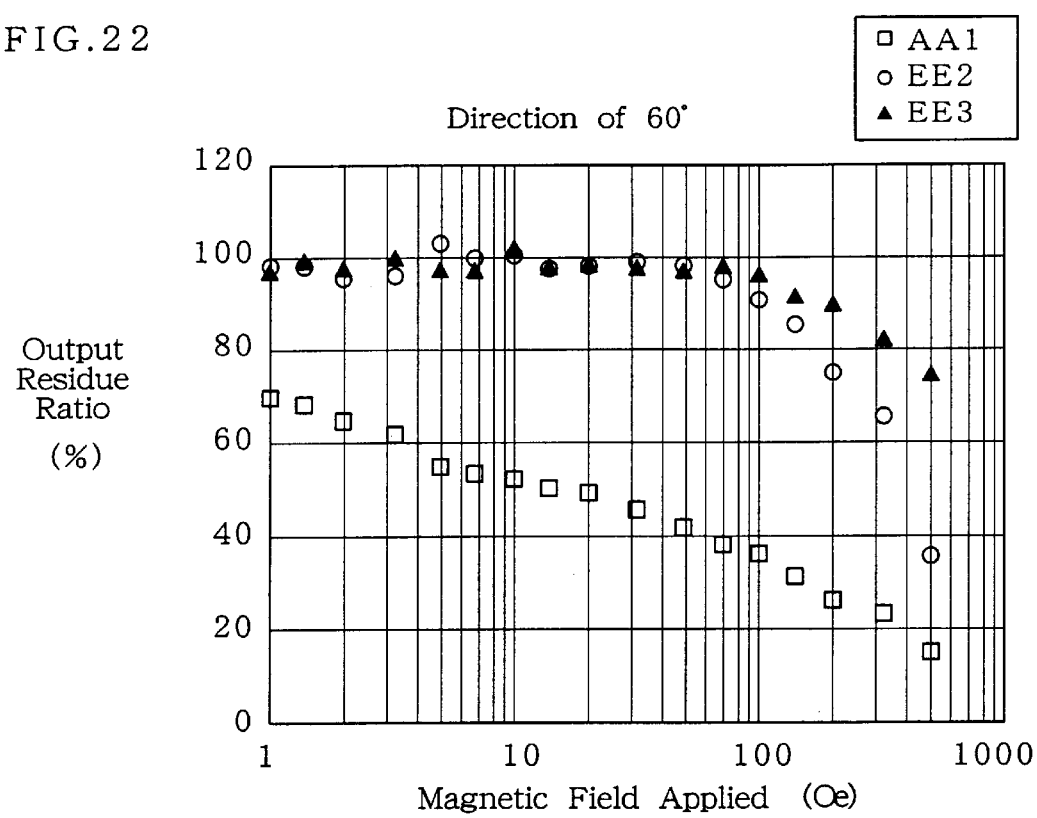
FIG. 22 graphically shows a reproduction output residue after application of an external magnetic field in the examples E.
Figure 23:
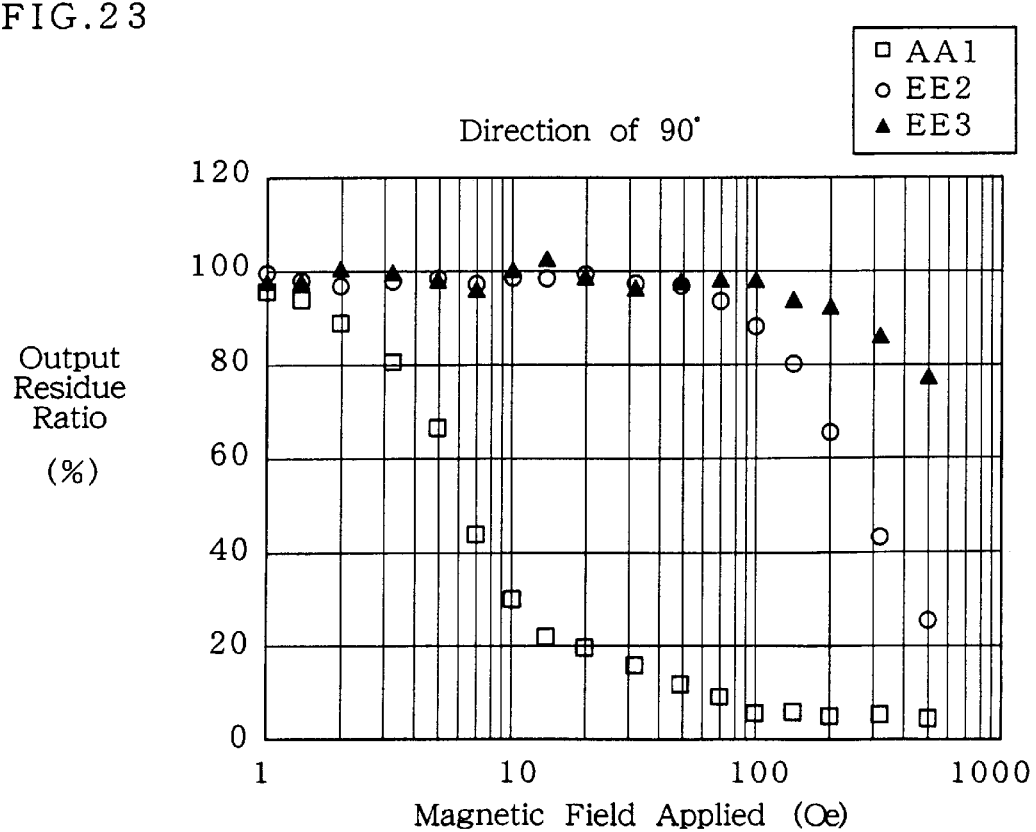
FIG. 23 graphically shows a reproduction output residue after application of an external magnetic field in the examples E.
Figure 24:
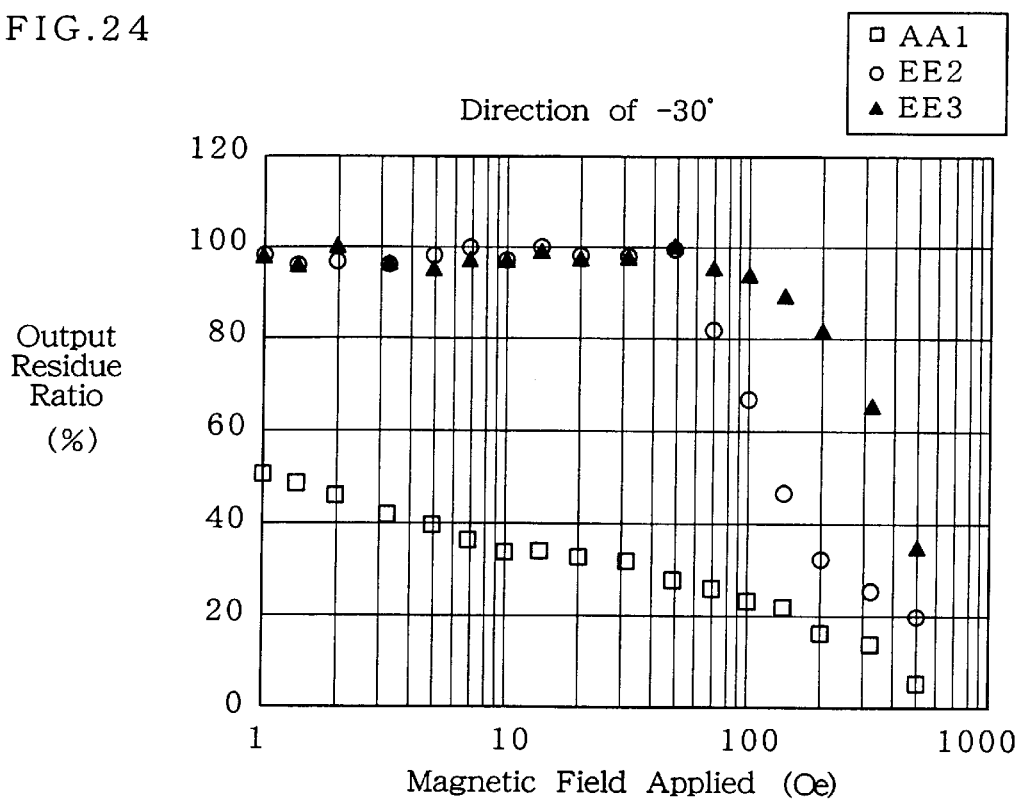
FIG. 24 graphically shows a reproduction output residue after application of an external magnetic field in the examples E.
Figure 25:
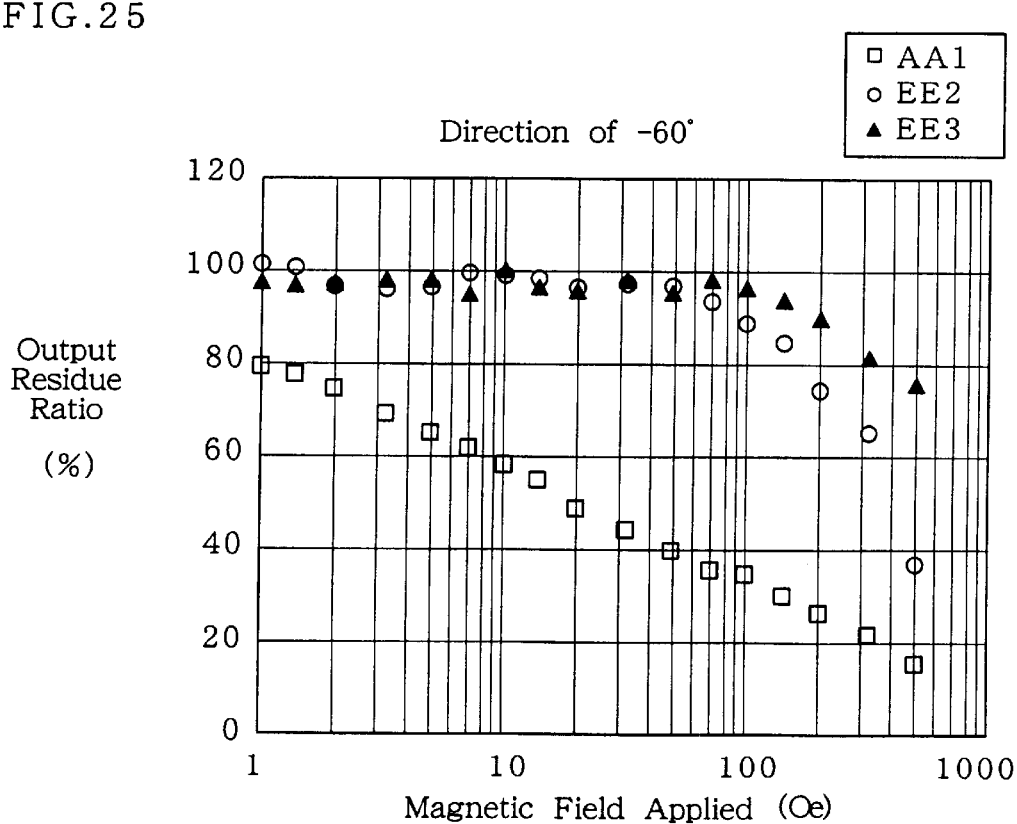
FIG. 25 graphically shows a reproduction output residue after application of an external magnetic field in the examples E FIG. 26 graphically shows a reproduction output residue after application of an external magnetic field in the examples G.

As shown in Table 25 and FIG. 20, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example EE2 according to the present invention, the reproduction output fluctuation was suppressed within 5% for the magnetic field of 20 Oe or below. Similarly, in the apparatus example EE3 according to the present invention, the reproduction output fluctuation was suppressed within 5% for the magnetic field of 50 Oe or below. Thus, the apparatus examples according to the present invention exhibited an output stability higher than the conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the $Co-SiO_2$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 25 and FIG. 20, the apparatus example EE3 can further suppress the output reduction than the apparatus example EE2. This is because the medium example E2 uses as the undercoat soft magnetic film the $Co-SiO_2$ dispersed film having a thickness smaller than that of the medium example E3, so that less magnetic flux can pass through. Accordingly, in the medium example E3 compared to the medium example E2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the $Co-SiO_2$ dispersed film having a thickness of 400 nm or below, it was possible to obtain a reproduction output residue ratio identical to that of the apparatus example EE3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 26 to 30 show output reduction ratio obtained when the magnetic field was applied at the other angles. FIG. 21 to FIG. 25 show the result graphically.

As can be seen from these results, when a magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention EE2 and EE3, it was possible to obtain a higher output stability than the conventional apparatus example AA1.

Moreover, in the apparatus example EE3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example EE3 of the present invention can provide a magnetic disc apparatus having a high output stability, enabling to realize a high recording density.

6. Examples L

Medium examples were prepared in the same way as in Examples E except for that the Co target was replaced by a CoNb target. The addition off Nb has a effect to make the crystalline particles smaller.

The medium examples having the $CoNb-SiO_2$ film of 500 nm thickness and 400 nm thickness will be referred to as medium examples L2 and L3, respectively.

The medium examples L2 and L3 according to the invention and the conventional example A1 were used in combination with the mono-pole/MR composite head of inductive/MR composite head to constitute magnetic disc apparatus examples, which will be referred to as apparatus examples LL2, LL3, and conventional apparatus example AA1, respectively.

The conditions of the head mounted and the recording conditions were same as in Examples A.

In order to check the domain wall configuration of the $CoNb-SiO_2$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoNb—SiO$_2$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples LL2, LL3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

The check results showed the tendency just like the results in Examples E. As shown in Table 31, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example LL2 according to the present invention, the reproduction output fluctuation was suppressed within 5% for the magnetic field of 20 Oe or below. Similarly, in the apparatus example LL3 according to the present invention, the reproduction output fluctuation was suppressed within 5% for the magnetic field of 50 Oe or below. Thus, the apparatus examples according to the present invention exhibited an output stability higher than the conventional apparatus example AA1.

mono-pole head main magnetic pole, demagnetizing the recording magnetization, thus reducing the output. In contrast to this, the medium example of the present invention used in the apparatus example of the present invention uses as the undercoat soft magnetic film the CoNb—SiO$_2$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 31, the apparatus example LL3 can further suppress the output reduction than the apparatus example LL2. This is because the medium example L2 uses as the undercoat soft magnetic film the CoNb—SiO$_2$ dispersed film having a thickness smaller than that of the medium example L3, so that less magnetic flux can pass through. Accordingly, in the medium example L3 compared to the medium example L2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoNb—SiO$_2$ dispersed film having a thickness of 400 nm or below, it was possible to obtain a reproduction output residue ratio identical to that of the apparatus example LL3. However, when the film thickness was 50 nm or below, the rectangular wave of the reproduction waveform was distorted, causing a problem as the backing layer. Therefore, it is impossible to reduce the film thickness without limitation. (The configuration and

TABLE 31

| Magnetic Field applied in Direction of 0 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| LL2 OUTPUT RESIDUE [%] | 96.7 | 97.5 | 95.5 | 96.9 | 96.9 | 97.4 | 96.3 | 99.3 |
| LL3 OUTPUT RESIDUE [%] | 101 | 97.7 | 97.6 | 95.8 | 96.6 | 99.3 | 97.8 | 99 |
| MAGNETIC FIELD [Oe] | 20 | 32 | 50 | 70 | 100 | 140 | 200 | 320 | 500 |
| LL2 OUTPUT RESIDUE [%] | 98.7 | 93 | 87.3 | 79.7 | 65.2 | 42 | 25 | 20.7 | 15.8 |
| LL3 OUTPUT RESIDUE [%] | 98.5 | 95.5 | 97.5 | 94.5 | 91.5 | 86.4 | 76.6 | 60.2 | 35.3 |

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the distortion of the rectangular wave are just like in Examples A shown in FIG. 11 to FIG. 13).

Tables 32 to 36 show output reduction ratio obtained when the magnetic field was applied at the other angles.

TABLE 32

| Magnetic Field in Direction of 30 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| LL2 OUTPUT RESIDUE [%] | 97.4 | 96.4 | 96.9 | 96.6 | 97.2 | 97.2 | 96.2 | 97.7 |
| LL3 OUTPUT RESIDUE [%] | 96.6 | 97.4 | 97.8 | 95.6 | 97.1 | 95.6 | 96.5 | 97.4 |
| MAGNETIC FIELD [Oe] | 20 | 32 | 50 | 70 | 100 | 140 | 200 | 320 | 500 |
| LL2 OUTPUT RESIDUE [%] | 99 | 96.2 | 88.3 | 80.1 | 66.9 | 45.5 | 27 | 22.7 | 13.5 |
| LL3 OUTPUT RESIDUE [%] | 99 | 98.5 | 98.1 | 97.4 | 94.6 | 88.7 | 80 | 60.5 | 35.9 |

TABLE 33

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| LL2 OUTPUT RESIDUE [%] | 98.4 | 97.8 | 95.2 | 96.4 | 100 | 101 | 100 | 96.9 |
| LL3 OUTPUT RESIDUE [%] | 98.4 | 101 | 99.9 | 96.6 | 97.4 | 97.6 | 97.4 | 98.6 |

| MAGNETIC FIELD [Oe] | 20 | 32 | 50 | 70 | 100 | 140 | 200 | 320 | 500 |
|---|---|---|---|---|---|---|---|---|---|
| LL2 OUTPUT RESIDUE [%] | 97.4 | 99.2 | 96.9 | 94.9 | 90 | 85.4 | 75.6 | 65.7 | 36.3 |
| LL3 OUTPUT RESIDUE [%] | 98.2 | 98.4 | 97.8 | 98.7 | 96.4 | 92.1 | 90.6 | 82.7 | 75.8 |

TABLE 34

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| LL2 OUTPUT RESIDUE [%] | 99.5 | 96.7 | 96.7 | 97.7 | 97.6 | 96.2 | 98.3 | 97.7 |
| LL3 OUTPUT RESIDUE [%] | 97.6 | 97.6 | 97.6 | 99.1 | 98.7 | 95.8 | 97.5 | 102 |

| MAGNETIC FIELD [Oe] | 20 | 32 | 50 | 70 | 100 | 140 | 200 | 320 | 500 |
|---|---|---|---|---|---|---|---|---|---|
| LL2 OUTPUT RESIDUE [%] | 99.2 | 97.6 | 96.3 | 93.4 | 87.8 | 79.7 | 65.4 | 42.6 | 25 |
| LL3 OUTPUT RESIDUE [%] | 98.6 | 96.9 | 97.3 | 97.4 | 98.2 | 94 | 92.4 | 86.6 | 76.5 |

TABLE 35

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| LL2 OUTPUT RESIDUE [%] | 99.9 | 95.6 | 96.2 | 96.2 | 97.8 | 99.7 | 97.4 | 98.6 |
| LL3 OUTPUT RESIDUE [%] | 98.7 | 96.7 | 99.8 | 97.8 | 95.7 | 96.7 | 97.7 | 99.5 |

| MAGNETIC FIELD [Oe] | 20 | 32 | 50 | 70 | 100 | 140 | 200 | 320 | 500 |
|---|---|---|---|---|---|---|---|---|---|
| LL2 OUTPUT RESIDUE [%] | 97.5 | 98.4 | 99.5 | 81.1 | 67.7 | 46.7 | 32.5 | 25.6 | 20.6 |
| LL3 OUTPUT RESIDUE [%] | 97.2 | 98.7 | 99.6 | 96.7 | 94.3 | 90.7 | 82.8 | 65.7 | 37.9 |

TABLE 36

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| LL2 OUTPUT RESIDUE [%] | 99.4 | 99.2 | 96.6 | 95.7 | 96.2 | 99.5 | 99.7 | 98.8 |
| LL3 OUTPUT RESIDUE [%] | 98.2 | 96.6 | 97.4 | 99.4 | 98.4 | 95.6 | 99.9 | 97.1 |

| MAGNETIC FIELD [Oe] | 20 | 32 | 50 | 70 | 100 | 140 | 200 | 320 | 500 |
|---|---|---|---|---|---|---|---|---|---|
| LL2 OUTPUT RESIDUE [%] | 95.7 | 97.2 | 96.6 | 94.3 | 90.7 | 85.9 | 75.4 | 65.5 | 35.9 |
| LL3 OUTPUT RESIDUE [%] | 96.5 | 98.6 | 96.6 | 98.5 | 96.7 | 94.6 | 90.7 | 82.7 | 74.7 |

As has been described in Examples A, when a magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention LL2 and LL3, it was possible to obtain a higher output stability than the conventional apparatus example AA1.

Moreover, in the apparatus example LL3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1. Moreover, the same tendency was observed when a medium was prepared using a Co target added by Zr, B, Ta instead of Nb.

Moreover, similar results were obtained for the apparatus using the inductive/MR composite head. In this case also, the apparatus example of the present invention exhibited a further higher output stability than the conventional apparatus example AA1.

Thus, the apparatus example LL3 of the present invention can provide a magnetic disc apparatus having a high output stability, enabling to realize a high recording density.

7. Examples F

Medium examples were prepared in the same way as in Examples E except for that the $SiO_2$ target was replaced by a C target.

The medium examples having the Co—C film of 500 nm thickness and 400 nm thickness will be referred to as medium examples F2 and F3, respectively.

The medium examples F2 and F3 according to the invention and the conventional example A1 were used in combination with the mono-pole/MR composite head of inductive/ MR composite head to constitute magnetic disc apparatus examples, which will be referred to as apparatus examples FF2, FF3, and conventional apparatus example AA1, respectively.

The conditions of the head mounted and the recording conditions were same as in Examples A.

In order to check the domain wall configuration of the Co—C dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the Co—C dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples FF2, FF3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

The check results showed the tendency just like the results in Examples E. As shown in Table 37, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example FF2 according to the present invention, the reproduction output fluctuation was suppressed within 5% for the magnetic field of 20 Oe or below. Similarly, in the apparatus example FF3 according to the present invention, the reproduction output fluctuation was suppressed within 5% for the magnetic field of 50 Oe or below. Thus, the apparatus examples according to the present invention exhibited an output stability higher than the conventional apparatus example AA1.

TABLE 37

| | Magnetic Field applied in Direction of 0 degrees | | | | | | | |
|---|---|---|---|---|---|---|---|---|
| MAGNETIC FIELD [Oe] | 1 | 1.4 | 2 | 3.2 | 5 | 7 | 10 | 14 |
| FF2 OUTPUT RESIDUE [%] | 96.6 | 97.4 | 95.1 | 96.5 | 96.4 | 97.3 | 96.2 | 99.1 |
| FF3 OUTPUT RESIDUE [%] | 100 | 97.8 | 97.4 | 95.2 | 96.6 | 99.4 | 97.7 | 99.5 |
| MAGNETIC FIELD [Oe] | 20 | 32 | 50 | 70 | 100 | 140 | 200 | 320 | 500 |
| FF2 OUTPUT RESIDUE [%] | 98.4 | 93.6 | 87.7 | 79.5 | 65.5 | 42.4 | 25.8 | 20.6 | 15.4 |
| FF3 OUTPUT RESIDUE [%] | 98.4 | 95.6 | 97.7 | 94.4 | 91.6 | 86.5 | 76.7 | 60 | 35.4 |

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the Co—C dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 37, the apparatus example FF3 can further suppress the output reduction than the apparatus example FF2. This is because the medium example F2 uses as the undercoat soft magnetic film the Co—C dispersed film having a thickness smaller than that of the medium example F3, so that less magnetic flux can pass through. Accordingly, in the medium example F3 compared to the medium example F2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the Co—C dispersed film having a thickness of 400 nm or below, it was possible to obtain a reproduction output residue ratio identical to that of the apparatus example FF3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 38 to 42 show output reduction ratio obtained when the magnetic field was applied at the other angles.

TABLE 38

Magnetic Field in Direction of 30 degrees

| MAGNETIC FIELD [Oe] | 1 | 1.4 | 2 | 3.2 | 5 | 7 | 10 | 14 |
|---|---|---|---|---|---|---|---|---|
| FF2 OUTPUT RESIDUE [%] | 97.5 | 96.6 | 96.7 | 96.2 | 97.1 | 97.8 | 96.4 | 97.4 |
| FF3 OUTPUT RESIDUE [%] | 96.4 | 97.8 | 97.6 | 95.6 | 97.1 | 95.4 | 96.3 | 97.5 |

| MAGNETIC FIELD [Oe] | 20 | 32 | 50 | 70 | 100 | 140 | 200 | 320 | 500 |
|---|---|---|---|---|---|---|---|---|---|
| FF2 OUTPUT RESIDUE [%] | 99.7 | 96.7 | 88.4 | 79.8 | 66.5 | 45.6 | 26.2 | 22.2 | 13.6 |
| FF3 OUTPUT RESIDUE [%] | 99.4 | 98.6 | 98.7 | 97.5 | 94.2 | 88.8 | 80.3 | 60.4 | 35.5 |

TABLE 39

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| FF2 OUTPUT RESIDUE [%] | 98.4 | 97.4 | 95 | 96.6 | 100 | 98.4 | 100 | 96.5 |
| FF3 OUTPUT RESIDUE [%] | 98.5 | 100 | 99.7 | 98.2 | 97.7 | 97.8 | 97.8 | 98.2 |

| MAGNETIC FIELD [Oe] | 20 | 32 | 50 | 70 | 100 | 140 | 200 | 320 | 500 |
|---|---|---|---|---|---|---|---|---|---|
| FF2 OUTPUT RESIDUE [%] | 97.6 | 99.7 | 96.5 | 94.3 | 90.4 | 85.9 | 75.5 | 65.4 | 36.7 |
| FF3 OUTPUT RESIDUE [%] | 98.9 | 98.6 | 97.7 | 98.6 | 96.8 | 92 | 90.7 | 82.6 | 75.4 |

TABLE 40

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| FF2 OUTPUT RESIDUE [%] | 99.4 | 96.9 | 96.7 | 97.7 | 97.4 | 96 | 98.7 | 97.4 |
| FF3 OUTPUT RESIDUE [%] | 97.4 | 97.7 | 97.3 | 99 | 98.7 | 95.8 | 97.4 | 100 |

| MAGNETIC FIELD [Oe] | 20 | 32 | 50 | 70 | 100 | 140 | 200 | 320 | 500 |
|---|---|---|---|---|---|---|---|---|---|
| FF2 OUTPUT RESIDUE [%] | 99.6 | 97.7 | 96.2 | 93.7 | 87.6 | 79.7 | 65.4 | 42.6 | 25.8 |
| FF3 OUTPUT RESIDUE [%] | 98.8 | 96.7 | 97.4 | 97.2 | 98.2 | 94.2 | 92.8 | 86.7 | 76.2 |

TABLE 41

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| FF2 OUTPUT RESIDUE [%] | 99.4 | 95.6 | 96.2 | 96.4 | 97.8 | 99 | 97.4 | 98.6 |
| FF3 OUTPUT RESIDUE [%] | 98.6 | 96.7 | 99 | 97.8 | 95.3 | 96.4 | 97.7 | 99.5 |

| MAGNETIC FIELD [Oe] | 20 | 32 | 50 | 70 | 100 | 140 | 200 | 320 | 500 |
|---|---|---|---|---|---|---|---|---|---|
| FF2 OUTPUT RESIDUE [%] | 97.4 | 98.4 | 99.5 | 81.7 | 67.7 | 46.6 | 32 | 25.4 | 20.5 |
| FF3 OUTPUT RESIDUE [%] | 97.6 | 98 | 99.7 | 96.5 | 94.4 | 90.7 | 82.4 | 65.6 | 37.2 |

TABLE 42

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| FF2 OUTPUT RESIDUE [%] | 99.5 | 99.2 | 96.4 | 95.7 | 96.8 | 99.5 | 99 | 98.8 |
| FF3 OUTPUT RESIDUE [%] | 98.4 | 96.6 | 97.7 | 99.2 | 98.4 | 95.7 | 99.9 | 97.2 |

| MAGNETIC FIELD [Oe] | 20 | 32 | 50 | 70 | 100 | 140 | 200 | 320 | 500 |
|---|---|---|---|---|---|---|---|---|---|
| FF2 OUTPUT RESIDUE [%] | 95.4 | 97.7 | 96.6 | 94.4 | 90.7 | 85.7 | 75.3 | 65.5 | 35.8 |
| FF3 OUTPUT RESIDUE [%] | 96.5 | 98.7 | 96.6 | 98.7 | 96.7 | 94.8 | 90.6 | 82.7 | 74 |

As has been described in Examples A, when a magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention MM2 and FF3, it was possible to obtain a higher output stability than the conventional apparatus example AA1.

Moreover, in the apparatus example FF3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example FF3 of the present invention can provide a magnetic disc apparatus having a high output stability, enabling to realize a high recording density.

8. Examples M

Medium examples were prepared in the same way as in Examples F except for that the Co target was replaced by a CoZr target. Addition of Zr functions to reduce the crystalline particle size.

The medium examples having the CoZr—C dispersed film of 500 nm thickness and 400 nm thickness will be referred to as medium examples M2 and M3, respectively.

From the aforementioned, it can be said that the magnetization process of the NiFe film is the domain wall shift, whereas the magnetization process of the CoZr—C dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples MM2, MM3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

The check results showed the tendency just like the results in Examples E. As shown in Table 43, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example MM2 according to the present invention, the reproduction output fluctuation was suppressed within 5% for the magnetic field of 20 Oe or below. Similarly, in the apparatus example MM3 according to the present invention, the reproduction output fluctuation was suppressed within 5% for the magnetic field of 50 Oe or below. Thus, the apparatus examples according to the present invention exhibited an output stability higher than the conventional apparatus example AA1.

TABLE 43

| Magnetic Field applied in Direction of 0 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| MM2 OUTPUT RESIDUE [%] | 96.5 | 97.2 | 95 | 96.7 | 96.6 | 97.2 | 96.1 | 99.1 |
| MM3 OUTPUT RESIDUE [%] | 99.3 | 97.5 | 97.7 | 95.8 | 96.2 | 99.6 | 97.4 | 99.8 |
| MAGNETIC FIELD [Oe] | 20 | 32 | 50 | 70 | 100 | 140 | 200 | 320 | 500 |
| MM2 OUTPUT RESIDUE [%] | 98.8 | 93.7 | 87.6 | 79.2 | 65.8 | 42.7 | 25.6 | 20.5 | 15.9 |
| MM3 OUTPUT RESIDUE [%] | 98.5 | 95.7 | 97.3 | 94.4 | 91.7 | 86.6 | 76.8 | 60.8 | 35.3 |

The medium examples M2 and M3 according to the invention and the conventional example A1 were used in combination with the mono-pole/MR composite head of inductive/MR composite head to constitute magnetic disc apparatus examples, which will be referred to as apparatus examples MM2, MM3, and conventional apparatus example AA1, respectively.

The conditions of the head mounted and the recording conditions were same as in Examples A.

In order to check the domain wall configuration of the CoZr—C dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the CoZr—C dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 43, the apparatus example MM3 can further suppress the output reduction than the apparatus example MM2. This is because the medium example M2 uses as the undercoat soft magnetic film the CoZr—C dispersed film having a thickness smaller than that of the medium example M3, so that less magnetic flux can pass through. Accordingly, in the medium example M3 compared to the medium example M2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoZr—C dispersed film having a thickness of 400 nm or below, it was possible to obtain a reproduction output residue ratio identical to that of the apparatus example MM3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 44 to 48 show output reduction ratio obtained when the magnetic field was applied at the other angles.

TABLE 44

Magnetic Field in Direction of 30 degrees

| MAGNETIC FIELD [Oe] | 1 | 1.4 | 2 | 3.2 | 5 | 7 | 10 | 14 | |
|---|---|---|---|---|---|---|---|---|---|
| MM2 OUTPUT RESIDUE [%] | 97.6 | 96.4 | 96.8 | 96.5 | 97.4 | 97.7 | 96.2 | 97.8 | |
| MM3 OUTPUT RESIDUE [%] | 96.5 | 97.8 | 97.6 | 95.7 | 97.1 | 95.6 | 96.3 | 97.2 | |
| MAGNETIC FIELD [Oe] | 20 | 32 | 50 | 70 | 100 | 140 | 200 | 320 | 500 |
| MM2 OUTPUT RESIDUE [%] | 99.6 | 96.4 | 88.8 | 79.2 | 66.4 | 44.8 | 27.9 | 21.5 | 13.8 |
| MM3 OUTPUT RESIDUE [%] | 99.6 | 98.6 | 98.4 | 97.6 | 94.2 | 88.4 | 80.2 | 60.1 | 35.2 |

TABLE 45

Magnetic Field in Direction of 60 degrees

| MAGNETIC FIELD [Oe] | 1 | 1.4 | 2 | 3.2 | 5 | 7 | 10 | 14 | |
|---|---|---|---|---|---|---|---|---|---|
| MM2 OUTPUT RESIDUE [%] | 98.5 | 97.6 | 95.7 | 96.8 | 99.9 | 98.1 | 95.2 | 96.3 | |
| MM3 OUTPUT RESIDUE [%] | 98.7 | 100 | 99.7 | 98.6 | 97.8 | 97.2 | 97.7 | 98.6 | |
| MAGNETIC FIELD [Oe] | 20 | 32 | 50 | 70 | 100 | 140 | 200 | 320 | 500 |
| MM2 OUTPUT RESIDUE [%] | 97.4 | 99.5 | 96.6 | 94.2 | 90.7 | 85.8 | 75.9 | 65 | 36.5 |
| MM3 OUTPUT RESIDUE [%] | 98.2 | 98.4 | 97.6 | 98.5 | 96.7 | 92.2 | 90.6 | 82.2 | 75.8 |

TABLE 46

Magnetic Field in Direction of 90 degrees

| MAGNETIC FIELD [Oe] | 1 | 1.4 | 2 | 3.2 | 5 | 7 | 10 | 14 | |
|---|---|---|---|---|---|---|---|---|---|
| MM2 OUTPUT RESIDUE [%] | 99.8 | 96.7 | 96.2 | 97.6 | 97.4 | 96 | 98.2 | 97.1 | |
| MM3 OUTPUT RESIDUE [%] | 97.6 | 97.4 | 97.6 | 99.8 | 98.7 | 95.8 | 97.4 | 100 | |
| MAGNETIC FIELD [Oe] | 20 | 32 | 50 | 70 | 100 | 140 | 200 | 320 | 500 |
| MM2 OUTPUT RESIDUE [%] | 99.9 | 97.7 | 96.5 | 93.7 | 87.3 | 79.7 | 65.1 | 42.6 | 25.7 |
| MM3 OUTPUT RESIDUE [%] | 98.9 | 96.6 | 97.3 | 97.7 | 98.6 | 94.2 | 92.7 | 86.7 | 76.1 |

TABLE 47

Magnetic Field in Direction of −30 degrees

| MAGNETIC FIELD [Oe] | 1 | 1.4 | 2 | 3.2 | 5 | 7 | 10 | 14 | |
|---|---|---|---|---|---|---|---|---|---|
| MM2 OUTPUT RESIDUE [%] | 99.6 | 95.7 | 96.1 | 96.9 | 97.4 | 99.5 | 97.6 | 98.7 | |
| MM3 OUTPUT RESIDUE [%] | 98.4 | 96.4 | 99.4 | 97.4 | 95.4 | 96.6 | 97.4 | 99.8 | |
| MAGNETIC FIELD [Oe] | 20 | 32 | 50 | 70 | 100 | 140 | 200 | 320 | 500 |
| MM2 OUTPUT RESIDUE [%] | 97.6 | 98.1 | 99.8 | 81.8 | 67.8 | 46.4 | 32.5 | 25.3 | 20.2 |
| MM3 OUTPUT RESIDUE [%] | 97.8 | 98 | 99.7 | 96.8 | 94.4 | 90.4 | 82.1 | 65.6 | 37.4 |

TABLE 48

| | Magnetic Field in Direction of −60 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| MM2 OUTPUT RESIDUE [%] | 99.7 | 99.6 | 96.1 | 95.7 | 96.8 | 99.4 | 99 | 98.5 | |
| MM3 OUTPUT RESIDUE [%] | 98.6 | 96.1 | 97.7 | 99.4 | 98.4 | 95.8 | 99.9 | 97.3 | |
| MAGNETIC FIELD [Oe] | 20 | 32 | 50 | 70 | 100 | 140 | 200 | 320 | 500 |
| MM2 OUTPUT RESIDUE [%] | 95.6 | 97.7 | 96.2 | 94.4 | 90.9 | 85.7 | 75 | 65.5 | 35.5 |
| MM3 OUTPUT RESIDUE [%] | 96.6 | 98.7 | 96.4 | 98.7 | 96.9 | 94.8 | 90 | 82.7 | 74.2 |

As has been described in Examples A, when a magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention MM2 and MM3, it was possible to obtain a higher output stability than the conventional apparatus example AA1.

Moreover, in the apparatus example MM3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1. Moreover, the same tendency was observed when using a Co atarget with addition of Nb, B, Ta instead of Zr.

Moreover, similar results were obtained for the apparatus using the inductive/MR composite head. In this case also, the apparatus example of the present invention exhibited a further higher output stability than the conventional apparatus example AA1.

Thus, the apparatus example MM3 of the present invention can provide a magnetic disc apparatus having a high output stability, enabling to realize a high recording density.

9. Examples G

Medium examples were prepared in the same way as in Examples E except for that the Co target was replaced by a CoFe target.

The medium examples having the CoFe—SiO$_2$ dispersed film of 500 nm thickness and 400 nm thickness will be referred to as medium examples G2 and G3, respectively.

The medium examples G2 and G3 according to the invention and the conventional example A1 were used in combination with the mono-pole/MR composite head of inductive/MR composite head to constitute magnetic disc apparatus examples, which will be referred to as apparatus examples GG2, GG3, and conventional apparatus example AA1, respectively.

The conditions of the head mounted and the recording conditions were same as in Examples A.

In order to check the domain wall configuration of the CoFe—SiO$_2$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoFe—siO$_2$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples GG2, GG3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

Tables 49 to 54 show the check results and FIGS. 26 to 31 show the results graphically.

TABLE 49

| | Magnetic Field applied in Direction of 0 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| GG2 OUTPUT RESIDUE [%] | 96.8 | 97.6 | 98.6 | 97.5 | 98.6 | 97.6 | 96.8 | 95.6 | |
| GG3 OUTPUT RESIDUE [%] | 100 | 97.6 | 97.6 | 95.8 | 96.8 | 97.8 | 98.6 | 97.6 | |
| MAGNETIC FIELD [Oe] | 20 | 32 | 50 | 70 | 100 | 140 | 200 | 320 | 500 |
| GG2 OUTPUT RESIDUE [%] | 96.8 | 95.6 | 87.4 | 79.7 | 65.1 | 42.9 | 25.5 | 20.4 | 15.9 |
| GG3 OUTPUT RESIDUE [%] | 96.8 | 95.6 | 97.8 | 94.7 | 92.1 | 86.4 | 76.6 | 60.7 | 35.0 |

TABLE 50

Magnetic Field in Direction of 30 degrees

| MAGNETIC FIELD [Oe] | 1 | 1.4 | 2 | 3.2 | 5 | 7 | 10 | 14 | |
|---|---|---|---|---|---|---|---|---|---|
| GG2 OUTPUT RESIDUE [%] | 97.8 | 98.6 | 97.5 | 98.6 | 99.3 | 104 | 98.6 | 97.5 | |
| GG3 OUTPUT RESIDUE [%] | 98.6 | 97.6 | 96.8 | 95.6 | 98.6 | 98.6 | 97.5 | 98.6 | |
| MAGNETIC FIELD [Oe] | 20 | 32 | 50 | 70 | 100 | 140 | 200 | 320 | 500 |
| GG2 OUTPUT RESIDUE [%] | 98.6 | 96.2 | 88.3 | 80.4 | 66.8 | 45.9 | 27.4 | 22.5 | 13.1 |
| GG3 OUTPUT RESIDUE [%] | 97.8 | 96.2 | 98.5 | 97.2 | 94.1 | 88.8 | 80.2 | 60.6 | 35.7 |

TABLE 51

Magnetic Field in Direction of 60 degrees

| MAGNETIC FIELD [Oe] | 1 | 1.4 | 2 | 3.2 | 5 | 7 | 10 | 14 | |
|---|---|---|---|---|---|---|---|---|---|
| GG2 OUTPUT RESIDUE [%] | 98.5 | 97.4 | 97.6 | 97.6 | 95.8 | 103 | 97.6 | 97.6 | |
| GG3 OUTPUT RESIDUE [%] | 98.5 | 97.6 | 96.8 | 95.8 | 97.8 | 97.6 | 99.2 | 97.6 | |
| MAGNETIC FIELD [Oe] | 20 | 32 | 50 | 70 | 100 | 140 | 200 | 320 | 500 |
| GG2 OUTPUT RESIDUE [%] | 95.8 | 99.4 | 97.8 | 94.0 | 90.3 | 85.8 | 75.6 | 65.4 | 36.4 |
| GG3 OUTPUT RESIDUE [%] | 97.6 | 97.4 | 99.3 | 98.2 | 96.8 | 92.1 | 90.5 | 82.3 | 75.8 |

TABLE 52

Magnetic Field in Direction of 90 degrees

| MAGNETIC FIELD [Oe] | 1 | 1.4 | 2 | 3.2 | 5 | 7 | 10 | 14 | |
|---|---|---|---|---|---|---|---|---|---|
| GG2 OUTPUT RESIDUE [%] | 100 | 97.6 | 97.6 | 95.8 | 96.5 | 97.8 | 97.6 | 96.8 | |
| GG3 OUTPUT RESIDUE [%] | 97.8 | 97.6 | 96.3 | 99.2 | 97.6 | 97.6 | 97.6 | 96.8 | |
| MAGNETIC FIELD [Oe] | 20 | 32 | 50 | 70 | 100 | 140 | 200 | 320 | 500 |
| GG2 OUTPUT RESIDUE [%] | 95.6 | 97.2 | 96.8 | 93.2 | 87.1 | 79.9 | 65.4 | 42.8 | 25.0 |
| GG3 OUTPUT RESIDUE [%] | 95.6 | 96.8 | 97.6 | 97.8 | 98.3 | 94.5 | 92.4 | 86.9 | 76.7 |

TABLE 53

Magnetic Field in Direction of −30 degrees

| MAGNETIC FIELD [Oe] | 1 | 1.4 | 2 | 3.2 | 5 | 7 | 10 | 14 | |
|---|---|---|---|---|---|---|---|---|---|
| GG2 OUTPUT RESIDUE [%] | 97.6 | 98.3 | 99.2 | 96.8 | 95.6 | 97.6 | 95.8 | 100 | |
| GG3 OUTPUT RESIDUE [%] | 98.7 | 96.5 | 97.6 | 96.3 | 99.2 | 96.8 | 95.8 | 96.8 | |
| MAGNETIC FIELD [Oe] | 20 | 32 | 50 | 70 | 100 | 140 | 200 | 320 | 500 |
| GG2 OUTPUT RESIDUE [%] | 95.8 | 96.8 | 99.7 | 81.8 | 67.6 | 46.2 | 32.6 | 25.1 | 20.7 |
| GG3 OUTPUT RESIDUE [%] | 97.6 | 98.1 | 99.2 | 96.7 | 94.4 | 90.5 | 82.8 | 65.9 | 35.6 |

TABLE 54

Magnetic Field in Direction of −60 degrees

| MAGNETIC FIELD [Oe] | 1 | 1.4 | 2 | 3.2 | 5 | 7 | 10 | 14 | |
|---|---|---|---|---|---|---|---|---|---|
| GG2 OUTPUT RESIDUE [%] | 102 | 95.8 | 96.5 | 97.8 | 97.4 | 96.8 | 97.6 | 96.8 | |
| GG3 OUTPUT RESIDUE [%] | 98.4 | 96.5 | 97.8 | 95.8 | 96.5 | 97.6 | 96.8 | 95.6 | |
| MAGNETIC FIELD [Oe] | 20 | 32 | 50 | 70 | 100 | 146 | 200 | 320 | 500 |
| GG2 OUTPUT RESIDUE [%] | 95.6 | 97.1 | 96.8 | 94.4 | 90.8 | 85.9 | 75.3 | 65.7 | 36.4 |
| GG3 OUTPUT RESIDUE [%] | 96.5 | 98.5 | 97.6 | 98.4 | 96.5 | 94.7 | 90.5 | 82.6 | 75.4 |

Figure 26:
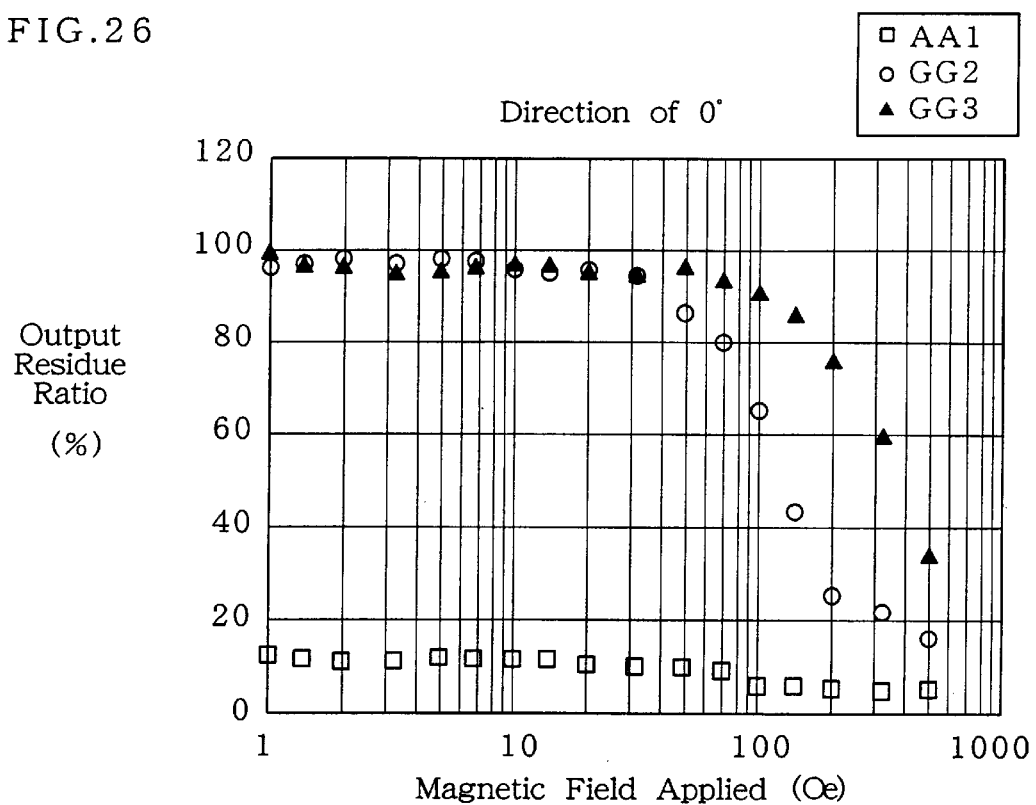
Figure 27:
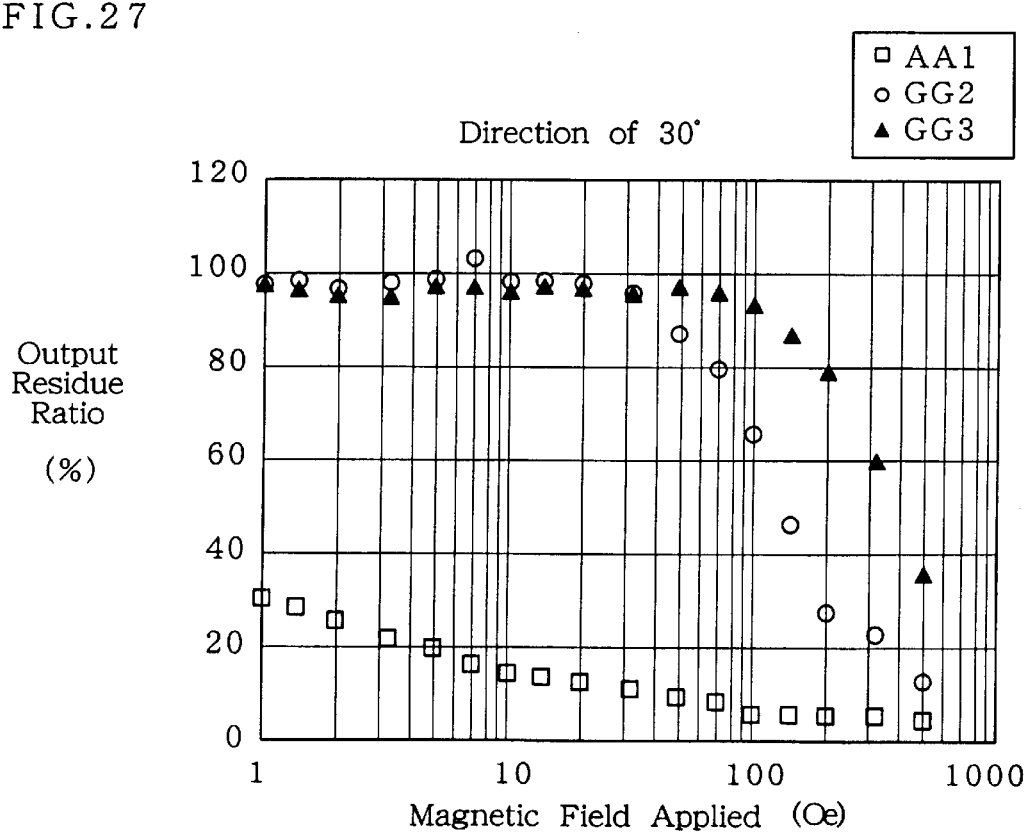
FIG. 27 graphically shows a reproduction output residue after application of an external magnetic field in the examples G.
Figure 28:
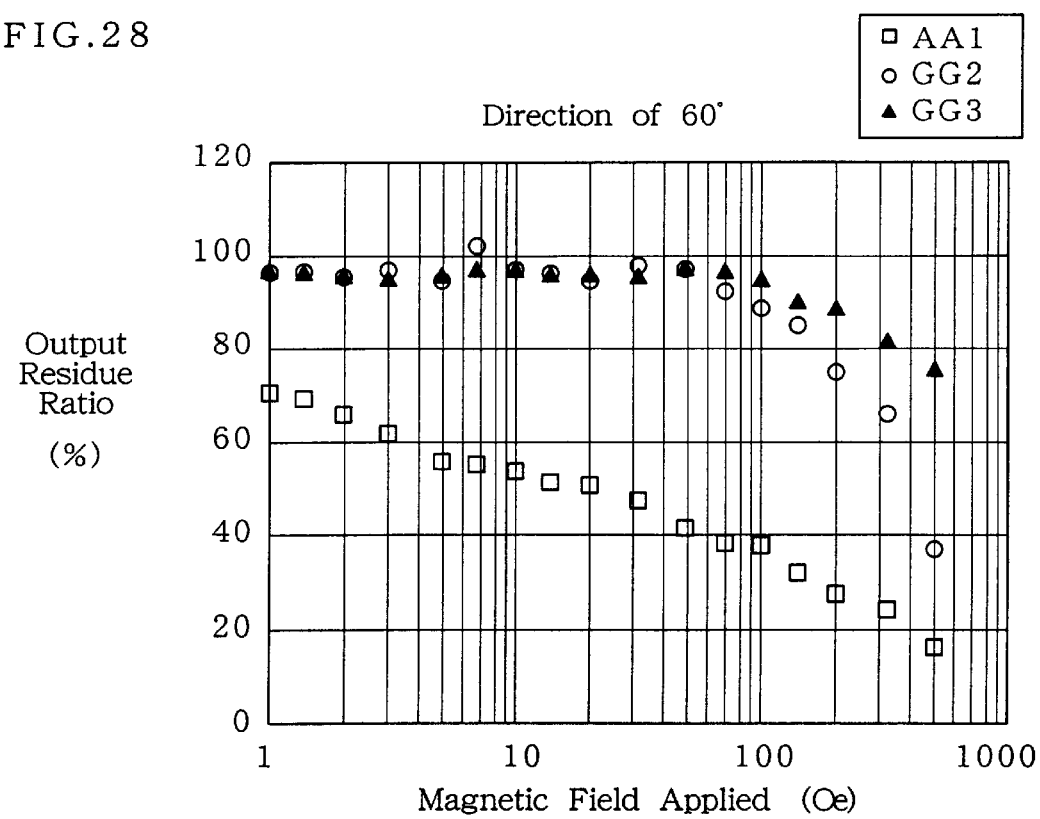
FIG. 28 graphically shows a reproduction output residue after application of an external magnetic field in the examples G.
Figure 29:
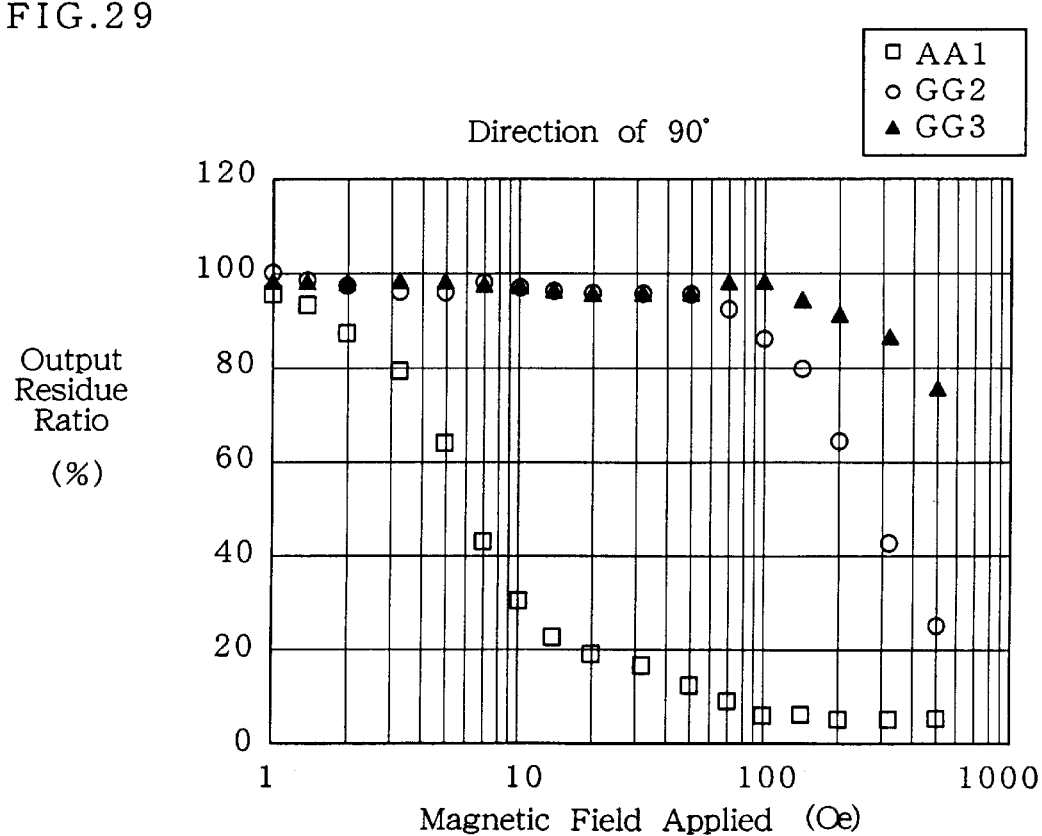
FIG. 29 graphically shows a reproduction output residue after application of an external magnetic field in the examples G.
Figure 30:
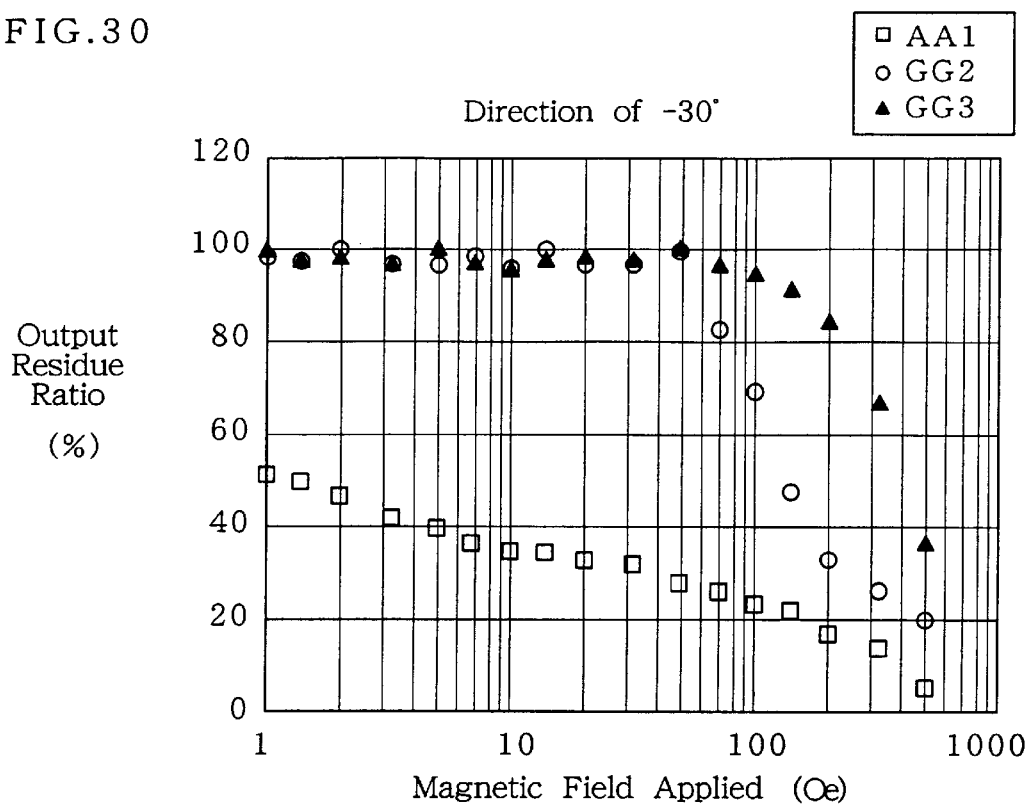
FIG. 30 graphically shows a reproduction output residue after application of an external magnetic field in the examples G.
Figure 31:
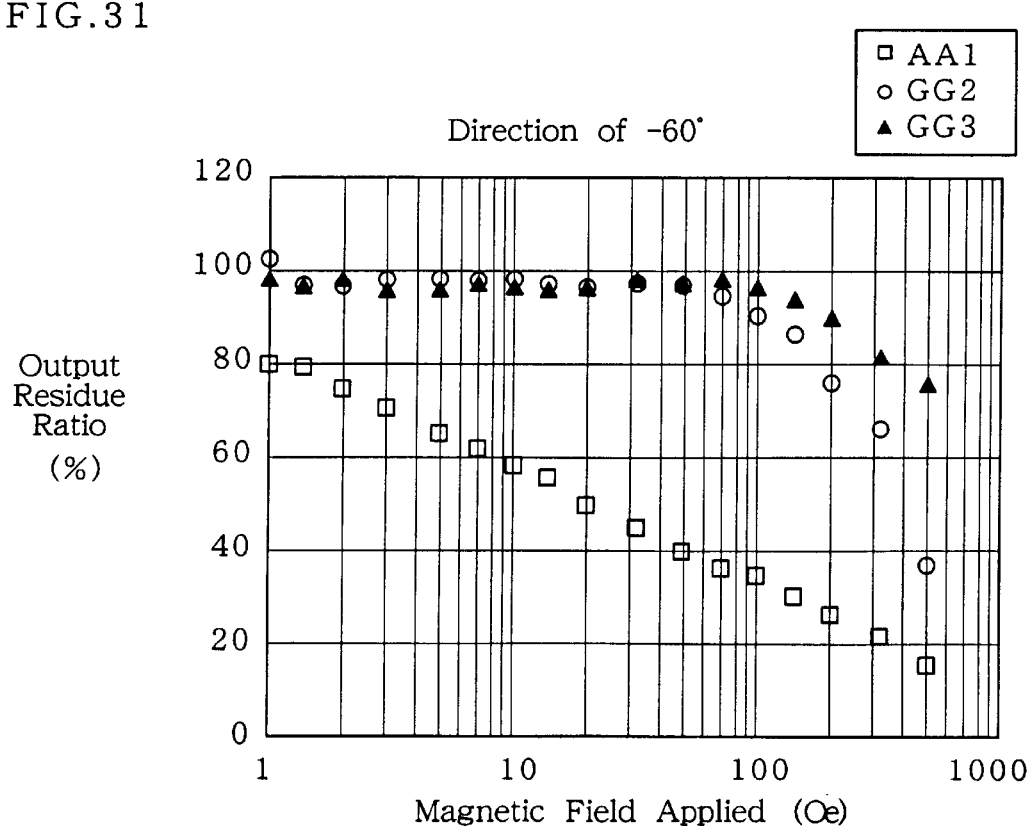
FIG. 31 graphically shows a reproduction output residue after application of an external magnetic field in the examples E.

As shown in Table 49 and FIG. 26, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example GG2 according to the present invention, the reproduction output fluctuation was suppressed within 5% for the magnetic field of 20 Oe or below. Similarly, in the apparatus example GG3 according to the present invention, the reproduction output fluctuation was suppressed within 5% for the magnetic field of 50 Oe or below. Thus, the apparatus examples according to the present invention exhibited an output stability higher than the. conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the CoFe—$SiO_2$ dispersed film whose magnetization does not depend on the domain wall shift. Accordingly, even if a magnetic field is applied, the magnetic flux will not be easily concentrated to the mono-pole head main magnetic pole, which may cause reduction in the output. Moreover, as can be understood from Table 49 and FIG. 26, the apparatus example GG3 can further suppress the output reduction than the apparatus example GG2. This is because the medium example G2 uses as the undercoat soft magnetic film the CoFe—$SiO_2$ dispersed film having a thickness smaller than that of the medium example G3, so that less magnetic flux can pass through. Accordingly, in the medium example G3 compared to the medium example G2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoFe—$SiO_2$ dispersed film having a thickness of 400 nm or below, it was possible to obtain a reproduction output residue ratio identical to that of the apparatus example GG3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 50 to 54 show output reduction ratio obtained when the magnetic field was applied at the other angles. FIG. 27 to FIG. 31 show the results graphically.

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention GG2 and GG3, it was possible to obtain a higher output stability than the conventional apparatus example AA1.

Moreover, in the apparatus example GG3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example GG3 of the present invention can provide a magnetic disc apparatus having a high output stability, enabling to realize a high recording density.

10. Examples N

Medium examples were prepared in the same way as in Examples G except for that the CoFe target was replaced by a CoFeB target. Addition of the B has an effect to reduce the crystalline particle size.

The medium examples having the CoFeB—$SiO_2$ dispersed film of 500 nm thickness and 400 nm thickness will be referred to as medium examples N2 and N3, respectively.

The medium examples N2 and N3 according to the invention and the conventional example A1 were used in combination with the mono-pole/MR composite head of inductive/MR composite head to constitute magnetic disc apparatus examples, which will be referred to as apparatus examples NN2, NN3, and conventional apparatus example AA1, respectively.

The conditions of the head mounted and the recording conditions were same as in Examples A.

In order to check the domain wall configuration of the CoFeB—$SiO_2$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the agnetization process of the NiFe film is the domain wall shift, whereas the magnetization process of the CoFeB—$siO_2$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples NN2, NN3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

As shown in Table 55, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example NN2 according to the present invention, the reproduction output fluctuation was suppressed within 5% for the magnetic field of 20 Oe or below. Similarly, in the apparatus example NN3 according to the present invention, the reproduction output fluctuation was suppressed within 5% for the magnetic field of 50 Oe or below. Thus, the apparatus examples according to the present invention exhibited an output stability higher than the conventional apparatus example AA1.

TABLE 55

| | Magnetic Field applied in Direction of 0 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| NN2 OUTPUT RESIDUE [%] | 96.7 | 97.5 | 98.9 | 97.1 | 98.7 | 96.9 | 96.8 | 95.7 | |
| NN3 OUTPUT RESIDUE [%] | 99.4 | 97.7 | 97.8 | 95.4 | 96.6 | 97.7 | 98.5 | 97.2 | |
| MAGNETIC FIELD [Oe] | 20 | 32 | 50 | 70 | 100 | 140 | 200 | 320 | 500 |
| NN2 OUTPUT RESIDUE [%] | 96.7 | 95.5 | 87.8 | 79.2 | 65.0 | 42.4 | 25.9 | 20.5 | 16.1 |
| NN3 OUTPUT RESIDUE [%] | 96.6 | 95.3 | 97.4 | 94.6 | 92.0 | 86.7 | 76.5 | 60.4 | 35.5 |

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the CoFeB—$SiO_2$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 55 and FIG. 26, the apparatus example NN3 can further suppress the output reduction than the apparatus example NN2. This is because the medium example N2 uses as the undercoat soft magnetic film the CoFeB—$SiO_2$ dispersed film having a thickness smaller than that of the medium example N3, so that less magnetic flux can pass through. Accordingly, in the medium example N3 compared to the medium example N2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoFeB—$SiO_2$ dispersed film having a thickness of 400 nm or below, it was possible to obtain a reproduction output residue ratio identical to that of the apparatus example NN3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 56 to 60 show output reduction ratio obtained when the magnetic field was applied at the other angles.

TABLE 56

| | Magnetic Field in Direction of 30 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| NN2 OUTPUT RESIDUE [%] | 97.2 | 98.4 | 97.5 | 98.4 | 99.1 | 104 | 98.7 | 97.4 | |
| NN3 OUTPUT RESIDUE [%] | 98.5 | 97.6 | 96.1 | 95.6 | 98.9 | 98.6 | 97.4 | 97.9 | |
| MAGNETIC FIELD [Oe] | 20 | 32 | 50 | 70 | 100 | 140 | 200 | 320 | 500 |
| NN2 OUTPUT RESIDUE [%] | 98.6 | 96.6 | 88.3 | 80.9 | 66.8 | 45.4 | 26.7 | 21.8 | 13.8. |
| NN3 OUTPUT RESIDUE [%] | 97.4 | 96.6 | 98.5 | 97.2 | 94.0 | 88.9 | 80.5 | 60.7 | |

TABLE 57

| | Magnetic Field in Direction of 60 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| NN2 OUTPUT RESIDUE [%] | 98.6 | 97.1 | 97.8 | 97.6 | 95.4 | 103 | 97.4 | 97.6 | |
| NN3 OUTPUT RESIDUE [%] | 98.4 | 97.6 | 96.1 | 95.8 | 97.4 | 97.6 | 99.6 | 97.6 | |
| MAGNETIC FIELD [Oe] | 20 | 32 | 50 | 70 | 100 | 140 | 200 | 320 | 500 |
| NN2 OUTPUT RESIDUE [%] | 95.6 | 99.4 | 97.2 | 94.0 | 90.7 | 85.8 | 75.4 | 65.4 | 36.3 |
| NN3 OUTPUT RESIDUE [%] | 97.7 | 97.4 | 99.4 | 98.2 | 96.4 | 92.0 | 90.5 | 82.7 | 75.8 |

TABLE 58

Magnetic Field in Direction of 90 degrees

| MAGNETIC FIELD [Oe] | 1 | 1.4 | 2 | 3.2 | 5 | 7 | 10 | 14 | |
|---|---|---|---|---|---|---|---|---|---|
| NN2 OUTPUT RESIDUE [%] | 99.5 | 97.6 | 97.4 | 95.8 | 96.7 | 97.8 | 97.4 | 96.7 | |
| NN3 OUTPUT RESIDUE [%] | 97.4 | 97.6 | 96.3 | 99.5 | 97.6 | 97.6 | 97.4 | 96.8 | |
| MAGNETIC FIELD [Oe] | 20 | 32 | 50 | 70 | 100 | 140 | 200 | 320 | 500 |
| NN2 OUTPUT RESIDUE [%] | 95.6 | 97.0 | 96.8 | 93.0 | 87.1 | 79.6 | 65.4 | 42.5 | 25.0 |
| NN3 OUTPUT RESIDUE [%] | 95.2 | 96.8 | 97.4 | 97.8 | 98.8 | 94.5 | 92.3 | 86.9 | 76.1 |

TABLE 59

Magnetic Field in Direction of −30 degrees

| MAGNETIC FIELD [Oe] | 1 | 1.4 | 2 | 3.2 | 5 | 7 | 10 | 14 | |
|---|---|---|---|---|---|---|---|---|---|
| NN2 OUTPUT RESIDUE [%] | 97.4 | 96.3 | 99.0 | 96.8 | 95.8 | 97.6 | 95.4 | 100 | |
| NN3 OUTPUT RESIDUE [%] | 98.6 | 96.5 | 97.4 | 96.3 | 99.0 | 96.8 | 95.7 | 96.8 | |
| MAGNETIC FIELD [Oe] | 20 | 32 | 50 | 70 | 100 | 140 | 200 | 320 | 500 |
| NN2 OUTPUT RESIDUE [%] | 95.8 | 96.4 | 99.7 | 81.7 | 67.6 | 46.4 | 32.6 | 25.0 | 19.8 |
| NN3 OUTPUT RESIDUE [%] | 97.4 | 98.1 | 99.0 | 96.7 | 94.3 | 90.7 | 82.8 | 66.0 | 35.6 |

TABLE 60

Magnetic Field in Direction of −60 degrees

| MAGNETIC FIELD [Oe] | 1 | 1.4 | 2 | 3.2 | 5 | 7 | 10 | 14 | |
|---|---|---|---|---|---|---|---|---|---|
| NN2 OUTPUT RESIDUE [%] | 101 | 95.9 | 96.5 | 97.4 | 97.4 | 96.6 | 97.6 | 96.7 | |
| NN3 OUTPUT RESIDUE [%] | 98.6 | 96.5 | 97.4 | 95.8 | 96.7 | 97.6 | 97.0 | 95.6 | |
| MAGNETIC FIELD [Oe] | 20 | 32 | 50 | 70 | 100 | 140 | 200 | 320 | 500 |
| NN2 OUTPUT RESIDUE [%] | 95.6 | 97.0 | 96.8 | 94.3 | 90.8 | 86.0 | 75.3 | 65.8 | 36.2 |
| NN3 OUTPUT RESIDUE [%] | 96.5 | 98.6 | 97.6 | 98.5 | 97.1 | 94.8 | 90.6 | 82.6 | 75.1 |

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention NN2 and NN3, it was possible to obtain a higher output stability than the conventional apparatus example AA1.

Moreover, in the apparatus example NN3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1. The same tendency was observed when Nb, Zr, Ta was added instead of B to the Co target.

Moreover, similar results were obtained for the apparatus using the inductive/MR composite head. In this case also, the apparatus example of the present invention exhibited a further higher output stability than the conventional apparatus example AA1.

Thus, the apparatus example NN3 of the present invention can provide a magnetic disc apparatus having a high output stability, enabling to realize a high recording density.

11. Examples H

Medium examples were prepared in the same way as in Examples E except for that the Co target was replaced by a CoFe target, and that the SiO$_2$ target was replaced by a C target.

The medium examples having the CoFe—C dispersed film of 500 nm thickness and 400 nm thickness will be referred to as medium examples H2 and H3, respectively.

The medium examples H2 and H3 according to the invention and the conventional example A1 were used in combination with the mono-pole/MR composite head of inductive/MR composite head to constitute magnetic disc apparatus examples, which will be referred to as apparatus examples HH2, HH3, and conventional apparatus example AA1, respectively.

The conditions of the head mounted and the recording conditions were same as in Examples A.

In order to check the domain wall configuration of the CoFe—C dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoFe—C dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples HH2, HH3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field. The results obtained show the same tendency as in Examples G.

As shown in Table 61, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example HH2 according to the present invention, the reproduction output fluctuation was suppressed within 5% for the magnetic field of 20 Oe or below. Similarly, in the apparatus example HH3 according to the present invention, the reproduction output fluctuation was suppressed within 5% for the magnetic field of 50 Oe or below. Thus, the apparatus examples according to the present invention exhibited an output stability higher than the conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the CoFe—C dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 61 and FIG. 26, the apparatus example HH3 can further suppress the output reduction than the apparatus example HH2. This is because the medium example H2 uses as the undercoat soft magnetic film the CoFe—C dispersed film having a thickness smaller than that of the medium example H3, so that less magnetic flux can pass through. Accordingly, in the medium example H3 compared to the medium example H2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoFe—C dispersed film having a thickness of 400 nm or below, it was possible to obtain a reproduction output residue ratio identical to that of the apparatus example HH3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 62 to 66 show output reduction ratio obtained when the magnetic field was applied at the other angles.

TABLE 61

| Magnetic Field applied in Direction of 0 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| HH2 OUTPUT RESIDUE [%] | 96.4 | 97.5 | 99.0 | 97.1 | 98.8 | 96.9 | 96.7 | 95.7 | |
| HH3 OUTPUT RESIDUE [%] | 99.4 | 97.4 | 97.8 | 95.7 | 96.6 | 97.3 | 98.5 | 97.0 | |
| MAGNETIC FIELD [Oe] | 20 | 32 | 50 | 70 | 100 | 140 | 200 | 320 | 500 |
| HH2 OUTPUT RESIDUE [%] | 96.7 | 95.4 | 87.8 | 79.7 | 65.0 | 42.6 | 25.9 | 21.1 | 16.9 |
| HH3 OUTPUT RESIDUE [%] | 96.6 | 95.7 | 97.4 | 94.7 | 92.0 | 86.8 | 76.5 | 61.1 | 35.6 |

TABLE 62

| Magnetic Field in Direction of 30 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| HH2 OUTPUT RESIDUE [%] | 97.1 | 98.4 | 97.7 | 98.4 | 99.0 | 104 | 98.4 | 97.4 | |
| HH3 OUTPUT RESIDUE [%] | 98.4 | 97.6 | 96.1 | 95.8 | 98.9 | 98.1 | 97.4 | 98.0 | |
| MAGNETIC FIELD [Oe] | 20 | 32 | 50 | 70 | 100 | 140 | 200 | 320 | 500 |
| HH2 OUTPUT RESIDUE [%] | 98.6 | 96.9 | 88.3 | 81.1 | 66.8 | 45.6 | 26.7 | 21.7 | 13.1 |
| HH3 OUTPUT RESIDUE [%] | 97.4 | 96.8 | 98.5 | 97.4 | 94.1 | 88.9 | 80.8 | 61.5 | 35.8 |

TABLE 63

Magnetic Field in Direction of 60 degrees

| MAGNETIC FIELD [Oe] | 1 | 1.4 | 2 | 3.2 | 5 | 7 | 10 | 14 |  |
|---|---|---|---|---|---|---|---|---|---|
| HH2 OUTPUT RESIDUE [%] | 98.9 | 97.2 | 97.8 | 97.6 | 95.7 | 103 | 97.0 | 97.6 |  |
| HH3 OUTPUT RESIDUE [%] | 98.6 | 97.6 | 96.0 | 95.8 | 97.8 | 97.6 | 99.4 | 97.6 |  |
| MAGNETIC FIELD [Oe] | 20 | 32 | 50 | 70 | 100 | 140 | 200 | 320 | 500 |
| HH2 OUTPUT RESIDUE [%] | 95.6 | 99.6 | 96.9 | 94.0 | 91.1 | 85.5 | 75.7 | 65.4 | 36.8 |
| HH3 OUTPUT RESIDUE [%] | 97.7 | 97.9 | 99.4 | 98.4 | 96.4 | 92.4 | 90.5 | 82.8 | 76.1 |

TABLE 64

Magnetic Field in Direction of 90 degrees

| MAGNETIC FIELD [Oe] | 1 | 1.4 | 2 | 3.2 | 5 | 7 | 10 | 14 |  |
|---|---|---|---|---|---|---|---|---|---|
| HH2 OUTPUT RESIDUE [%] | 99.4 | 97.6 | 97.7 | 95.8 | 96.4 | 97.8 | 97.2 | 96.8 |  |
| HH3 OUTPUT RESIDUE [%] | 97.6 | 97.6 | 96.2 | 99.5 | 97.5 | 97.6 | 97.3 | 96.8 |  |
| MAGNETIC FIELD [Oe] | 20 | 32 | 50 | 70 | 100 | 140 | 200 | 320 | 500 |
| HH2 OUTPUT RESIDUE [%] | 95.6 | 97.4 | 96.8 | 93.6 | 87.1 | 79.7 | 65.4 | 42.2 | 25.1 |
| HH3 OUTPUT RESIDUE [%] | 95.6 | 96.8 | 97.5 | 97.8 | 98.4 | 94.5 | 92.9 | 86.9 | 76.0 |

TABLE 65

Magnetic Field in Direction of −30 degrees

| MAGNETIC FIELD [Oe] | 1 | 1.4 | 2 | 3.2 | 5 | 7 | 10 | 14 |  |
|---|---|---|---|---|---|---|---|---|---|
| HH2 OUTPUT RESIDUE [%] | 97.7 | 96.3 | 99.1 | 96.8 | 95.9 | 96.9 | 95.4 | 99.9 |  |
| HH3 OUTPUT RESIDUE [%] | 98.7 | 96.5 | 97.3 | 96.3 | 99.1 | 96.8 | 95.4 | 96.8 |  |
| MAGNETIC FIELD [Oe] | 20 | 32 | 50 | 70 | 100 | 140 | 200 | 320 | 500 |
| HH2 OUTPUT RESIDUE [%] | 95.4 | 96.4 | 99.6 | 81.7 | 67.2 | 46.4 | 32.7 | 25.4 | 20.5 |
| HH3 OUTPUT RESIDUE [%] | 97.3 | 98.1 | 99.1 | 96.7 | 94.2 | 90.7 | 82.9 | 66.1 | 35.7 |

TABLE 66

Magnetic Field in Direction of −60 degrees

| MAGNETIC FIELD [Oe] | 1 | 1.4 | 2 | 3.2 | 5 | 7 | 10 | 14 |  |
|---|---|---|---|---|---|---|---|---|---|
| HH2 OUTPUT RESIDUE [%] | 100 | 95.8 | 96.5 | 97.6 | 97.4 | 96.2 | 97.6 | 96.4 |  |
| HH3 OUTPUT RESIDUE [%] | 98.7 | 96.5 | 97.2 | 95.8 | 96.8 | 97.6 | 97.5 | 95.7 |  |
| MAGNETIC FIELD [Oe] | 20 | 32 | 50 | 70 | 100 | 140 | 200 | 320 | 500 |
| HH2 OUTPUT RESIDUE [%] | 95.5 | 97.4 | 96.9 | 94.3 | 90.5 | 86.0 | 75.4 | 65.7 | 36.8 |
| HH3 OUTPUT RESIDUE [%] | 96.4 | 98.9 | 97.6 | 98.2 | 97.1 | 94.5 | 90.4 | 82.6 | 75.6 |

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention HH2 and HH3, it was possible to obtain a higher output stability than the conventional apparatus example AA1.

Moreover, in the apparatus example HH3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example HH3 of the present invention can provide a magnetic disc apparatus having a high output stability, enabling to realize a high recording density.

12. Examples P

Medium examples were prepared in the same way as in Examples H except for that the CoFe target was replaced by a CoFeTa target. The addition of Ta has an effect to reduce the crystalline particle size.

The medium examples having the CoFeTa—C dispersed film of 500 nm thickness and 400 nm thickness will be referred to as medium examples P2 and P3, respectively.

of 50 Oe or below. Thus, the apparatus examples according to the present invention exhibited an output stability higher than the conventional apparatus example AA1.

TABLE 67

| | Magnetic Field applied in Direction of 0 degrees | | | | | | | | |
|---|---|---|---|---|---|---|---|---|---|
| MAGNETIC FIELD [Oe] | 1 | 1.4 | 2 | 3.2 | 5 | 7 | 10 | 14 | |
| PP2 OUTPUT RESIDUE [%] | 96.6 | 97.7 | 99.0 | 97.4 | 98.9 | 96.9 | 96.7 | 95.2 | |
| PP3 OUTPUT RESIDUE [%] | 99.6 | 97.4 | 97.4 | 95.7 | 96.2 | 97.3 | 98.6 | 97.0 | |
| MAGNETIC FIELD [Oe] | 20 | 32 | 50 | 70 | 100 | 140 | 200 | 320 | 500 |
| PP2 OUTPUT RESIDUE [%] | 96.6 | 95.7 | 87.9 | 79.7 | 65.4 | 42.6 | 26.0 | 21.8 | 17.1 |
| PP3 OUTPUT RESIDUE [%] | 96.9 | 95.7 | 97.2 | 94.7 | 92.4 | 86.8 | 76.9 | 62.8 | 35.9 |

The medium examples P2 and P3 according to the invention and the conventional example A1 were used in combination with the mono-pole/MR composite head of inductive/MR composite head to constitute magnetic disc apparatus examples, which will be referred to as apparatus examples PP2, PP3, and conventional apparatus example AA1, respectively.

The conditions of the head mounted and the recording conditions were same as in Examples A.

In order to check the domain wall configuration of the CoFeTa—C dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoFeTa—C dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium.examples on the apparatus examples PP2, PP3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

As shown in Table 67, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example PP2 according to the present invention, the reproduction output fluctuation was suppressed within 5% for the magnetic field of 20 Oe or below. Similarly, in the apparatus example PP3 according to the present invention, the reproduction output fluctuation was suppressed within 5% for the magnetic field As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the CoFeTa—C dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 67 and FIG. 26, the apparatus example PP3 can further suppress the output reduction than the apparatus example PP2. This is because the medium example P2 uses as the undercoat soft magnetic film the CoFeTa—C dispersed film having a thickness smaller than that of the medium example P3, so that less magnetic flux can pass through. Accordingly, in the medium example P3 compared to the medium example P2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoFeTa—C dispersed film having a thickness of 400 nm or below, it was possible to obtain a reproduction output residue ratio identical to that of the apparatus example PP3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 68 to 72 show output reduction ratio obtained when the magnetic field was applied at the other angles.

TABLE 68

| Magnetic Field in Direction of 30 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| PP2 OUTPUT RESIDUE [%] | 97.5 | 98.4 | 97.9 | 98.4 | 99.6 | 103 | 98.6 | 97.4 |
| PP3 OUTPUT RESIDUE [%] | 98.7 | 97.6 | 96.8 | 95.8 | 99.0 | 98.1 | 98.1 | 98.9 |
| MAGNETIC FIELD [Oe] | 20 | 32 | 50 | 70 | 100 | 140 | 200 | 320 | 500 |
| PP2 OUTPUT RESIDUE [%] | 98.8 | 96.9 | 88.9 | 81.1 | 67.1 | 46.4 | 26.7 | 22.8 | 13.6 |
| PP3 OUTPUT RESIDUE [%] | 97.4 | 96.5 | 98.5 | 97.2 | 94.1 | 88.6 | 80.8 | 61.7 | 35.6 |

TABLE 69

| Magnetic Field in Direction of 60 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| PP2 OUTPUT RESIDUE [%] | 98.5 | 97.2 | 97.7 | 97.6 | 95.2 | 103 | 97.9 | 97.6 |
| PP3 OUTPUT RESIDUE [%] | 98.4 | 97.6 | 96.8 | 95.8 | 96.9 | 97.6 | 99.3 | 97.6 |
| MAGNETIC FIELD [Oe] | 20 | 32 | 50 | 70 | 100 | 140 | 200 | 320 | 500 |
| PP2 OUTPUT RESIDUE [%] | 95.6 | 99.6 | 97.0 | 94.0 | 91.6 | 85.5 | 75.8 | 65.4 | 35.9 |
| PP3 OUTPUT RESIDUE [%] | 97.4 | 97.9 | 99.8 | 98.4 | 96.6 | 92.4 | 90.4 | 82.8 | 76.7 |

TABLE 70

| Magnetic Field in Direction of 90 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| PP2 OUTPUT RESIDUE [%] | 99.9 | 97.9 | 97.9 | 95.8 | 96.6 | 97.8 | 97.5 | 96.8 |
| PP3 OUTPUT RESIDUE [%] | 97.5 | 97.5 | 96.5 | 99.5 | 97.8 | 97.6 | 97.5 | 96.8 |
| MAGNETIC FIELD [Oe] | 20 | 32 | 50 | 70 | 100 | 140 | 200 | 320 | 500 |
| PP2 OUTPUT RESIDUE [%] | 95.6 | 97.4 | 96.9 | 93.6 | 87.9 | 79.7 | 65.3 | 42.7 | 25.8 |
| PP3 OUTPUT RESIDUE [%] | 95.6 | 96.5 | 97.5 | 97.5 | 98.4 | 94.7 | 92.9 | 86.5 | 76.5 |

TABLE 71

| Magnetic Field in Direction of −30 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| PP2 OUTPUT RESIDUE [%] | 97.6 | 96.3 | 99.9 | 96.8 | 95.5 | 96.9 | 95.2 | 99.9 |
| PP3 OUTPUT RESIDUE [%] | 98.2 | 96.5 | 97.2 | 96.3 | 99.2 | 96.8 | 95.2 | 96.2 |
| MAGNETIC FIELD [Oe] | 20 | 32 | 50 | 70 | 100 | 140 | 200 | 320 | 500 |
| PP2 OUTPUT RESIDUE [%] | 95.9 | 96.4 | 99.9 | 81.7 | 67.9 | 46.4 | 32.9 | 25.0 | 23.5 |
| PP3 OUTPUT RESIDUE [%] | 97.5 | 98.5 | 99.1 | 96.5 | 94.2 | 90.5 | 83.1 | 66.9 | 35.9 |

TABLE 72

| Magnetic Field in Direction of −60 degrees | | | | | | | | |
|---|---|---|---|---|---|---|---|---|
| MAGNETIC FIELD [Oe] | 1 | 1.4 | 2 | 3.2 | 5 | 7 | 10 | 14 |
| PP2 OUTPUT RESIDUE [%] | 99.6 | 95.7 | 96.6 | 97.7 | 97.6 | 96.5 | 97.8 | 96.7 |
| PP3 OUTPUT RESIDUE [%] | 98.6 | 96.5 | 97.2 | 95.6 | 96.8 | 97.8 | 97.8 | 95.7 |
| MAGNETIC FIELD [Oe] | 20 | 32 | 50 | 70 | 100 | 140 | 200 | 320 | 500 |
| PP2 OUTPUT RESIDUE [%] | 95.8 | 97.5 | 96.9 | 94.4 | 90.5 | 86.9 | 75.4 | 65.9 | 36.8 |
| PP3 OUTPUT RESIDUE [%] | 96.4 | 99.8 | 97.4 | 98.2 | 97.7 | 94.7 | 90.7 | 82.4 | 74.8 |

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention PP2 and PP3, it was possible to obtain a higher output stability than the conventional apparatus example AA1.

Moreover, in the apparatus example PP3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1. The same tendency was observed when Nb, Zr, or B was added instead of Ta to the Co target when preparing the medium examples.

Moreover, similar results were obtained for the apparatus using the inductive/MR composite head. In this case also, the apparatus example of the present invention exhibited a further higher output stability than the conventional apparatus example AA1.

Thus, the apparatus example PP3 of the present invention can provide a magnetic disc apparatus having a high output stability, enabling to realize a high recording density.

13. Examples J

Medium examples were prepared in the same way as in Examples E except for that the $SiO_2$ target was replaced by an $Al_2O_3$ target.

The medium examples having the Co—$Al_2O_3$ dispersed film of 500 nm thickness and 400 nm thickness will be referred to as medium examples J2 and J3, respectively.

The medium examples J2 and J3 according to the invention and the conventional example A1 were used in combination with the mono-pole/MR composite head of inductive/MR composite head to constitute magnetic disc apparatus examples, which will be referred to as apparatus examples JJ2, JJ3, and conventional apparatus example AA1, respectively.

The conditions of the head mounted and the recording conditions were same as in Examples A.

In order to check the domain wall configuration of the Co—$Al_2O_3$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the Co—$Al_2O_3$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples JJ2, JJ3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

Tables 73 to 78 show the check results and FIGS. 32 to 37 show the results graphically.

TABLE 73

Magnetic Field applied in Direction of 0 degrees

| MAGNETIC FIELD [Oe] | 1 | 1.4 | 2 | 3.2 | 5 | 7 | 10 | 14 |
|---|---|---|---|---|---|---|---|---|
| JJ2 OUTPUT RESIDUE [%] | 97.6 | 95.8 | 98.6 | 97.5 | 98.6 | 95.8 | 96.8 | 95.6 |
| JJ3 OUTPUT RESIDUE [%] | 95.8 | 96.5 | 97.8 | 97.6 | 97.6 | 96.3 | 98.6 | 97.6 |
| MAGNETIC FIELD [Oe] | 20 | 32 | 50 | 70 | 100 | 140 | 200 | 320 | 500 |
| JJ2 OUTPUT RESIDUE [%] | 98.6 | 95.6 | 87.4 | 79.7 | 65.0 | 42.9 | 52.8 | 20.6 | 15.4 |
| JJ3 OUTPUT RESIDUE [%] | 96.8 | 95.6 | 97.8 | 94.7 | 92.5 | 86.6 | 76.7 | 60.9 | 35.2 |

TABLE 74

Magnetic Field in Direction of 30 degrees

| MAGNETIC FIELD [Oe] | 1 | 1.4 | 2 | 3.2 | 5 | 7 | 10 | 14 |
|---|---|---|---|---|---|---|---|---|
| JJ2 OUTPUT RESIDUE [%] | 97.8 | 98.6 | 97.6 | 96.3 | 99.3 | 104 | 98.6 | 97.5 |
| JJ3 OUTPUT RESIDUE [%] | 98.6 | 97.6 | 96.8 | 95.6 | 98.6 | 98.6 | 97.5 | 97.8 |
| MAGNETIC FIELD [Oe] | 20 | 32 | 50 | 70 | 100 | 140 | 200 | 320 | 500 |
| JJ2 OUTPUT RESIDUE [%] | 98.6 | 96.2 | 88.3 | 80.4 | 66.7 | 45.5 | 27.6 | 22.4 | 13.6 |
| JJ3 OUTPUT RESIDUE [%] | 97.6 | 96.8 | 98.5 | 97.2 | 94.1 | 88.7 | 80.8 | 60.9 | 35.4 |

TABLE 75

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| JJ2 OUTPUT RESIDUE [%] | 98.5 | 97.4 | 97.6 | 95.8 | 95.8 | 97.6 | 96.3 | 97.6 |
| JJ3 OUTPUT RESIDUE [%] | 98.5 | 95.8 | 98.6 | 97.5 | 97.8 | 97.6 | 99.2 | 97.6 |

| MAGNETIC FIELD [Oe] | 20 | 32 | 50 | 70 | 100 | 140 | 200 | 320 | 500 |
|---|---|---|---|---|---|---|---|---|---|
| JJ2 OUTPUT RESIDUE [%] | 95.8 | 99.4 | 97.8 | 94.0 | 90.4 | 85.9 | 75.1 | 65.0 | 36.9 |
| JJ3 OUTPUT RESIDUE [%] | 95.8 | 98.6 | 97.5 | 98.2 | 96.8 | 92.5 | 90.4 | 82.8 | 75.7 |

TABLE 76

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| JJ2 OUTPUT RESIDUE [%] | 100 | 97.6 | 97.6 | 95.8 | 96.5 | 97.8 | 95.8 | 98.6 |
| JJ3 OUTPUT RESIDUE [%] | 97.8 | 97.6 | 96.3 | 99.2 | 97.6 | 97.8 | 97.6 | 96.8 |

| MAGNETIC FIELD [Oe] | 20 | 32 | 50 | 70 | 100 | 140 | 200 | 320 | 500 |
|---|---|---|---|---|---|---|---|---|---|
| JJ2 OUTPUT RESIDUE [%] | 96.8 | 95.6 | 98.6 | 93.1 | 87.6 | 79.5 | 65.2 | 42.1 | 25.9 |
| JJ3 OUTPUT RESIDUE [%] | 95.6 | 96.8 | 97.6 | 97.8 | 98.3 | 94.1 | 92.2 | 86.4 | 76.6 |

TABLE 77

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| JJ2 OUTPUT RESIDUE [%] | 96.8 | 95.6 | 97.6 | 96.3 | 97.6 | 95.8 | 95.8 | 95.8 |
| JJ3 OUTPUT RESIDUE [%] | 95.8 | 98.6 | 97.5 | 96.3 | 99.2 | 97.8 | 97.6 | 96.8 |

| MAGNETIC FIELD [Oe] | 20 | 32 | 50 | 70 | 100 | 140 | 200 | 320 | 500 |
|---|---|---|---|---|---|---|---|---|---|
| JJ2 OUTPUT RESIDUE [%] | 98.6 | 97.5 | 99.7 | 81.8 | 67.5 | 46.6 | 32.7 | 25.6 | 20.5 |
| JJ3 OUTPUT RESIDUE [%] | 97.6 | 98.1 | 99.2 | 96.7 | 94.4 | 90.6 | 82.4 | 65.9 | 35.8 |

TABLE 78

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| JJ2 OUTPUT RESIDUE [%] | 96.8 | 95.6 | 98.6 | 98.6 | 97.5 | 96.8 | 97.6 | 96.8 |
| JJ3 OUTPUT RESIDUE [%] | 98.4 | 95.8 | 97.6 | 96.3 | 97.6 | 96.8 | 96.8 | 95.6 |

| MAGNETIC FIELD [Oe] | 20 | 32 | 50 | 70 | 100 | 140 | 200 | 320 | 500 |
|---|---|---|---|---|---|---|---|---|---|
| JJ2 OUTPUT RESIDUE [%] | 95.6 | 97.1 | 96.8 | 94.4 | 90.8 | 85.4 | 75.2 | 65.9 | 36.7 |
| JJ3 OUTPUT RESIDUE [%] | 95.8 | 98.6 | 97.5 | 98.4 | 96.5 | 94.5 | 90.4 | 82.9 | 75.7 |

Figure 32:
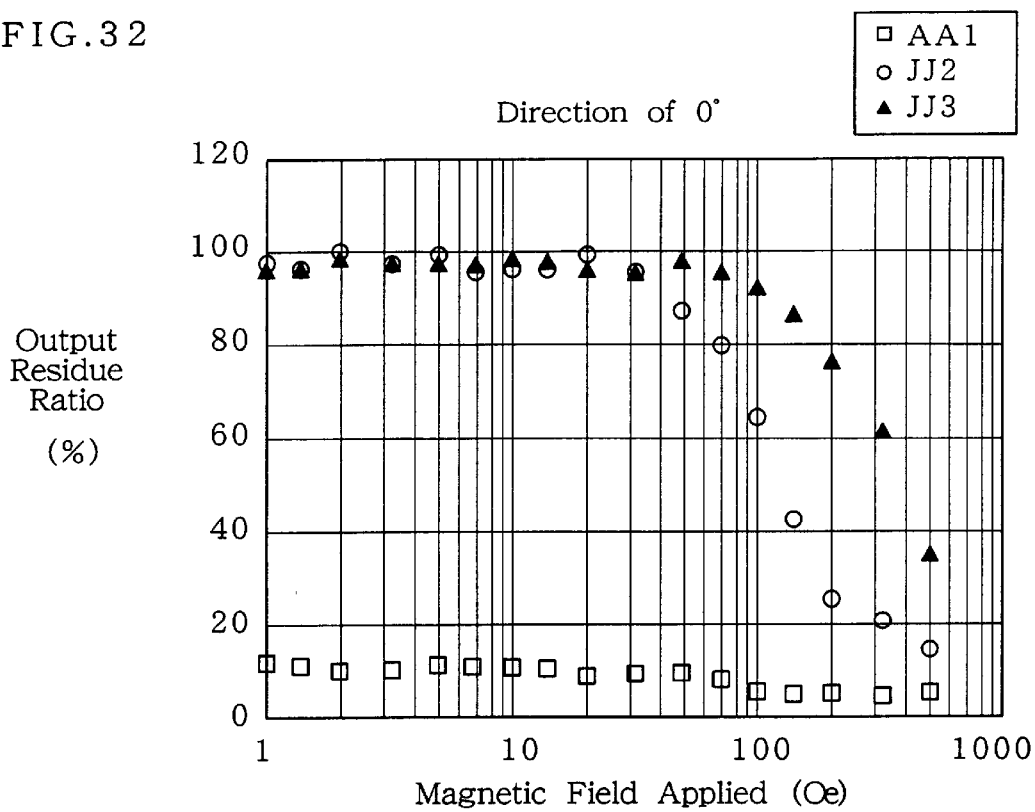
FIG. 32 graphically shows a reproduction output residue after application of an external magnetic field in the examples J.
Figure 33:
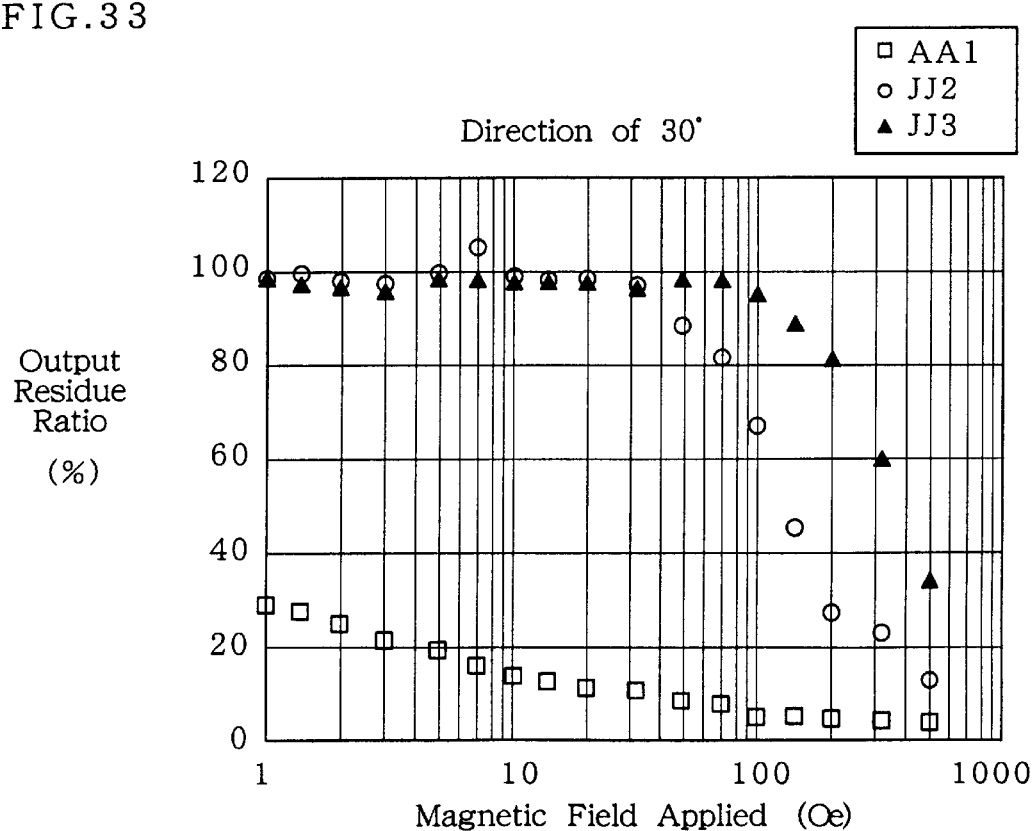
FIG. 33 graphically shows a reproduction output residue after application of an external magnetic field in the examples J.
Figure 34:
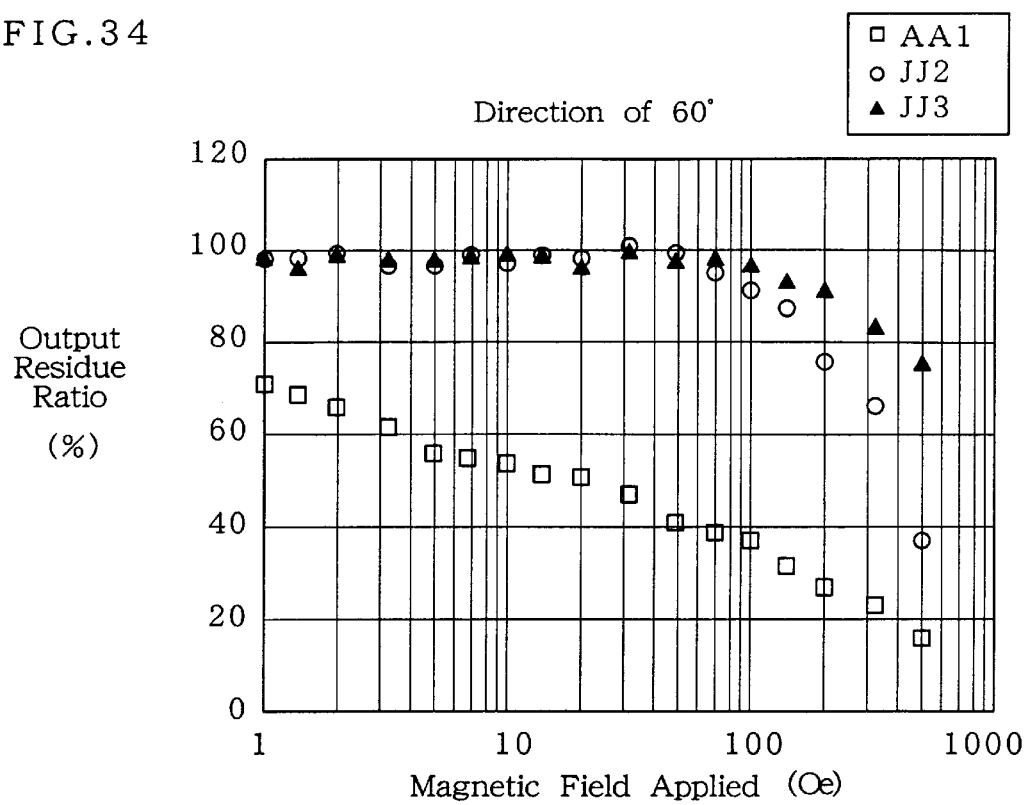
FIG. 34 graphically shows a reproduction output residue after application of an external magnetic field in the examples J.
Figure 35:
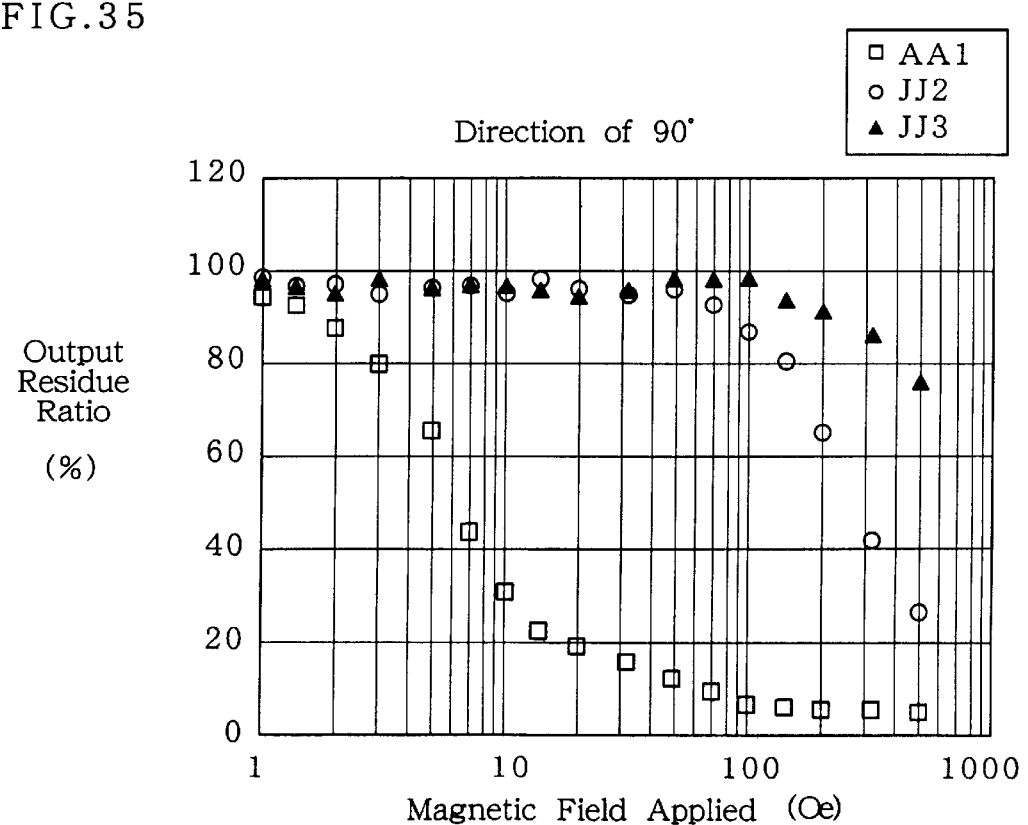
FIG. 35 graphically shows a reproduction output residue after application of an external magnetic field in the examples J.
Figure 36:
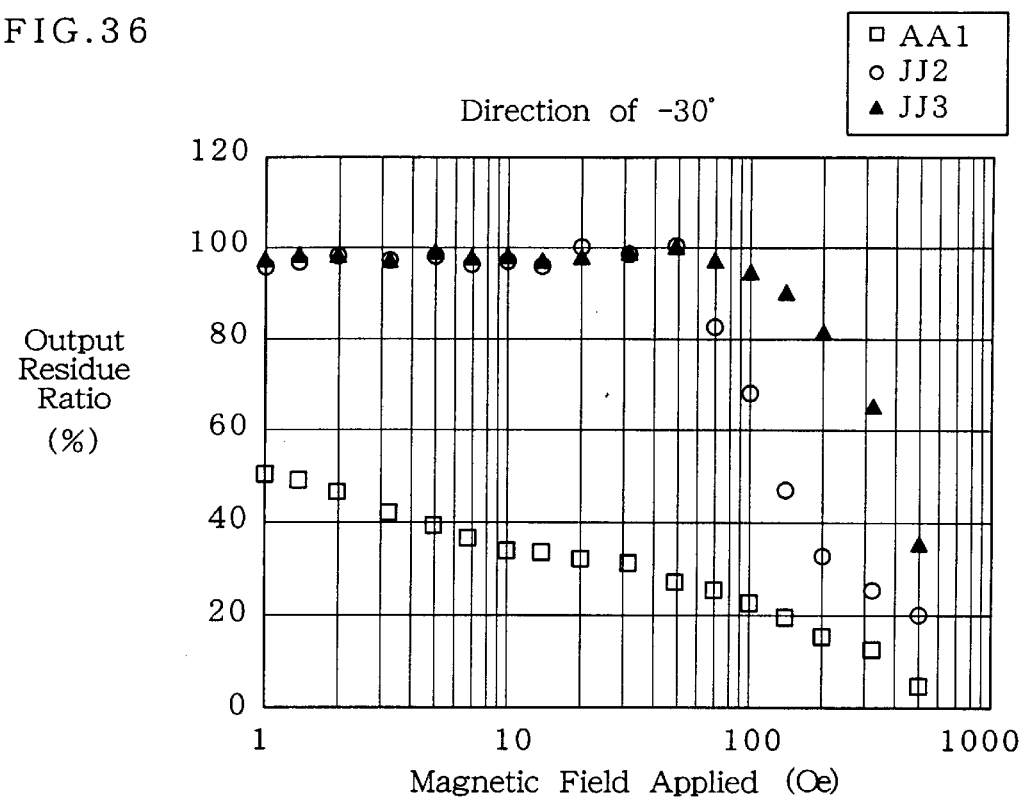
FIG. 36 graphically shows a reproduction output residue after application of an external magnetic field in the examples J.
Figure 37:
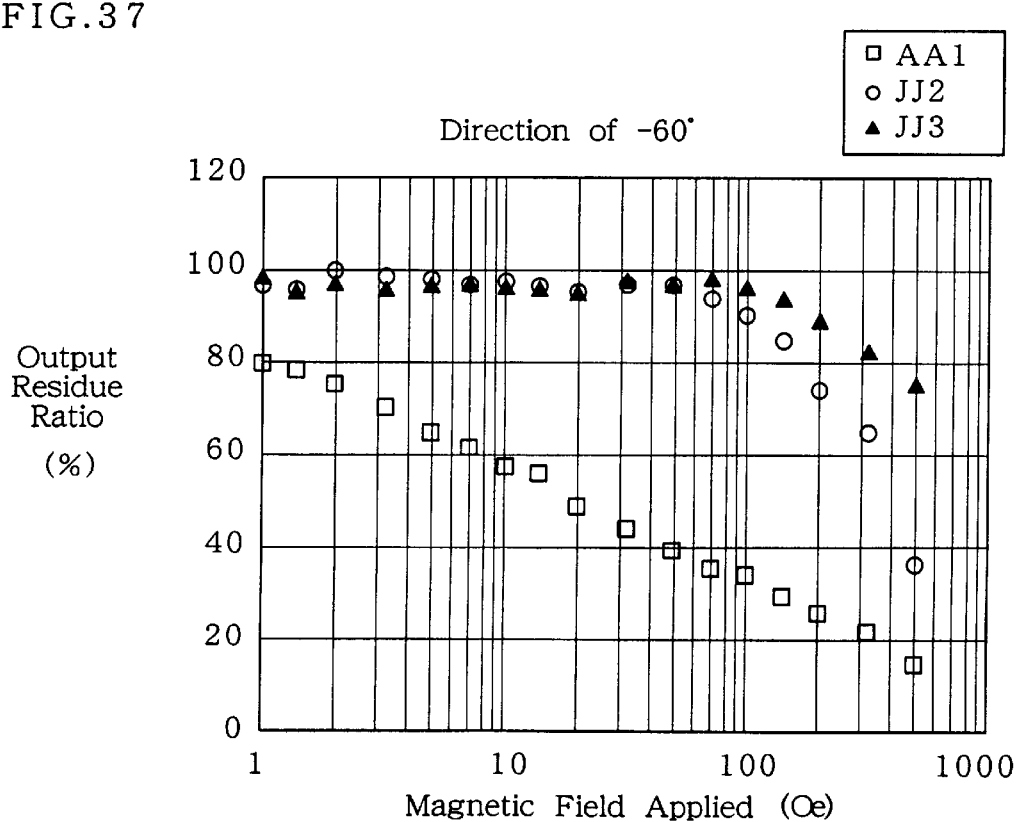
FIG. 37 graphically shows a reproduction output residue after application of an external magnetic field in the examples J.
Figure 38:
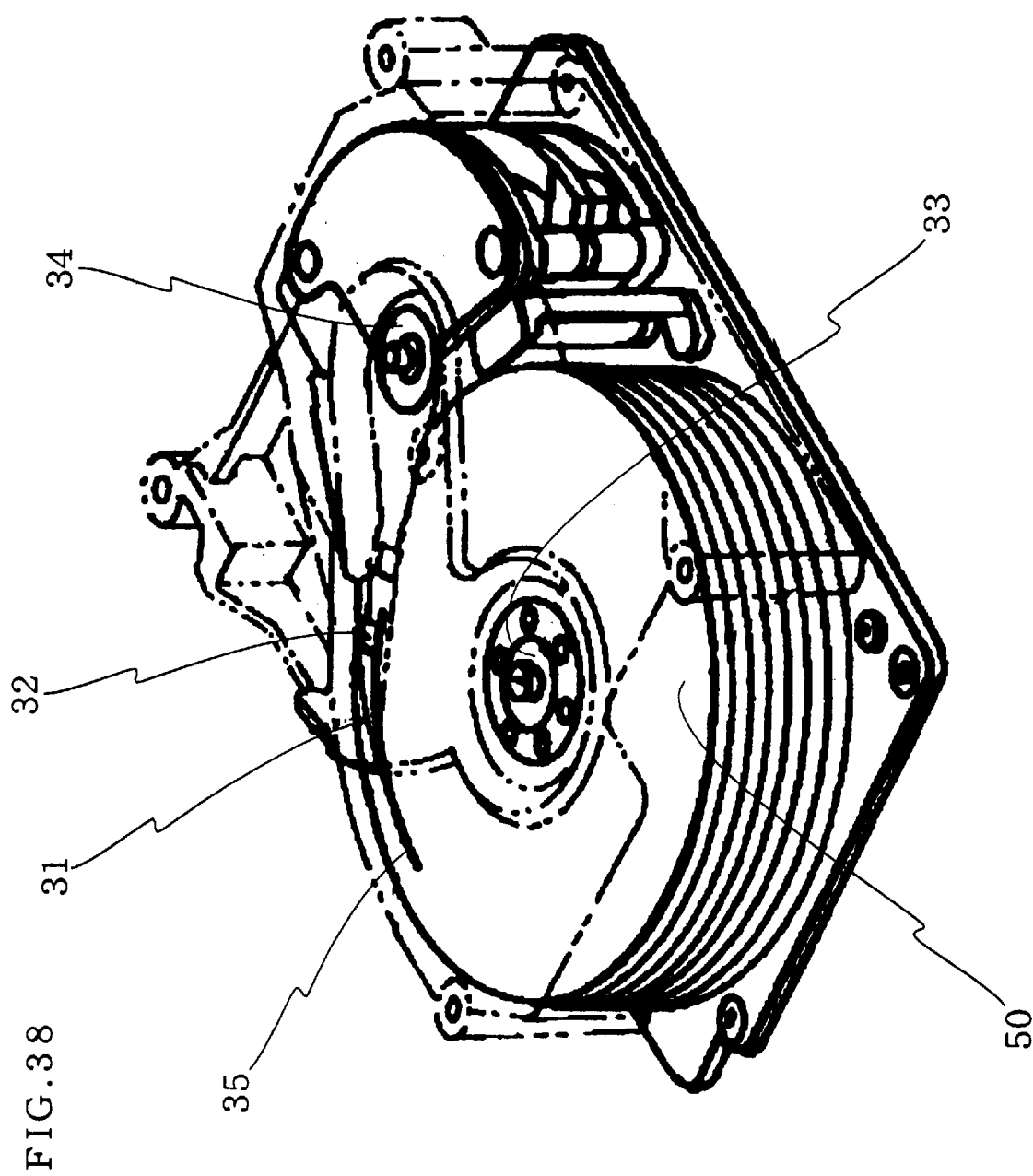
FIG. 38 schematically shows a conventional magnetic disc apparatus.
Figure 39:
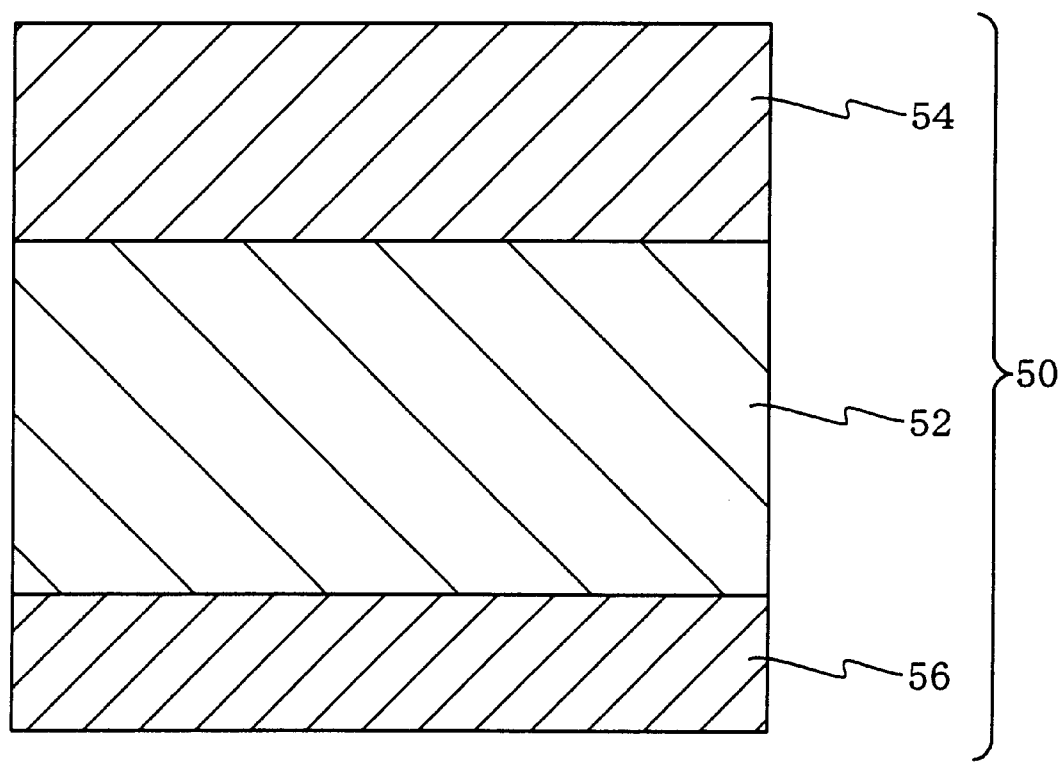
FIG. 39 is a cross sectional view of conventional vertical magnetic recording medium.

As shown in Table 73 and FIG. 32, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example JJ2 according to the present invention, the reproduction output fluctuation was suppressed within 5% for the magnetic field of 20 Oe or below. Similarly, in the apparatus example JJ3 according to the present invention, the reproduction output fluctuation was suppressed within 5% for the magnetic field of 50 Oe or below. Thus, the apparatus examples according to the present invention exhibited an output stability higher than the conventional apparatus example AA1.

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the Co—$Al_2O_3$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 73 and FIG. 32, the apparatus example JJ3 can further suppress the output reduction than the apparatus example JJ2. This is because the medium example J2 uses as the undercoat soft magnetic film the Co—Al$_2$O$_3$ dispersed film having a thickness smaller than that of the medium example J3, so that less magnetic flux can pass through. Accordingly, in the medium example J3 compared to the medium example J2, the magnetic flux cannot be easily concentrated on the monopole head main magnetic pole. Consequently, from the viewpoint of the output stability, it is preferable that the undercoat soft magnetic film of the medium be as thin as possible. In the aforementioned check, in the apparatus using a medium including the Co—Al$_2$O$_3$ dispersed film having a thickness of 400 nm or below, it was possible to obtain a reproduction output residue ratio identical to that of the apparatus example JJ3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 74 to 78 show output reduction ratio obtained when the magnetic field was applied at the other angles. FIG. 27 to FIG. 31 show the results graphically.

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention JJ2 and JJ3, it was possible to obtain a higher output stability than the conventional apparatus example AA1.

Moreover, in the apparatus example JJ3 of the present invention, no output reduction was caused up to about 70 Ce in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example JJ3 of the present invention can provide a magnetic disc apparatus having a high output stability, enabling to realize a high recording density.

14. Examples Q

Medium examples were prepared in the same way as in Examples J except for that the Co target was replaced by a CoNb target. Addition of the Nb has an effect to reduce the crystalline particle size.

The medium examples having the CoNb—Al$_2$O$_3$ dispersed film of 500 nm thickness and 400 nm thickness will be referred to as medium examples Q2 and Q3, respectively.

The medium examples Q2 and Q3 according to the invention and the conventional example A1 were used in combination with the mono-pole/MR composite head of inductive/MR composite head to constitute magnetic disc apparatus examples, which will be referred to as apparatus examples QQ2, QQ3, and conventional apparatus example AA1, respectively.

The conditions of the head mounted and the recording conditions were same as in Examples A.

In order to check the domain wall configuration of the CoNb—Al$_2$O$_3$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoNb—Al$_2$O$_3$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples QQ2, QQ3, and conventional example A1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

As shown in Table 79, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example QQ2 according to the present invention, the reproduction output fluctuation was suppressed within 5% for the magnetic field of 20 Oe or below. Similarly, in the apparatus example QQ3 according to the present invention, the reproduction output fluctuation was suppressed within 5% for the magnetic field of 50 Oe or below. Thus, the apparatus examples according to the present invention exhibited an output stability higher than the conventional apparatus example AA1.

TABLE 79

Magnetic Field applied in Direction of 0 degrees

| MAGNETIC FIELD [Oe] | 1 | 1.4 | 2 | 3.2 | 5 | 7 | 10 | 14 | |
|---|---|---|---|---|---|---|---|---|---|
| QQ2 OUTPUT RESIDUE [%] | 97.9 | 95.8 | 98.4 | 97.5 | 98.7 | 95.8 | 96.4 | 95.8 | |
| QQ3 OUTPUT RESIDUE [%] | 95.6 | 96.5 | 97.4 | 97.6 | 97.7 | 96.3 | 98.9 | 97.6 | |
| MAGNETIC FIELD [Oe] | 20 | 32 | 50 | 70 | 100 | 140 | 200 | 320 | 500 |
| QQ2 OUTPUT RESIDUE [%] | 98.4 | 95.6 | 87.8 | 79.7 | 65.1 | 42.9 | 52.9 | 20.6 | 15.7 |
| QQ3 OUTPUT RESIDUE [%] | 96.8 | 95.7 | 97.8 | 94.8 | 92.5 | 86.2 | 76.7 | 61.5 | 35.7 |

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the $CoNb-Al_2O_3$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 79 and FIG. 26, the apparatus example QQ3 can further suppress the output reduction than the apparatus example QQ2. This is because the medium example Q2 uses as the undercoat soft magnetic film the $CoNb-Al_2O_3$ dispersed film having a thickness smaller than that of the medium example Q3, so that less magnetic flux can pass through. Accordingly, in the medium example Q3 compared to the medium example Q2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the $CoNb-Al_2O_3$ dispersed film having a thickness of 400 nm or below, it was possible to obtain a reproduction output residue ratio identical to that of the apparatus example NN3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 80 to 84 show output reduction ratio obtained when the magnetic field was applied at the other angles.

TABLE 80

Magnetic Field in Direction of 30 degrees

| MAGNETIC FIELD [Oe] | 1 | 1.4 | 2 | 3.2 | 5 | 7 | 10 | 14 |
|---|---|---|---|---|---|---|---|---|
| QQ2 OUTPUT RESIDUE [%] | 97.8 | 98.8 | 97.6 | 96.8 | 99.3 | 100 | 98.8 | 97.5 |
| QQ3 OUTPUT RESIDUE [%] | 98.6 | 97.4 | 96.8 | 95.7 | 98.6 | 98.4 | 97.5 | 97.7 |
| MAGNETIC FIELD [Oe] | 20 | 32 | 50 | 70 | 100 | 140 | 200 | 320 | 500 |
| QQ2 OUTPUT RESIDUE [%] | 98.6 | 96.2 | 88.8 | 80.4 | 66.8 | 45.5 | 27.0 | 22.4 | 15.1 |
| QQ3 OUTPUT RESIDUE [%] | 97.6 | 96.4 | 98.5 | 97.7 | 94.7 | 88.7 | 80.4 | 60.2 | 35.1 |

TABLE 81

Magnetic Field in Direction of 60 degrees

| MAGNETIC FIELD [Oe] | 1 | 1.4 | 2 | 3.2 | 5 | 7 | 10 | 14 |
|---|---|---|---|---|---|---|---|---|
| QQ2 OUTPUT RESIDUE [%] | 98.7 | 97.4 | 97.4 | 95.8 | 95.5 | 97.6 | 96.4 | 97.6 |
| QQ3 OUTPUT RESIDUE [%] | 98.6 | 95.8 | 98.7 | 97.5 | 97.7 | 97.6 | 99.5 | 97.6 |
| MAGNETIC FIELD [Oe] | 20 | 32 | 50 | 70 | 100 | 140 | 200 | 320 | 500 |
| QQ2 OUTPUT RESIDUE [%] | 95.8 | 99.7 | 97.8 | 94.7 | 90.4 | 86.1 | 75.4 | 65.7 | 37.1 |
| QQ3 OUTPUT RESIDUE [%] | 95.8 | 98.4 | 97.5 | 98.4 | 96.8 | 92.4 | 90.4 | 82.9 | 75.8 |

TABLE 82

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| QQ2 OUTPUT RESIDUE [%] | 99.5 | 97.5 | 97.4 | 95.8 | 96.8 | 97.8 | 95.7 | 98.4 |
| QQ3 OUTPUT RESIDUE [%] | 97.6 | 97.6 | 96.6 | 99.2 | 97.5 | 97.8 | 97.4 | 96.8 |
| MAGNETIC FIELD [Oe] | 20 | 32 | 50 | 70 | 100 | 140 | 200 | 320 | 500 |
| QQ2 OUTPUT RESIDUE [%] | 96.9 | 95.6 | 98.7 | 93.1 | 87.5 | 79.5 | 65.3 | 42.2 | 25.7 |
| QQ3 OUTPUT RESIDUE [%] | 95.2 | 96.8 | 97.0 | 97.8 | 98.7 | 94.1 | 92.6 | 86.9 | 76.4 |

TABLE 83

Magnetic Field in Direction of −30 degrees

| MAGNETIC FIELD [Oe] | 1 | 1.4 | 2 | 3.2 | 5 | 7 | 10 | 14 | |
|---|---|---|---|---|---|---|---|---|---|
| QQ2 OUTPUT RESIDUE [%] | 96.6 | 95.6 | 97.7 | 96.3 | 97.7 | 95.8 | 95.4 | 95.8 | |
| QQ3 OUTPUT RESIDUE [%] | 95.6 | 98.6 | 97.6 | 96.3 | 99.4 | 97.8 | 97.7 | 96.8 | |
| MAGNETIC FIELD [Oe] | 20 | 32 | 50 | 70 | 100 | 140 | 200 | 320 | 500 |
| QQ2 OUTPUT RESIDUE [%] | 98.5 | 97.5 | 99.8 | 81.8 | 67.6 | 46.2 | 32.1 | 25.7 | 20.4 |
| QQ3 OUTPUT RESIDUE [%] | 97.8 | 98.1 | 99.3 | 96.7 | 94.5 | 90.6 | 82.5 | 66.0 | 35.9 |

TABLE 84

Magnetic Field in Direction of −60 degrees

| MAGNETIC FIELD [Oe] | 1 | 1.4 | 2 | 3.2 | 5 | 7 | 10 | 14 | |
|---|---|---|---|---|---|---|---|---|---|
| QQ2 OUTPUT RESIDUE [%] | 96.7 | 95.8 | 98.4 | 98.6 | 97.9 | 96.8 | 97.4 | 96.2 | |
| QQ3 OUTPUT RESIDUE [%] | 98.5 | 95.6 | 97.6 | 96.6 | 97.6 | 96.6 | 96.6 | 95.2 | |
| MAGNETIC FIELD [Oe] | 20 | 32 | 50 | 70 | 100 | 140 | 200 | 320 | 500 |
| QQ2 OUTPUT RESIDUE [%] | 95.8 | 97.8 | 96.8 | 94.8 | 90.8 | 85.3 | 75.3 | 65.6 | 36.4 |
| QQ3 OUTPUT RESIDUE [%] | 95.4 | 98.6 | 97.4 | 98.4 | 96.8 | 94.5 | 90.8 | 82.8 | 75.4 |

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention NN2 and NN3, it was possible to obtain a higher output stability than the conventional apparatus example AA1.

Moreover, in the apparatus example NN3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1. The same tendency was observed when Zr, B, was added instead of B to the Co target for preparing the medium examples.

Moreover, similar results were obtained for the apparatus using the inductive/MR composite head. In this case also, the apparatus example of the present invention exhibited a further higher output stability than the conventional apparatus example AA1.

Thus, the apparatus example QQ3 of the present invention can provide a magnetic disc apparatus having a high output stability, enabling to realize a high recording density.

15. Examples K

Medium examples were prepared in the same way as in Examples E except for that the Co target was replaced by a CoFe target, and that the $SiO_2$ target was replaced by an $Al_2O_3$ target.

The medium examples having the CoFe—$Al_2O_3$ dispersed film of 500 nm thickness and 400 nm thickness will be referred to as medium examples K2 and K3, respectively.

The medium examples K2 and K3 according to the invention and the conventional example A1 were used in combination with the mono-pole/MR composite head of inductive/MR composite head to constitute magnetic disc apparatus examples, which will be referred to as apparatus examples KK2, KK3, and conventional apparatus example AA1, respectively.

The conditions of the head mounted and the recording conditions were same as in Examples A.

In order to check the domain wall configuration of the CoFe—$Al_2O_3$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoFe—$Al_2O_3$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples KK2, KK3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field. The results obtained show the same tendency as in Examples J.

As shown in Table 85, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example KK2 according to the present invention, the reproduction output fluctuation was suppressed within 5% for the magnetic field of 20 Oe or below. Similarly, in the apparatus example KK3 according to the present invention, the reproduction output fluctuation was suppressed within 5% for the magnetic field of 50 Oe or below. Thus, the apparatus examples according to the present invention exhibited an output stability higher than the conventional apparatus example AA1.

TABLE 85

| Magnetic Field applied in Direction of 0 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| KK2 OUTPUT RESIDUE [%] | 98.0 | 95.8 | 98.5 | 97.5 | 98.8 | 95.8 | 96.6 | 95.8 | |
| KK3 OUTPUT RESIDUE [%] | 95.9 | 96.7 | 97.4 | 97.7 | 97.7 | 96.6 | 98.9 | 97.8 | |
| MAGNETIC FIELD [Oe] | 20 | 32 | 50 | 70 | 100 | 140 | 200 | 320 | 500 |
| KK2 OUTPUT RESIDUE [%] | 98.4 | 95.7 | 87.8 | 79.9 | 65.8 | 43.0 | 52.5 | 20.9 | 15.8 |
| KK3 OUTPUT RESIDUE [%] | 96.6 | 95.7 | 97.2 | 94.8 | 92.1 | 86.2 | 76.1 | 61.8 | 35.6 |

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the mono-pole head main magnetic pole, demagnetizing the recording magnetization, thus reducing the output. In contrast to this, the medium example of the present invention used in the apparatus example of the present invention uses as the undercoat soft magnetic film the $CoFe$—$Al_2O_3$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 85 and FIG. 26, the apparatus example KK3 can further suppress the output reduction than the apparatus example KK2. This is because the medium example K2 uses as the undercoat soft magnetic film the $CoFe$—$Al_2O_3$ dispersed film having a thickness smaller than that of the medium example K3, so that less magnetic flux can pass through. Accordingly, in the medium example K3 compared to the medium example K2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the $CoFe$—$Al_2O_3$ dispersed film having a thickness of 400 nm or below, it was possible to obtain a reproduction output residue ratio identical to that of the apparatus example KK3. However, when the film thickness was 50 nm or below, the rectangular wave of the reproduction waveform was distorted, causing a problem as the backing layer. Therefore, it is impossible to reduce the film thickness without limitation. (The configuration and distortion of the rectangular wave are just like in Examples A shown in FIG. 11 to FIG. 13).

Tables 86 to 90 show output reduction ratio obtained when the magnetic field was applied at the other angles.

TABLE 86

| Magnetic Field in Direction of 30 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| KK2 OUTPUT RESIDUE [%] | 97.9 | 98.8 | 97.6 | 96.8 | 99.4 | 99.5 | 98.8 | 97.7 | |
| KK3 OUTPUT RESIDUE [%] | 98.7 | 97.4 | 96.7 | 95.7 | 98.7 | 98.4 | 97.7 | 97.7 | |
| MAGNETIC FIELD [Oe] | 20 | 32 | 50 | 70 | 100 | 140 | 200 | 320 | 500 |
| KK2 OUTPUT RESIDUE [%] | 98.4 | 96.2 | 88.9 | 80.4 | 66.7 | 45.5 | 27.9 | 22.4 | 15.6 |
| KK3 OUTPUT RESIDUE [%] | 97.7 | 96.4 | 98.9 | 97.9 | 94.7 | 88.2 | 79.9 | 60.5 | 35.9 |

TABLE 87

| Magnetic Field in Direction of 60 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| KK2 OUTPUT RESIDUE [%] | 98.8 | 97.4 | 97.8 | 95.8 | 95.5 | 97.8 | 96.4 | 97.8 | |
| KK3 OUTPUT RESIDUE [%] | 98.6 | 95.6 | 98.7 | 97.6 | 97.7 | 97.0 | 99.5 | 97.0 | |
| MAGNETIC FIELD [Oe] | 20 | 32 | 50 | 70 | 100 | 140 | 200 | 320 | 500 |
| KK2 OUTPUT RESIDUE [%] | 95.8 | 99.2 | 97.8 | 94.2 | 90.4 | 86.1 | 75.9 | 65.7 | 37.9 |
| KK3 OUTPUT RESIDUE [%] | 95.9 | 98.4 | 97.4 | 98.4 | 96.4 | 92.5 | 90.3 | 82.7 | 75.2 |

TABLE 88

Magnetic Field in Direction of 90 degrees

| MAGNETIC FIELD [Oe] | 1 | 1.4 | 2 | 3.2 | 5 | 7 | 10 | 14 |
|---|---|---|---|---|---|---|---|---|
| KK2 OUTPUT RESIDUE [%] | 99.9 | 97.9 | 97.4 | 95.4 | 96.8 | 97.4 | 95.7 | 98.7 |
| KK3 OUTPUT RESIDUE [%] | 97.7 | 97.6 | 96.6 | 99.7 | 97.5 | 97.6 | 97.4 | 96.0 |
| MAGNETIC FIELD [Oe] | 20 | 32 | 50 | 70 | 100 | 140 | 200 | 320 | 500 |
| KK2 OUTPUT RESIDUE [%] | 96.5 | 95.3 | 98.7 | 93.8 | 87.5 | 79.8 | 65.3 | 42.4 | 25.9 |
| KK3 OUTPUT RESIDUE [%] | 95.7 | 96.8 | 97.4 | 97.8 | 98.6 | 94.4 | 92.6 | 87.0 | 78.2 |

TABLE 89

Magnetic Field in Direction of −30 degrees

| MAGNETIC FIELD [Oe] | 1 | 1.4 | 2 | 3.2 | 5 | 7 | 10 | 14 |
|---|---|---|---|---|---|---|---|---|
| KK2 OUTPUT RESIDUE [%] | 96.7 | 95.7 | 97.7 | 96.7 | 97.7 | 95.7 | 95.7 | 95.2 |
| KK3 OUTPUT RESIDUE [%] | 95.4 | 98.4 | 97.6 | 96.1 | 99.4 | 97.0 | 97.7 | 96.6 |
| MAGNETIC FIELD [Oe] | 20 | 32 | 50 | 70 | 100 | 140 | 200 | 320 | 500 |
| KK2 OUTPUT RESIDUE [%] | 98.6 | 97.6 | 99.8 | 81.4 | 67.6 | 46.4 | 32.1 | 25.2 | 20.2 |
| KK3 OUTPUT RESIDUE [%] | 97.5 | 98.5 | 99.3 | 96.9 | 94.5 | 90.7 | 82.5 | 66.7 | 35.8 |

TABLE 90

Magnetic Field in Direction of −60 degrees

| MAGNETIC FIELD [Oe] | 1 | 1.4 | 2 | 3.2 | 5 | 7 | 10 | 14 |
|---|---|---|---|---|---|---|---|---|
| KK2 OUTPUT RESIDUE [%] | 96.8 | 95.6 | 98.4 | 98.4 | 97.9 | 96.4 | 97.4 | 96.8 |
| KK3 OUTPUT RESIDUE [%] | 98.6 | 95.6 | 97.7 | 96.6 | 97.9 | 96.6 | 96.1 | 95.7 |
| MAGNETIC FIELD [Oe] | 20 | 32 | 50 | 70 | 100 | 140 | 200 | 320 | 500 |
| KK2 OUTPUT RESIDUE [%] | 95.1 | 97.8 | 96.2 | 94.8 | 90.0 | 85.3 | 75.7 | 65.6 | 36.6 |
| KK3 OUTPUT RESIDUE [%] | 95.5 | 98.6 | 97.6 | 98.7 | 96.8 | 94.3 | 90.4 | 82.4 | 75.8 |

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention KK2 and KK3, it was possible to obtain a higher output stability than the conventional apparatus example AA1.

Moreover, in the apparatus example KK3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1.

Moreover, similar results were obtained for the apparatus using the inductive/MR composite head. In this case also, the apparatus example of the present invention exhibited a further higher output stability than the conventional apparatus example AA1.

Thus, the apparatus example KK3 of the present invention can provide a magnetic disc apparatus having a high output stability, enabling to realize a high recording density.

16. Examples R

Medium examples were prepared in the same way as in Examples K except for that the CoFe target was replaced by a CoFeZr target. The addition of Zr has an effect to reduce the crystalline particle size.

The medium examples having the CoFeZr—$Al_2O_3$ dispersed film of 500 nm thickness and 400 nm thickness will be referred to as medium examples R2 and R3, respectively.

The medium examples R2 and R3 according to the invention and the conventional example A1 were used in combination with the mono-pole/MR composite head of inductive/MR composite head to constitute magnetic disc apparatus examples, which will be referred to as apparatus examples RR2, RR3, and conventional apparatus example AA1, respectively.

The conditions of the head mounted and the recording conditions were same as in Examples A.

In order to check the domain wall configuration of the CoFeZr—$Al_2O_3$ dispersed film, the powder pattern method was used for observation in the same way as in Examples A. As a result, no clear domain wall configuration could be observed. Next, a magnetic field was applied to the sample while increasing the intensity, but no change was observed.

The similar observation was carried out for the NiFe film, and a clear domain wall shift was observed. The domain wall was clearly shifted while changing the magnetic field applied.

From the aforementioned, it can be said that the magnetization process of the NiFe film is the domain wall shift, whereas the magnetization process of the CoFeZr—Al$_2$O$_3$ dispersed film does not depend on the domain wall shift.

The output stability against an external magnetic field was checked as follows. A signal was recorded using the mono-pole/MR composite head. After this, using a Helmholtz coil, a DC magnetic field in the range of 1 to 500 Oe was applied to the medium examples on the apparatus examples RR2, RR3, and conventional example AA1, so as to compare the reproduction outputs before and after the application of the magnetic field.

Here, the direction of the magnetic field applied is defined in the same way as in Examples A (see FIG. 4).

Each of the reproduction outputs after application of the magnetic field is shown in percentage with respect to the reproduction output before application of the magnetic field.

As shown in Table 91, the conventional apparatus example AA1 has an output stability significantly lowered by the magnetic field applied in parallel to the disc surface. When a magnetic field of 1 Oe was applied, more than 80% of the output was already lost.

In contrast to this, in the apparatus example RR2 according to the present invention, the reproduction output fluctuation was suppressed within 5% for the magnetic field of 20 Oe or below. Similarly, in the apparatus example RR3 according to the present invention, the reproduction output fluctuation was suppressed within 5% for the magnetic field of 50 Oe or below. Thus, the apparatus examples according to the present invention exhibited an output stability higher than the conventional apparatus example AA1.

mono-pole head main magnetic pole, demagnetizing the recording magnetization, thus reducing the output. In contrast to this, the medium example of the present invention used in the apparatus example of the present invention uses as the undercoat soft magnetic film the CoFeZr—Al$_2$O$_3$ dispersed film whose magnetization does not depend on the domain wall shift. Accordingly, even if a magnetic field is applied, the magnetic flux will not be easily concentrated to the mono-pole head main magnetic pole, which may cause reduction in the output.

Moreover, as can be understood from Table 91 and FIG. 26, the apparatus example RR3 can further suppress the output reduction than the apparatus example RR2. This is because the medium example R2 uses as the undercoat soft magnetic film the CoFeZr—Al$_2$O$_3$ dispersed film having a thickness smaller than that of the medium example R3, so that less magnetic flux can pass through. Accordingly, in the medium example R3 compared to the medium example R2, the magnetic flux cannot be easily concentrated on the mono-pole head main magnetic pole. Consequently, from the viewpoint of the output stability, it is preferable that the undercoat soft magnetic film of the medium be as thin as possible. In the aforementioned check, in the apparatus using a medium including the CoFeZr—Al$_2$O$_3$ dispersed film having a thickness of 400 nm or below, it was possible to obtain a reproduction output residue ratio identical to that of the apparatus example RR3. However, when the film thickness was 50 nm or below, the rectangular wave of the reproduction waveform was distorted, causing a problem as the backing layer. Therefore, it is impossible to reduce the

TABLE 91

| Magnetic Field applied in Direction of 0 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| RR2 OUTPUT RESIDUE [%] | 98.6 | 95.4 | 98.5 | 97.6 | 98.7 | 95.8 | 96.4 | 95.4 | |
| RR3 OUTPUT RESIDUE [%] | 95.8 | 96.8 | 97.8 | 97.4 | 97.4 | 96.8 | 98.8 | 97.0 | |
| MAGNETIC FIELD [Oe] | 20 | 32 | 50 | 70 | 100 | 140 | 200 | 320 | 500 |
| RR2 OUTPUT RESIDUE [%] | 98.7 | 95.6 | 87.8 | 80.5 | 65.7 | 43.4 | 52.7 | 20.0 | 16.5 |
| RR3 OUTPUT RESIDUE [%] | 96.5 | 95.4 | 97.6 | 94.5 | 92.7 | 86.2 | 76.8 | 61.4 | 35.4 |

As has been described in Examples A, this is because the conventional medium example A1 used in the conventional apparatus example AA1 has the undercoat soft magnetic film NiFe whose magnetization depends on a domain wall shift. Accordingly, if a magnetic field is applied, the domain wall is easily shifted so as to concentrate a magnetic flux to the film thickness without limitation. (The configuration and distortion of the rectangular wave are just like in Examples A shown in FIG. 11 to FIG. 13).

Tables 92 to 96 show output reduction ratio obtained when the magnetic field was applied at the other angles.

TABLE 92

| Magnetic Field in Direction of 30 degrees | | | | | | | | | |
|---|---|---|---|---|---|---|---|---|---|
| MAGNETIC FIELD [Oe] | 1 | 1.4 | 2 | 3.2 | 5 | 7 | 10 | 14 | |
| RR2 OUTPUT RESIDUE [%] | 97.7 | 98.8 | 97.7 | 96.8 | 99.7 | 99.4 | 98.4 | 97.2 | |
| RR3 OUTPUT RESIDUE [%] | 98.7 | 97.9 | 96.7 | 95.4 | 98.3 | 98.4 | 97.8 | 97.7 | |
| MAGNETIC FIELD [Oe] | 20 | 32 | 50 | 70 | 100 | 140 | 200 | 320 | 500 |
| RR2 OUTPUT RESIDUE [%] | 98.9 | 96.6 | 88.4 | 80.4 | 66.4 | 45.5 | 27.6 | 22.1 | 15.1 |
| RR3 OUTPUT RESIDUE [%] | 97.7 | 96.7 | 98.9 | 98.2 | 94.8 | 88.9 | 80.9 | 60.4 | 35.2 |

TABLE 93

Magnetic Field in Direction of 60 degrees

| MAGNETIC FIELD [Oe] | 1 | 1.4 | 2 | 3.2 | 5 | 7 | 10 | 14 | |
|---|---|---|---|---|---|---|---|---|---|
| RR2 OUTPUT RESIDUE [%] | 98.7 | 97.6 | 97.9 | 96.1 | 95.7 | 97.9 | 96.5 | 97.2 | |
| RR3 OUTPUT RESIDUE [%] | 98.7 | 96.8 | 98.5 | 97.7 | 97.8 | 97.9 | 99.4 | 96.7 | |
| MAGNETIC FIELD [Oe] | 20 | 32 | 50 | 70 | 100 | 140 | 200 | 320 | 500 |
| RR2 OUTPUT RESIDUE [%] | 95.9 | 99.3 | 97.9 | 94.4 | 90.8 | 86.0 | 75.7 | 65.8 | 38.0 |
| RR3 OUTPUT RESIDUE [%] | 95.4 | 98.3 | 97.2 | 98.9 | 96.3 | 92.4 | 90.6 | 82.8 | 75.3 |

TABLE 94

Magnetic Field in Direction of 90 degrees

| MAGNETIC FIELD [Oe] | 1 | 1.4 | 2 | 3.2 | 5 | 7 | 10 | 14 | |
|---|---|---|---|---|---|---|---|---|---|
| RR2 OUTPUT RESIDUE [%] | 99.1 | 97.5 | 97.6 | 95.7 | 96.1 | 97.5 | 95.8 | 98.4 | |
| RR3 OUTPUT RESIDUE [%] | 97.6 | 97.4 | 96.7 | 99.6 | 97.2 | 97.1 | 97.7 | 96.7 | |
| MAGNETIC FIELD [Oe] | 20 | 32 | 50 | 70 | 100 | 140 | 200 | 320 | 500 |
| RR2 OUTPUT RESIDUE [%] | 96.6 | 95.2 | 98.8 | 93.9 | 87.6 | 79.7 | 65.2 | 42.7 | 22.8 |
| RR3 OUTPUT RESIDUE [%] | 95.8 | 96.9 | 97.2 | 97.9 | 98.2 | 94.1 | 92.9 | 87.1 | 78.9 |

TABLE 95

Magnetic Field in Direction of −30 degrees

| MAGNETIC FIELD [Oe] | 1 | 1.4 | 2 | 3.2 | 5 | 7 | 10 | 14 | |
|---|---|---|---|---|---|---|---|---|---|
| RR2 OUTPUT RESIDUE [%] | 96.2 | 95.2 | 96.9 | 96.5 | 97.8 | 97.8 | 95.4 | 95.9 | |
| RR3 OUTPUT RESIDUE [%] | 95.8 | 98.4 | 97.6 | 96.7 | 99.4 | 97.1 | 97.7 | 96.9 | |
| MAGNETIC FIELD [Oe] | 20 | 32 | 50 | 70 | 100 | 140 | 200 | 320 | 500 |
| RR2 OUTPUT RESIDUE [%] | 98.7 | 97.7 | 99.5 | 81.3 | 67.9 | 46.1 | 32.7 | 25.0 | 20.9 |
| RR3 OUTPUT RESIDUE [%] | 97.8 | 98.5 | 99.4 | 96.9 | 94.9 | 90.7 | 82.0 | 66.7 | 35.1 |

TABLE 96

Magnetic Field in Direction of −60 degrees

| MAGNETIC FIELD [Oe] | 1 | 1.4 | 2 | 3.2 | 5 | 7 | 10 | 14 | |
|---|---|---|---|---|---|---|---|---|---|
| RR2 OUTPUT RESIDUE [%] | 96.5 | 95.4 | 98.7 | 98.3 | 97.8 | 96.2 | 97.4 | 96.2 | |
| RR3 OUTPUT RESIDUE [%] | 98.7 | 95.2 | 97.8 | 96.4 | 97.6 | 96.6 | 96.8 | 95.7 | |
| MAGNETIC FIELD [Oe] | 20 | 32 | 50 | 70 | 100 | 140 | 200 | 320 | 500 |
| RR2 OUTPUT RESIDUE [%] | 95.6 | 97.8 | 96.7 | 94.8 | 89.7 | 85.6 | 75.8 | 65.7 | 41.8 |
| RR3 OUTPUT RESIDUE [%] | 95.5 | 98.2 | 97.6 | 98.9 | 96.8 | 94.5 | 90.4 | 82.3 | 75.9 |

As has been described in Examples A, when magnetic field was applied to the conventional apparatus example AA1, as the magnetic component of horizontal direction increased, the output reduction amount was also increased. In any of the cases, the output was already reduced by a magnetic field of 1 Oe. In contrast to this, in the apparatus examples of the present invention RR2 and RR3, it was possible to obtain a higher output stability than the conventional apparatus example AA1.

Moreover, in the apparatus example RR3 of the present invention, no output reduction was caused up to about 70 Oe in the direction of 30 degrees and up to 100 Oe in the direction of 60 degrees and 90 degrees. That is, it is possible to obtain a further higher output stability against a magnetic field than the conventional apparatus example AA1. The same tendency was observed when Nb, B, or Ta was added instead of Zr to the Co target when preparing the medium examples.

Moreover, similar results were obtained for the apparatus using the inductive/MR composite head. In this case also, the apparatus example of the present invention exhibited a further higher output stability than the conventional apparatus example AA1.

Thus, the apparatus example RR3 of the present invention can provide a magnetic disc apparatus having a high output stability, enabling to realize a high recording density.

As has been described above, the optical disc apparatus according to the present invention uses a vertical two-layered medium having an undercoat soft magnetic film under the vertical magnetic film. This enables the suppression of an output reduction or disappearance due to demagnetization of the recording magnetization caused by the domain wall shift in the undercoat soft magnetic film, thus realizing a magnetic disc apparatus having a high output stability. Consequently, it is possible to eliminate the output disappearance which has been the fatal defect of the conventional magnetic disc apparatus using a vertical two-layered medium.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-037766 (Filed on Feb. 19$^{th}$, 1998) including specification, claims, drawings and summary are incorporated herein by reference in its entirety.

What is claimed is:

1. A magnetic disc apparatus comprising:
    a vertical two-layered magnetic recording medium having an undercoat soft magnetic film and a vertical magnetization film; and
    a composite head for recording/reproducing to/from said vertical two-layered magnetic recording medium,
        wherein said undercoat soft magnetic film is made from a material having no magnetic domain wall structure, and
        wherein said undercoat soft magnetic film has a thickness in a range from 50 to 400 nm.

2. The magnetic disc apparatus as claimed in claim 1, wherein said composite head comprises a mono-pole/MR (magnetoresistance effect) composite head or other ID (inductive)/MR composite head.

3. The magnetic disc apparatus as claimed in claim 2, wherein said undercoat soft magnetic film is made from a FeSiAl film, FeSiAl alloy film, FeTaN film, or FeTaN alloy film.

4. The magnetic disc apparatus as claimed in claim 2, wherein said undercoat soft magnetic film is a granular thin film made from a ferromagnetic material dispersed in a base material selected from a group consisting of $SiO_2$, C, and $Al_2O_3$.

5. The magnetic disc apparatus as claimed in claim 4 wherein said ferromagnetic material is Co or CoFe.

6. The magnetic disc apparatus as claimed in claim 5, wherein said granular thin film is formed by adding a material selected from a group consisting of Ta, Zr, Nb, or B.

7. The magnetic disc apparatus as claimed in claim 5, wherein said granular thin film has a film thickness in a range from 50 to 400 nm.

8. The magnetic disc apparatus as claimed in claim 4, wherein said granular thin film is formed by adding a material selected from a group consisting of Ta, Zr, Nb, or B.

9. The magnetic disc apparatus as claimed in claim 4, wherein said granular thin film has a film thickness in a range from 50 to 400 nm.

10. The magnetic disc apparatus as claimed in claim 1, wherein said undercoat soft magnetic film is made from a FeSiAl film, FeSiAl alloy film, FeTaN film, or FeTaN alloy film.

11. The magnetic disc apparatus as claimed in claim 1, wherein said undercoat soft magnetic film is a granular thin film made from a ferromagnetic material dispersed in a base material selected from a group consisting of $SiO_2$, C, and $Al_2O_3$.

12. The magnetic disc apparatus as claimed in claim 11, wherein said granular thin film is formed by adding a material selected from a group consisting of Ta, Zr, Nb, or B.

13. The magnetic disc apparatus as claimed in claim 11, wherein said ferromagnetic material is Co or CoFe.

14. The magnetic disc apparatus as claimed in claim 13, wherein said granular thin film is formed by adding a material selected from a group consisting of Ta, Zr, Nb, or B.

15. The magnetic disc apparatus as claimed in claim 13, wherein said granular thin film has a film thickness in a range from 50 to 400 nm.

16. The magnetic disc apparatus as claimed in claim 11, wherein said granular thin film has a film thickness in a range from 50 to 400 nm.

17. A magnetic disc recording and reproducing apparatus comprising:
    magnetic storage means for storing information therein, said magnetic storage means comprising a vertical two-layered magnetic recording medium; and
    means for recording/reproducing to/from said vertical two-layered magnetic recording medium,
        wherein said medium includes an undercoat soft magnetic film and a vertical magnetization film,
        wherein said undercoat soft magnetic film is made from a material devoid of a magnetic domain wall structure, and
        wherein said undercoat soft magnetic film has a thickness in a range from 50 to 400 nm.

* * * * *